US008401680B2

(12) United States Patent
Muto et al.

(10) Patent No.: US 8,401,680 B2
(45) Date of Patent: Mar. 19, 2013

(54) AMPLIFIER SYSTEM

(75) Inventors: Takaaki Muto, Hamamatsu (JP); Ken Iwayama, Hamamatsu (JP); Takaaki Makino, Hamamatsu (JP); Naohide Kohyama, Hamamatsu (JP); Akihiko Suyama, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1091 days.

(21) Appl. No.: 12/276,140

(22) Filed: Nov. 21, 2008

(65) Prior Publication Data

US 2009/0138110 A1 May 28, 2009

(30) Foreign Application Priority Data

Nov. 22, 2007 (JP) ................................ 2007-302803
Mar. 11, 2008 (JP) ................................ 2008-061670
Mar. 11, 2008 (JP) ................................ 2008-061671
Mar. 11, 2008 (JP) ................................ 2008-061672

(51) Int. Cl.
*G06F 17/00* (2006.01)

(52) U.S. Cl. ............ 700/94; 381/85; 381/104; 381/105; 381/107; 381/108; 715/716; 715/727

(58) Field of Classification Search ..................... 700/94
See application file for complete search history.

(56) References Cited

U.S. PATENT DOCUMENTS 5,157,348 A * 10/1992 Deveau ......................... 330/279
6,628,999 B1 * 9/2003 Klaas et al. ..................... 700/94
8,024,055 B1 * 9/2011 Holmgren et al. .............. 700/94
2001/0051930 A1 * 12/2001 Nakamura ...................... 705/56
2002/0072816 A1 * 6/2002 Shdema et al. ................. 700/94
2005/0246041 A1 11/2005 Kreifeldt et al.
2008/0265991 A1 * 10/2008 Felder ........................... 330/254

FOREIGN PATENT DOCUMENTS

EP 0 788 229 A2 8/1997
EP 0 788 229 A3 8/1997
JP 2002-010302 A 1/2002
WO WO-2006/066351 A2 6/2006
WO WO-2006/066351 A3 6/2006

OTHER PUBLICATIONS

Yamaha PCxxxxN manual: copyright 2004.*
European Search Report mailed Oct. 7, 2009, for EP Application No. 08169487.9, 15 pages.
European Search Report mailed Feb. 1, 2012, for EP Application No. 10189001.0, eight pages.

(Continued)

*Primary Examiner* — Paul McCord
(74) *Attorney, Agent, or Firm* — Morrison & Foerster LLP

(57) ABSTRACT

When any one of a plurality of amplifiers has been selected in response to amplifier selecting operation, an amplifier Detail View of the selected amplifier is displayed, where corresponding parameters are displayed via elements of the amplifier Detail View. When any one of a plurality of groups has been selected in response to group selecting operation, a group Detail View of the selected group is displayed, where maximum and minimum values detected from among values of a parameter of individual amplifiers of the selected group are displayed via a band-shaped element of a corresponding fader element. In another example, where a hierarchical group is selected in a tree display section on a control screen, respective state information, including parameter values or states of parameters, of a plurality of amplifiers belonging to the selected hierarchical group is displayed in a state information section.

9 Claims, 27 Drawing Sheets

OTHER PUBLICATIONS

European Search Report mailed Feb. 1, 2012, for EP Application No. 10189004.4, eight pages.

European Search Report mailed Feb. 1, 2012, for EP Application No. 10189005.1, nine pages.

Anonymous. (2003). "Power Amplifier PC9500N—PC4800N—Owner's Manual," Yamaha Manual, located at <http://www.manualnguide.com/dl/486>, last visited Mar. 11, 2009, eight pages.

Partial European Search Report mailed Apr. 9, 2009, for EP Application No. 08169487.9, five pages.

Notice of Grounds for Rejection (Office Action), mailed Oct. 4, 2011, for JP Patent Application No. P2007-302803, with English Translation, seven pages.

Network Amp Manager, V1.1 OE Plus for Win XP/2000, Owner's Manual, 2003 Yamaha Corporation.

* cited by examiner

AMPLIFIER SYSTEM

BACKGROUND

The present invention relates to an amplifier system where a plurality of amplifiers connected to a network is controlled by an amplifier control apparatus.

Heretofore, there have been known professional-use audio systems which are employed in sound amplification apparatus (PA (Public Address System)) in concert halls, theaters, etc. in music production, etc. Such audio systems use many audio amplifiers that amplify sound signals and supply the amplified sound signals to many speakers provided at predetermined positions. In this connection, amplifier systems which are applied to networked audio systems and in which a plurality of amplifiers and amplifier control apparatus are connected to a network so that the plurality of amplifiers are controlled by the amplifier control apparatus.

In each of such amplifier systems, amplifier manager software is pre-installed in a personal computer, and the personal computer and the plurality of amplifiers are connected via the network. Through the amplifier manager software running on an operating system of the personal computer, states of the amplifiers can be monitored via the network, and behavior of the amplifiers can be remote-controlled via the network. Namely, the personal computer where the amplifier manager is running can be used as the amplifier control apparatus, and a main window of the amplifier manager is displayed on the display device of the amplifier control apparatus. The main window comprises a tree list of the amplifiers connected to the network and a plurality of pages capable of displaying the name and operation data of any of the equipment selected from the tree list.

Once an "Amp" page is selected from among the plurality of pages, the Amp page for controlling and monitoring the amplifiers is displayed. The Amp page comprises, for example, four pages on each of which are displayed channels of up to eight amplifiers. For each of the channels are displayed level data of the operation data via "elements", such as an Output meter indicative of an output level of the channel, Temp meter indicative of a temperature of the channel and Input meter indicative of an input level of the channel. Also, for each of the channels, ON/OFF parameters of the operation data, such as an ATT fader for attenuating an input signal and Mute button for muting the channel, are displayed via elements in such a manner that any of these ON/OFF parameters can be changed as desired. Further, on a Group View page of the plurality of pages, desired channels of the plurality of pages connected to the network can be grouped, controlled and monitored. The Group View page comprises, for example, eight group pages, on each of which can be displayed up to sixteen channels. Operation data displayed for each of the channels are similar to those of the Amp page. One example of the conventionally-known amplifier systems is disclosed in a non-patent literature, "NetworkAmp Manager V1.1. OE Plus for Win XP/2000 Instruction Manual", Yamaha Corporation.

With the conventionally-known amplifier control apparatus, the operation data of the amplifiers can be displayed and monitored on the pages of the main window, but types of the operation data that can be displayed on the Amp page and Group page are limited. Thus, when detailed operation data, including output electric power and alert threshold levels, are to be displayed, it has been conventional to open a Channel Detail page to display details of individual channels on the Channel Detail page. However, the conventional amplifier control apparatus present the problem that detailed operation data of the amplifiers can be monitored only channel by channel. Besides, the operation data are displayed on the Group View page per channel of the channel in question, so that the operation data of the entire group can not be monitored collectively. Further, the operation data identical in structure between amplifies of the same group, the operation data can be displayed on the Group View page; however, if the operation data are not identical in structure between amplifies of the same group, the operation data can be displayed on the Group View page in the control apparatus. Furthermore, the user may sometimes want to monitor the maximum value of some of level data, such as input and output levels, of the operation data, and the user may sometimes want to monitor the minimum value of other level data; however, so far, it has been impossible to monitor the maximum and minimum data values as desired.

Further, in such a case, it is conceivable to synthesize level data of the individual amplifiers of the group and display synthesized level data; however, if the group comprises a plurality of different types of amplifiers, the synthesized level data can not be displayed in the control apparatus because the level data differ in type, etc. depending on the types of the amplifiers.

Furthermore, in a case where operation data are to be grouped on the basis of destination speakers to which the data are to be supplied, they are grouped on a channel-by-channel basis, not on an amplifier-by-amplifier basis. In this case, there arises a need to monitor the operation data or level data of the group per channel of the amplifiers in order to check wire connections and deal with occurrence of any abnormality; however, so far, such monitoring has been impossible.

The assignee of the instant application proposed an amplifier control system in which a plurality of amplifiers and an amplifier control apparatus are connected to a network, and in which all of the amplifiers residing in the network are grouped, the grouped amplifiers are displayed in a tree format and state information are displayed in the amplifier control apparatus. In the proposed amplifier control apparatus, the grouped amplifiers are displayed in a tree format in a tree display section, and operating states of any one of the amplifies selected in the tree display section are displayed in a state information display section. Further, in the tree display section, a selected one of a plurality of groups is displayed in a tree format. Desired group to be displayed in a tree format can be selected via a tab. In the tree display, there can be displayed hierarchical groups expanded from the selected group and amplifiers belonging to the hierarchical groups.

The amplifier control apparatus selects a desired amplifier in the tree display section displayed on a control screen and thereby displays operating states of the selected amplifier in the state information display section. In this way, the selected amplifier can be monitored. But, in the case of a large-scale audio hall, where an enormous number of amplifiers, e.g. dozens or hundreds of amplifiers, are used, it is not a realistic approach to select and monitor the amplifiers one by one; thus, it is conceivable to provide a user interface that permits collective and individual displaying of a plurality of amplifiers, to thereby monitor all of the displayed amplifiers as if turning over pages.

However, monitoring all of the amplifiers by means of the aforementioned means tends to be cumbersome and time-consuming. Further, because all parameters of the individual amplifiers need not be constantly monitored and states of the amplifiers can be monitored to some degree if just general outlines of the parameters can be monitored, there has been a demand for an apparatus that can monitor general outlines of parameters of a plurality of amplifiers.

SUMMARY OF THE INVENTION

In view of the foregoing, it is an object of the present invention to provide an amplifier system in which a plurality of amplifiers and an amplifier control apparatus are connected via a network, and which has a function for not only allowing detailed operation data of each individual one of the amplifiers to be displayed in the amplifier control apparatus but also allowing minimum and maximum values of the operation dada in an entire group of the amplifiers to be displayed in the amplifier control apparatus.

It is another object of the present invention to provide an amplifier system including an amplifier control apparatus which can display not only detailed level data of each individual amplifier but also minimum and maximum values of each type of level data in an entire group of amplifiers.

It is still another object of the present invention to provide an amplifier system including an amplifier control apparatus which can not only display detailed operation data of each individual amplifier but also monitor operation dada or level data of groups, grouped on a channel-by-channel basis, separately for each of the channels of the amplifiers.

It is still another object of the present invention to provide an amplifier system which can monitor a necessary amplifier parameter without requiring much time and labor.

In order to accomplish the above-mentioned objects, the present invention provides an improved amplifier system including a plurality of amplifiers and an amplifier control apparatus interconnected via a network, in which each of the amplifiers comprises: an input section to which is inputted a sound signal; a processing section that amplifies the sound signal inputted to said input section; an output section that outputs the sound signal amplified by said processing section; a storage that stores a set of parameters, for controlling the amplification by said processing section; and a changing section that changes a value of a parameter stored in said storage and transmits a report notifying the change of the parameter to the amplifier control apparatus. Further, the amplifier control apparatus comprises: a display device; an input device that receives user's operation; a storage that stores a plurality of sets of parameters corresponding to the plurality of amplifiers, each of the parameter sets having data structure and values to the parameter set stored in the corresponding one of said amplifiers; an update section that receives the report from one of said amplifiers and updates the parameter set corresponding to the one amplifier in said storage on the basis of the report; a grouping section that groups said amplifiers into groups in response to a grouping operation received by said input device; a first display controller that, in response to an amplifier selecting operation received by said input device, selects one of said amplifiers, and displays an amplifier detail screen having an element thereon for the selected amplifier on said display device, wherein said first display controller takes out a parameter corresponding to the element from the parameter sets corresponding to the selected amplifier stored in said storage and displays the value of the parameter via the element on said display device; and a second display controller that, in response to a group selecting operation received by said input device, selects one of said groups and displays a group detail screen having an element thereon for the selected group on said display device, wherein said second display controller takes out a parameter corresponding to the elements from each of the parameter sets corresponding to the amplifiers in the selected group stored in said storage, detects a maximum value and a minimum value from among the taken-out parameters and displays the detected maximum and minimum values via the element on said display device.

According to the present invention, the first display controller takes out, for each element in the amplifier detail screen, a value of the corresponding parameter (i.e., parameter corresponding to the element) of the amplifier from the control-side operation data storage section and displays the taken-out value of the parameter via the element. The second display controller takes out, for each element in the group detail screen, values of the corresponding parameter of the individual amplifiers belonging to the group from the storage, detects maximum and minimum values from among the taken-out values of the parameter and displays the detected maximum and minimum values via the element. Thus, when any one of the groups has been selected, the present invention permits collective monitoring of the maximum and minimum values of the operation data of the amplifiers belonging to the selected group. When an individual amplifier has been selected, on the other hand, the present invention permits monitoring of states of the operation data of the selected amplifier. Further, a group detail screen having all elements contained in amplifier detail screens corresponding to the types of the amplifiers belonging to the selected group may be displayed on the display device, in which case, even where the operation data differ in structure among the amplifiers belonging to the selected group, the display of the group detail screen permits collective monitoring of the operation data of the amplifiers belonging to the selected group.

According to another aspect of the present invention, there is provided an improved amplifier system including a plurality of amplifiers and an amplifier control apparatus interconnected via a network, in which each of said amplifiers comprises: an input section to which is inputted a sound signal; a processing section that amplifies the sound signal inputted to said input section; an output section that outputs the sound signal amplified by said processing section; a detector that detects various kinds of operating states of said processing section and generates a plurality of level data representing the detected operating states; and a transmitter that, in response to a request command from the amplifier control apparatus, transmits a requested level data to the amplifier control apparatus. Further, the amplifier control apparatus comprises: a display device; an input device that receives user's operation; a storage that stores level data to be displayed; an update section that receives the level data from any of said amplifiers and updates corresponding one of the level data, stored in said storage, with the received level data; a grouping section that groups said amplifiers into groups in response to a grouping operation received by said input device; a setting section that, in response to a setting operation received by said input device, sets one of 'maximum' and 'minimum' to a parameter for each of elements on group detail screens corresponding to said groups; a first display controller that, in response to an amplifier selecting operation received by said input device, selects one of said amplifiers, and displays an amplifier detail screen having an element thereon for the selected amplifier on said display device, wherein said first display controller transmits a request command, requesting level data corresponding to the element, to the selected amplifier, reads out the level data, transmitted by the selected amplifier in response to the request command and received by said update section, from said storage, and displays the read-out level data via said element on said display device; and a second display controller that, in response to a group selecting operation received by said input device, selects one of said groups and displays a group detail screen having an element thereon for the selected group on said display device, wherein said second display controller transmits a request command, requesting level data corresponding to the element, to each of the amplifiers in the selected group, reads out a plurality of level data, transmitted by the amplifier in the selected group and received by said update section, from said storage, and displays a maximum value among the values of the read-out level data if the 'maximum' is set to the element, or a minimum value among the values of the read-out level data if the 'minimum' is set to the element, via said element on said display device.

According to still another aspect of the present invention, there is provided an improved amplifier system including a plurality of two-channel amplifiers and an amplifier control apparatus interconnected via a network, in which each of the two-channel amplifiers comprises: an input section to which is inputted sound signals of two channels; a processing section that amplifies the sound signals of two channels inputted to said input section; an output section that outputs the sound signals of two channels amplified by said processing section; a storage that stores therein operation data or level data of each of the two channels, operation data of one of the two channels controlling the amplification of a sound signal of the one channel in said processing section, level data of one of the two channels being indicative of an operation state of the channel in said processing section; and a communication section that communicates data with the amplifier control apparatus via the network. Further, the amplifier control apparatus comprises: a display device; an input device that receives user's operation; a communication section that communicates data with each of said two-channel amplifiers via the network; a grouping section that groups the channels of the amplifiers into groups in response to a grouping operation received by said input device; a first display controller that, in response to an amplifier selecting operation received by said input device, selects one of said amplifiers, displays an amplifier detail screen having two elements corresponding to the two channels thereon for the selected amplifier on said display device, acquires operation data or level data, corresponding to the elements, of the two channels from the selected amplifier via the network, and displays the acquired operation data or level data via the two elements; a second display controller that, in response to a channel selecting operation received by said input device, selects one channel of an amplifier among a plurality of channels of the amplifiers, displays a channel detail screen, on which only one of two elements same as the two elements on said amplifier detail screen, corresponding to the selected channels of the amplifier is placed while the other element is vanished or invalidated, acquires operation data or level data, corresponding to the one element, of the selected channel from the amplifier having the selected channel via the network, and display the acquired operation data or level data via the one element; and a third display controller that, in response to a group selecting operation received by said input device, selects one of said groups and (1) if the selected group contains both of the two channels, said third display controller displays a first group detail screen, on which two elements are placed same as the amplifier detail screen, acquires operation data or level data of the channels in the selected group from the amplifiers having one or two of the channels in the selected group via the network, processes the acquired data independently for each of the two channels to obtain two visual data for the two channels, and displays the two visual data via the two elements, and otherwise (2) if the selected group contains only one of the two channels, said third display controller displays a second group detail screen, on which one element corresponding to the one channel is placed same as on said channel detail screen, acquires operation data or level data of the channels in the selected group from the amplifiers having one of the channels in the selected group via the network, processes the acquired data to obtain one visual data for the one channel, and displays the one display data via the one element.

According to the invention arranged in the aforementioned manner, when any one of the plurality of amplifiers has been selected, the first display controller displays on the display device an amplifier detail screen having two element corresponding to the two channels (i.e., first and second channels) and displays, for each of the elements, corresponding operation data or level data of the selected amplifier. When any one of the channels of any one of the plurality of amplifiers has been selected, the second display controller displays a channel detail screen, where each of the elements corresponding to the other channel is displayed as invalid, and displays, for each of the elements of the selected channel, operation data or level data corresponding to the selected channel. Further, if the selected group contains both of the channels, the third display controller displays on the display device a group detail screen of the same construction as the amplifier detail screen, and synthesizes and displays, for each of the elements of the individual channels in the group detail screen, operation data or level data of the channels of each of the amplifiers belonging to the selected group. If the selected group contains only one of the two channels without containing the other channel, the third display control section displays a channel detail screen where each of the elements corresponding to the other channel is displayed as invalid, and synthesizes and displays, for each of the elements of the one channel in the channel detail screen, operation data or level data corresponding to the respective one channel of each of the amplifiers belonging to the selected group. Thus, when any one of the groups has been selected, the present invention allows the operation data or level data of the one channel, contained in the amplifiers of the selected group, to be synthesized and displayed, and causes the other channel, not contained in the amplifiers of the selected group, to be displayed as invalid. When an individual amplifier has been selected, on the other hand, the present invention allows the operation data or level data of the selected channel to be displayed per element of the selected channel, and causes the other or non-selected channel to be displayed as invalid.

According to still another aspect of the present invention, there is provided an improved amplifier system including a plurality of amplifiers and an amplifier control apparatus interconnected at least to via a network, in which the amplifier control apparatus comprises: a display device that provides a first screen and a second screen, said first screen displaying information of the groups and amplifiers belonging to each of the groups, said second screen displaying information of at least a parameter value indicative of an operating state of at least one of amplifiers displayed on the first screen; an operation section operable to select any one of the groups or the amplifiers displayed on the first screen; and a control section controlling display on the display device such that, if any one of the amplifiers is selected by said operation section, the parameter value of the selected amplifier are acquired and displayed on the second screen, and that, if any one of the groups is selected by said operation section, parameter values of all of the amplifiers belonging to the selected group are obtained and, as regards a same type of parameter among the obtained parameter values of all of the amplifiers, a predetermined one of minimum, maximum and average value of the obtained parameter values of the same type of parameter is generated and displayed on the second screen.

The groups may be hierarchical groups in a tree structure and the first screen displays said information of the groups and amplifiers in the tree structure. The second screen may further display information of a parameter state indicative of the operating state of said at least one of amplifiers displayed on the first screen. The control section may further control the display on the display device such that, if any one of the groups is selected by said operation section, parameter states of all of the amplifiers belonging to the selected group are obtained and, as regards a same type of parameter among the obtained parameter states of all of the amplifiers, a parameter state indicative of abnormality is displayed with priority on the second screen.

According to the invention arranged in the aforementioned manner, when any one of the hierarchical groups has been selected, the parameter values and/or parameter states of all of the amplifiers belonging to the selected hierarchical group are obtained so that, as regards a same given type of parameter, a predetermined one of minimum, maximum and average values of the parameter values of the same type of parameter is displayed, as a representative value of the parameter, and as regards a same given type of parameter state, a parameter state indicative of abnormality is displayed with priority on the second screen. Thus, the present invention permits monitoring of the outline of each desired parameter of all of the amplifiers without requiring much time and labor.

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION

Figure 1:
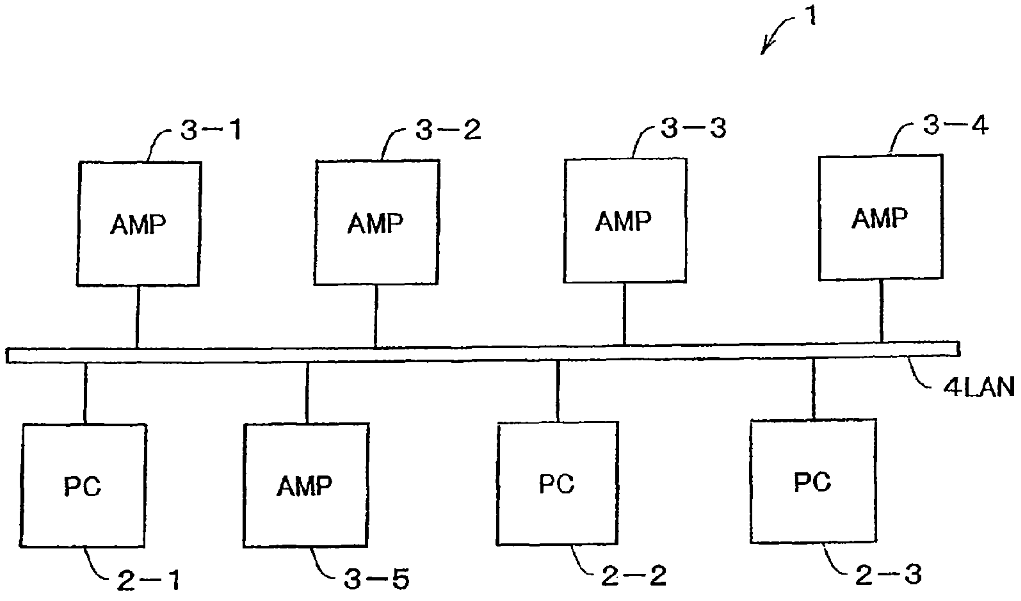
FIG. 1 is a block diagram showing an example general setup of an amplifier system according to an embodiment of the present invention.

FIG. 1 is a block diagram showing a general setup of an amplifier system according to an embodiment of the present invention. The amplifier system 1 shown in FIG. 1 includes a LAN (Local Area Network) 4 to which are connected, for example, three personal computers (hereinafter referred to as "PCs") 2-1, 2-2 and 2-3 and five amplifiers 3-1, 3-2, 3-3, 3-4 and 3-5. Communication control of the LAN 4 is performed, for example, by the Ethernet standard that is a communication control standard commonly used today. Each of the three amplifiers has amplifier manager software installed therein. With the amplifier managers activated on respective operating systems ((hereinafter referred to as "OSs") of the PCs 2-1-2-3, it is possible to monitor, via the LAN 4, operating states of the amplifiers 3-1-3-5 connected to the LAN 4 and remote-control the operation of the amplifiers 3-1-3-5 via the LAN 4. In this case, only one of the PCs which has acquired a right of control over an amplifier can become an amplifier control apparatus capable of remote-controlling the amplifiers, and the other PCs which have not acquired the right of control over the amplifier can only monitor the amplifier.

Sound signals are supplied to the amplifiers 3-1-3-5, connected to the LAN 4, via not-shown audio cables, and control information is communicated to the amplifiers 3-1-3-5 via the LAN 4. Let it be assumed that the sound signals supplied to the amplifiers 3-1-3-5 are mixed signals (i.e., mixing-processed) obtained by a mixer mixing sound signals supplied from a plurality of microphones installed in a concert hall, theater or the like. Further, speakers for audibly reproducing or sounding sound signals output from the amplifiers 3-1-3-5 are connected to individual channels of the amplifiers 3-1-3-5 via audio cables, and these speakers are installed distributively in the concert hall, theater or the like.

Figure 2:
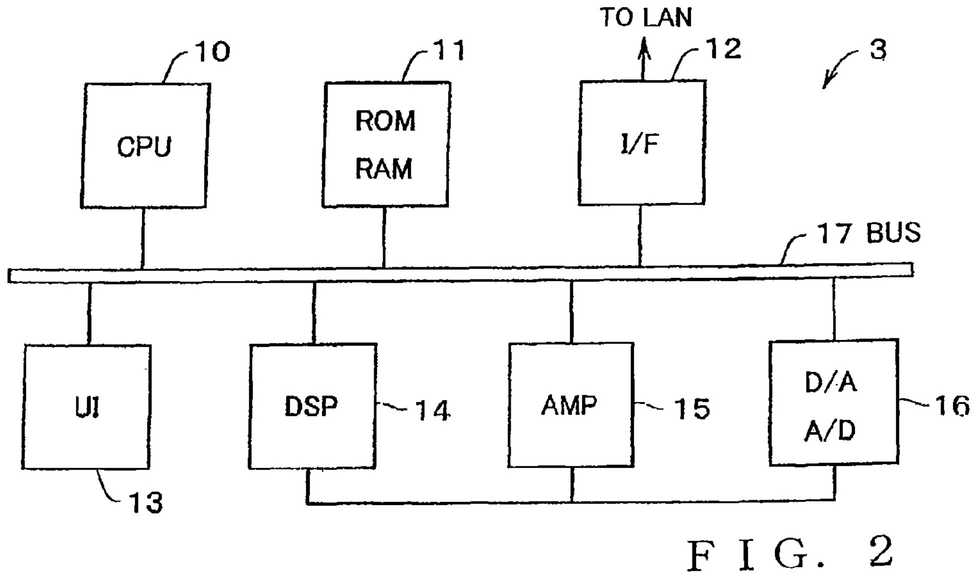
FIG. 2 is a block diagram showing an example construction of an amplifier in the amplifier system of the present invention.

The following paragraphs describe a construction of the amplifiers 3-1-3-5; however, because these amplifiers 3-1-3-5 are identical in construction, FIG. 2 shows in a block diagram the construction of a representative one 3 of the amplifiers 3-1-3-5.

In the amplifier 3 shown in FIG. 2, a CPU 10 not only controls all operations of the amplifier 3, but also executes operation software, such as an amplifier control program. ROM/RAM 11 comprises a ROM (Read-Only Memory) having stored therein the operation software, such as the amplifier control program, for execution by the CPU 10, and a RAM (Random Access Memory) having a working area for use by the CPU 10 and a storage area that stores device information, operation data and state data of the amplifier 3. Preferably, the ROM is a rewritable ROM, such as a flash memory, so as to permit rewriting of the operation software and thereby facilitate version upgrade of the operation software. I/F 12 is an Ethernet communication interface that is connected to the LAN 4 via a network communication cable (Ethernet cable). Via the I/F 12, the amplifier 3 is logically connected to other devices connected to the LAN 4. User interface (UI) 13 includes operating members (operators), such as an attenuator, for manipulating levels and output power of the amplifier 3, level meters and various indicators.

DSP (Digital Signal Processor) 14 is a signal processing section that performs signal processing, such as a compressor process, delay process, equalizer process, limiter process and high-pass filter, and level control on an input digital sound signal. AMP 15 is an electric power amplifier that power-amplifies the sound signal having been processed by the DSP 14, and the sound signal amplified by the AMP 15 is audibly reproduced via a speaker. The AMP 15 is, for example, a class-D amplifier. When an analog sound signal is input, a D/A & A/D unit 16 converts the analog sound signal into a digital sound signal to supply the converted digital sound signal to the DSP 14 and converts the digital sound signal, having been processed by the DSP 14, into a sound signal of an analog waveform to output the converted sound signal to the AMP 15. The aforementioned components 10-16 are connected to a bus 17.

Figure 3:
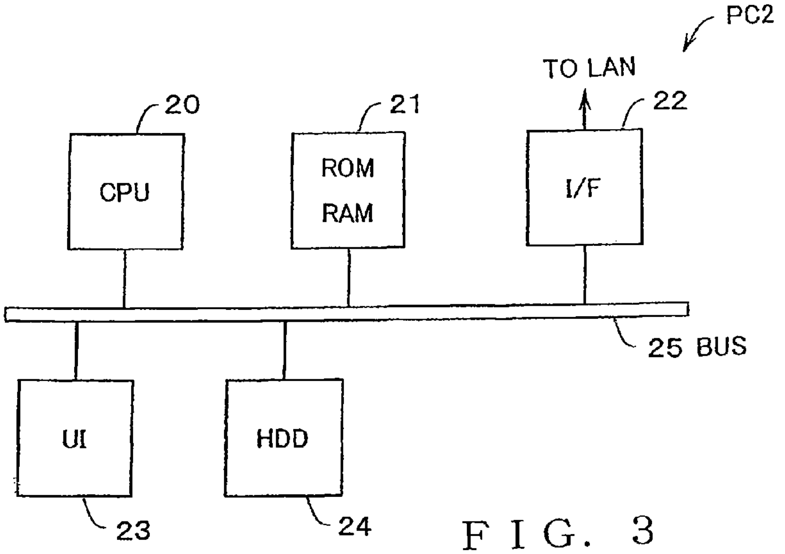
FIG. 3 is a block diagram showing an example construction of a PC (Personal Computer) as an amplifier control apparatus in the amplifier system of the present invention.

The following paragraphs describe a construction of the PCs 2-1-2-3; however, because these PCs 2-1-2-3 are identical in construction, FIG. 3 shows in a block diagram the construction of a representative one PC 2 of the PCs 2-1-2-3.

In the PC 2 shown in FIG. 3, a CPU 20 executes operation software, such as the OS and amplifier manager. ROM/RAM 21 comprises a ROM having stored therein the operation software, and a RAM having a working area for use by the CPU 20 and a storage area that stores various data, such as a current project. Preferably, the ROM is a rewritable ROM, such as a flash memory, so as to permit rewriting of the operation software and thereby facilitate version upgrade of the operation software. I/F 22 is an Ethernet communication interface that is connected to the LAN 4 via a network communication cable (Ethernet cable). Via the I/F 22, the PC 2 is logically connected to other devices connected to the LAN 4. User interface (UI) 23 includes operating members, such as a keyboard and mouse, and a display device for displaying various screens of the amplifier manager, etc. HDD (Hard Disk Drive) 24 is a large-capacity storage device storing various application programs, such as the amplifier manager, installed in the PC 2 and various data, such as a project library. The aforementioned various sections 20-24 are connected to a bus 25. The PC 2 is similar in construction to ordinary personal computers.

Figure 4:
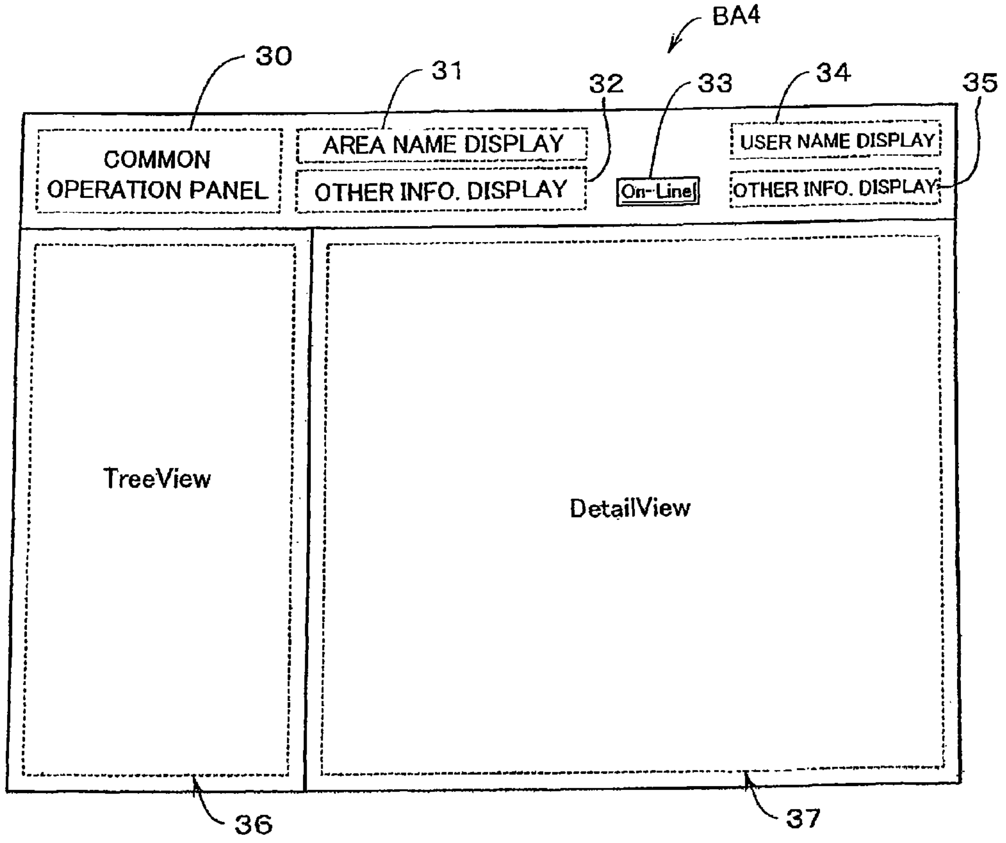
FIG. 4 is a diagram showing a basic screen displayed on a display device of the PC in the amplifier system of the present invention.

When states of the amplifiers 3-1-3-5 connected to the LAN 4 are to be monitored in the PC 2, the amplifier manager software is activated on the OS. Once the amplifier manager software is activated, the PC 2 opens a project file and loads the file into a current project area and inquires of the individual amplifiers to obtain state data indicative of current states of the amplifiers. Consequently, an initial basic screen BA4 as shown in FIG. 4 is displayed on the display device of the PC 2. As shown in FIG. 4, a common operation panel 30, area name display section 31, other information display sections 32 and 35, On-line button 33 to be operated for on-line connecting the PC 2 to the LAN network 4, and user name display section 34 are provided in an upper area of the basic screen BA4. Primary area of the basic screen BA4 is occupied by a Tree View (device tree display section) 36 for displaying the setup of the amplifier system 1 in a tree format and a Detail View 37 for displaying a detailed screen of an amplifier or group selected on the Tree View 36. In the illustrated example, the Tree View 36 is provided in a left area of the basic screen BA4, while the Detail View 37 is provided in a right area of the basic screen BA4.

Figure 5:
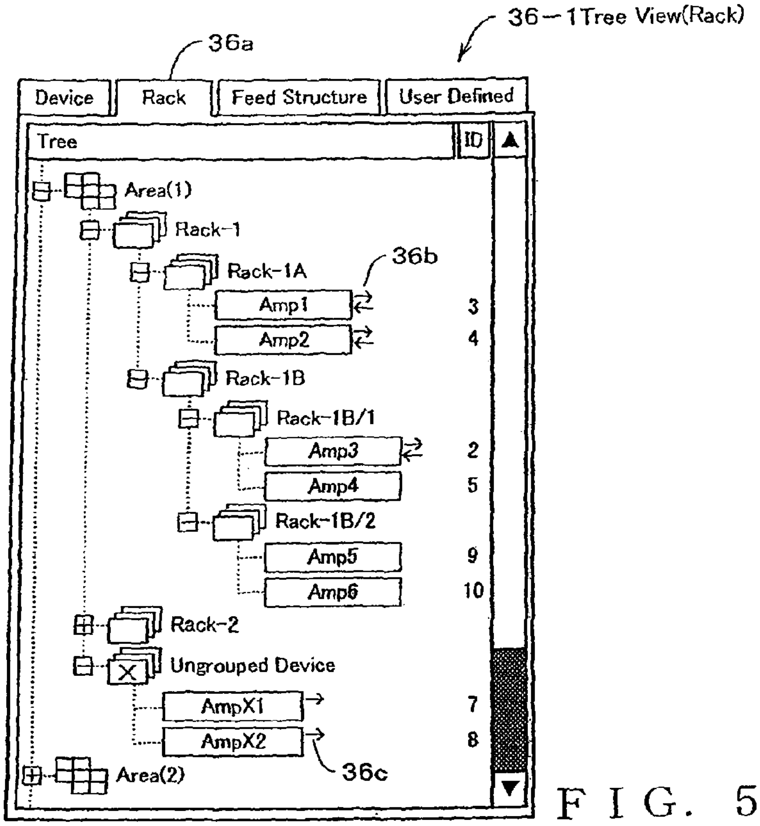
FIG. 5 is a diagram showing an example of a Tree View displayed on the basic screen in the amplifier system of the present invention.
Figure 6:
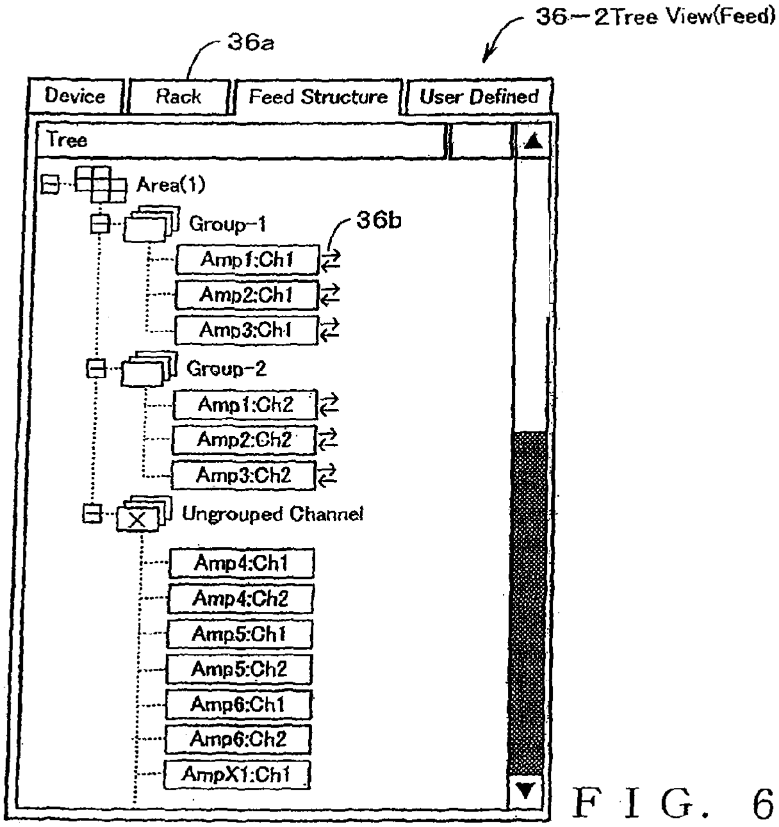
FIG. 6 is a diagram showing another example of the Tree View on the basic screen in the amplifier system of the present invention.

FIGS. 5 and 6 show detailed display screens of the Tree View 36. The Tree View 36 selectively displays the setup of the amplifier system 1, including the plurality of amplifiers, in tree formats based on different viewpoints or perspectives. In the illustrated example, there are provided four types of trees, i.e. Device tree based on the perspective of devices, Rack tree based on the perspective of racks on which the amplifiers are positioned, Feed Structure tree based on the perspective of channels of the amplifiers and User Defined tree based on user-defined perspectives. Any one of the trees, selected by clicking on any one of tabs 36*a*, is displayed on the Tree View 36.

Specifically, FIG. 5 shows a Tree View (Rack) 36-1 of the rack tree displayed in response to selection of the "Rack" tab 36*a*. On the Tree View (Rack) 36-1, there are displayed two area names, Area (1) and Area (2). First hierarchical level developed from Area (1) is divided into three groups, i.e. "Rack-1", "Rack-2" and "Ungrouped Device" comprising ungrouped amplifiers. Further, a second hierarchical level developed from the "Rack-1" group is divided into two groups "Rack-1A" group and "Rack-1B" group. Two amplifiers "Amp1" and "Amp2" belong to the "Rack-1A" group as shown in a third hierarchical level developed from the "Rack-1A" group. Third hierarchical level developed from the "Rack-1B" group is divided into two groups "Rack-1B/1" and "Rack-1B/2". Two amplifiers "Amp3" and "Amp4" belong to the "Rack-1B/1" group as shown in a fourth hierarchical level developed from the "Rack-1B/1" group. Two amplifiers "Amp5" and "Amp6" belong to the "Rack-1B/2" group as shown in a fourth hierarchical level developed from the "Rack-1B/2" group. Further, two amplifiers "AmpX1" and "AmpX2" are ungrouped as shown in a second hierarchical level developed from the "Ungrouped Device" group. Note that rightward and leftward arrows 36*b* attached to the ends of the amplifiers "Amp1", "Amp2" and "Amp3" indicate that these amplifiers are in an on-line state. The amplifiers "Amp4", "Amp5" and "Amp6" having no arrow 36*b* attached thereto are in an off-line state. Further, rightward arrows 36*c* attached to the ends of the amplifiers "AmpX1" and "AmpX2" indicate that these amplifiers are in an only-monitorable state. Further, once a mark "+" within "□" on the Tree View (Rack) 36-1 is clicked on, a hierarchical level immediately therebelow is developed and displayed in a tree format.

FIG. 6 shows a Tree View(Feed) 36-2 of a feed tree (Feed Structure) that is displayed in response to selection of the "Feed Structure" tab 36*a*. On the Tree View(Feed) 36-2, there is displayed an area name, Area (1). First hierarchical level developed from Area (1) is divided into three groups, i.e. "Group-1", "Group-2" and "Ungrouped Channel" comprising ungrouped amplifiers. Three channels, "Amp1:Ch1" (i.e., channel 1 of amplifier 1), "Amp2:Ch1" (i.e., channel 1 of amplifier 2) and "Amp3:Ch1" (i.e., channel 1 of amplifier 3), belong to the "Group-1" group as shown in a second hierarchical level developed from the "Group-1" group. Further, three channels, "Amp1:Ch2" (i.e., channel 2 of amplifier 1), "Amp2:Ch2" (i.e., channel 2 of amplifier 2) and "Amp3:Ch2" (i.e., channel 2 of amplifier 3), belong to the "Group-2" group as shown in a second hierarchical level developed from the "Group-2" group. "Amp4:Ch1", "Amp4:Ch2", "Amp5:Ch1", "Amp5:Ch2", "Amp6:Ch1", "Amp6:Ch2", "AmX1:Ch1", . . . are ungrouped channels as shown in a second hierarchical level developed from the "Ungrouped Channel" group. Note that rightward and leftward arrows 36*b* attached to the ends of the amplifiers "Amp1:Ch1", "Amp2:Ch1", "Amp3:Ch1", "Amp1:Ch2", "Amp2:Ch2" and "Amp3:Ch2" indicate that these amplifiers are in an on-line state. No mark is attached to the above-mentioned channels of the "Ungrouped Channel" group, which indicates these channels are in an off-on-line state.

Figure 7:
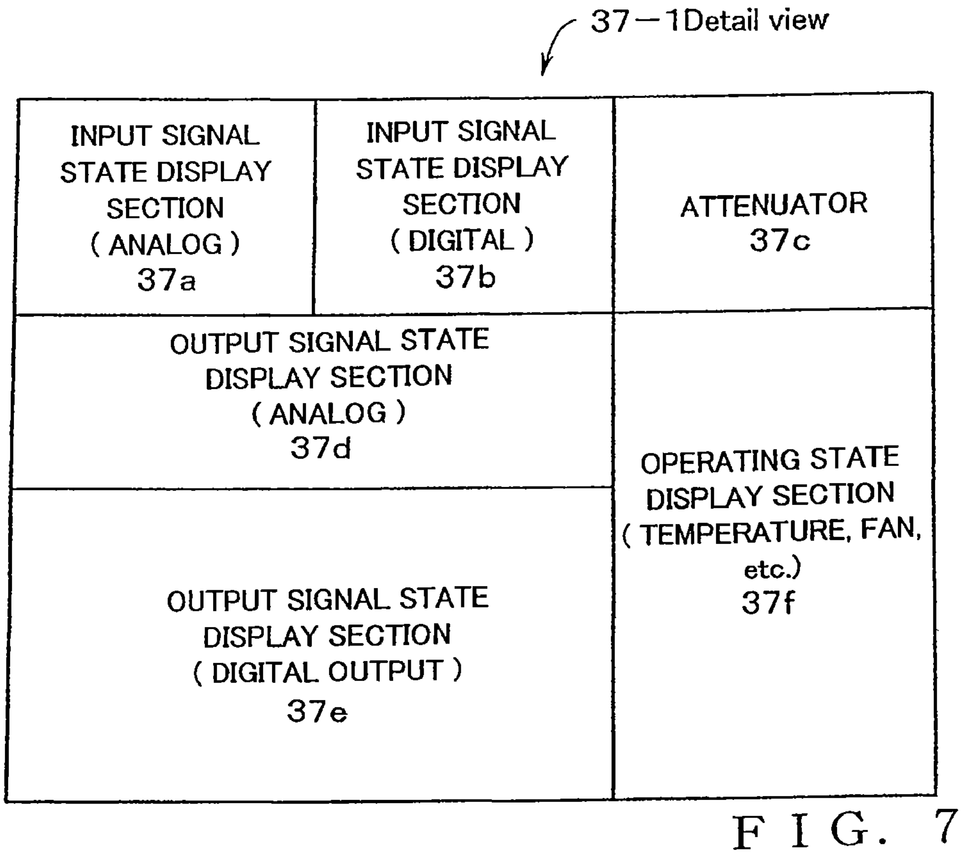
FIG. 7 is a diagram showing an example outline of a Detail View displayed on the basic screen in the amplifier system of the present invention.

The Detail View 37 displays a detail screen of an amplifier or group selected on the Tree View 36. More specifically, once any one of the amplifiers displayed on the Tree View 36 is selected, a detailed screen corresponding to the type of the selected amplifier is displayed on the Detail View 37. The amplifiers fall into two major types, i.e. low-order model and high-order model having a greater number of parameters of operation data per channel than the low-order model. Once any amplifier of the high-order model or any group including an amplifier of the high-order model is selected on the Tree View 36, a Detail View (amp/group detail screen) 37-1 is displayed as shown in FIG. 7. The Detail View (amp/group detail screen) 37-1 includes an input signal state display section (analog) 37*a*, input signal state display section (digital) 37*b*, attenuator section 37*c*, output signal state display section (analog) 37*d*, output state display section (digital output) 37*e*, and operating state display section (temperature, fan, etc.) 37*f*.

Input levels of analog input signals of the individual channels are displayed in the input signal state display section (analog) 37*a*, and levels of digital sound signals having been subjected to level control by faders of the individual channels are displayed in the input signal state display section (digital) 37*b*. Further, the faders, which are level operating (manipulating) members, of the individual channels are displayed in the attenuator section 37*c*, and output levels and output electric power of the individual channels to be provided to speakers and impedance of the speakers of the individual channels are displayed in the output signal state display section (analog) 37*d*. Further, a digital output level of each slot, to which an extension card is attachable, is displayed in the output state display section (digital output) 37*e*. Further, channel-by-channel heat sink temperatures and numbers of rotations of fans, power supply voltage and protection alert state are displayed in the operating state display section (temperature, fan, etc.) 37*f*.

Figure 8:
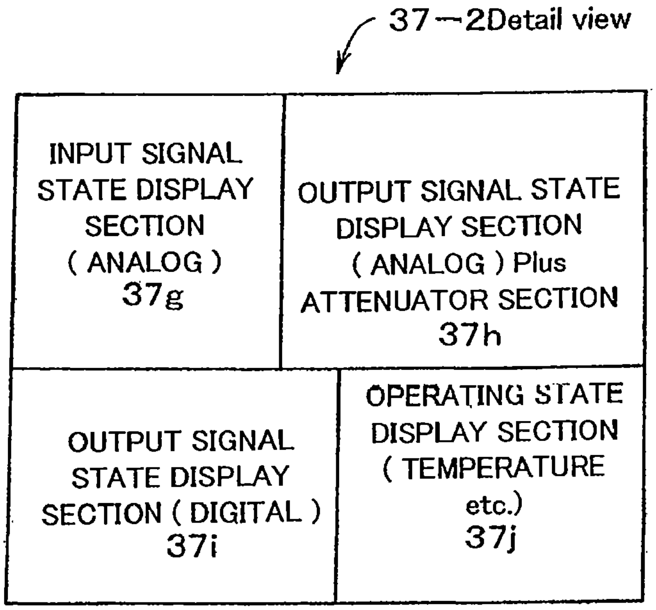
FIG. 8 is a diagram showing another example outline of the Detail View displayed on the basic screen in the amplifier system of the present invention.

Once any one of the amplifiers of the low-order model or any one of the groups consisting of only the amplifiers of the low-order model is selected on the Tree View 36, a Detail View (amp/group detail screen: low-order model) 37-2 is displayed as shown in FIG. 8. The Detail View (amp/group detail screen: low-order model) 37-2 includes an input signal state display section (analog) 37*g*, output signal state display section (analog) plus attenuator section 37*h*, output state display section (digital output) 37*i*, and an operating state display section (temperature etc.) 37*j*. Input levels of analog input signals of the individual channels are displayed in the input signal state display section (analog) 37*g*. Further, output electric power and faders, which are level operating members, of the individual channels are displayed in the output signal state display section (analog) plus attenuator section 37*h*, and output levels of the individual channels to be output to the speakers and impedance of the individual speakers are displayed in the output signal state display section (analog) 37*i*. Further, channel-by-channel heat sink temperature and protection alert state are displayed in the operating state display section (temperature etc.) 37*j*. As understood from the foregoing, the number of the display sections on the Detail View (amp/group detail screen: low-order model) 37-2 is smaller than that of the display sections on the Detail View (amp/group detail screen) 37-1.

Next, several specific examples of the Detail View 37 will be described. Here, parameters of operation data are displayed via display components called "elements" on the Detail View 37; namely, the Detail View 37 is constructed by arranging a plurality of types of elements at predetermined locations. In the following description, each stereo (i.e., two-channel) amplifier of the low-order model will be referred to as an amplifier of "type A", each stereo (i.e., two-channel) amplifier of the high-order model will be referred to as an amplifier of "type B", and each 4-channel amplifier of the low-order model will be referred to as an amplifier of "type C".

Figure 9:
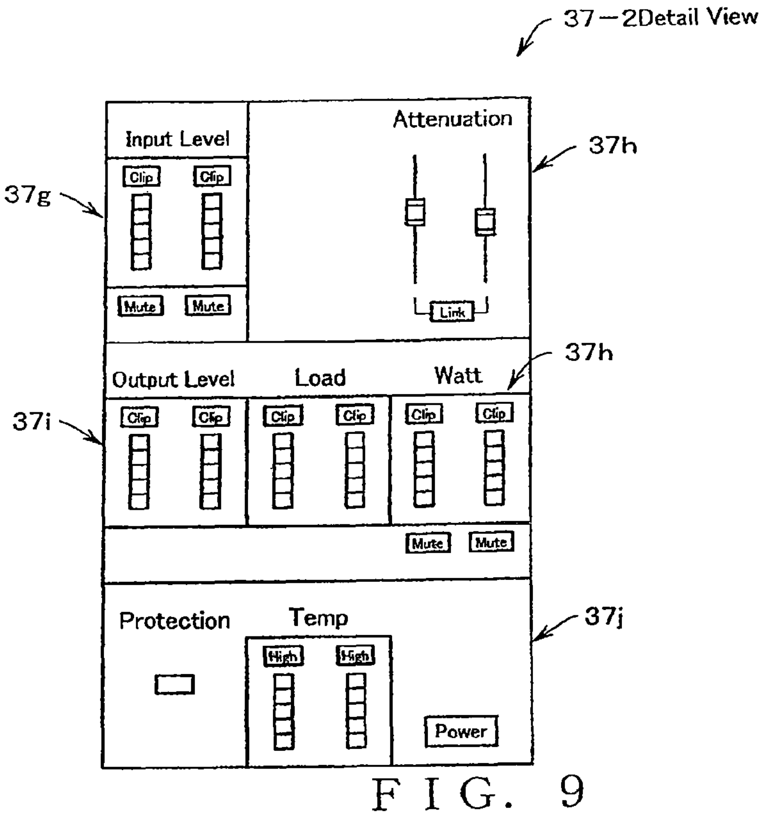
FIG. 9 is a diagram showing a specific example of the Detail View displayed on the basic screen in the amplifier system of the present invention.

FIG. 9 shows a specific example of an individual amplifier Detail View 37-2 displayed when a two-channel amplifier of type A has been selected on the Tree View (Rack) 36-1 or the like. On the individual amplifier Detail View 37-2 shown in FIG. 9, two level meter elements of Input Level, provided for the two channels to indicate input levels of input (analog) signals of the two channels of the amplifier in question, are displayed in the input signal state display section (analog) 37*g*. Clip element is provided immediately above each of the level meter elements for making an alert display when the input signal has been clipped. Further, a Mute element is provided for each of the level meter elements for muting the corresponding channel when the Mute element has been turned on.

The output signal state display section (analog) plus attenuator section 37*h* is provided in two vertically-divided areas. In the upper area, two fader elements, which are Attenuation level operating members, are displayed to indicate, by positions of knobs, values of respective output sound volume levels (each of which is a parameter included in the operation data for controlling a sound volume) of the two channels of the amplifier in question. The output sound volume level of each of the channels is variable by movement of the corresponding knob in the vertical (up-down) direction. Link element is provided beneath the fader elements such that turning-on of the Link element can change the output sound volume levels of the two channels in an interlinked manner. In the lower area of the output signal state display section 37*h*, two Watt level meter elements are displayed to indicate in watt respective output electric power (analog) levels of the two channels of the amplifier in question. Clip element is provided immediately above each of the Watt level meter elements for making an alert display when the output electric power has been clipped.

In the output signal state display section (digital) 37*i*, two lever meter elements of Output Level are displayed to indicate respective output signal (digital) levels of the two channels of the amplifier in question, and two level meter elements of Load are displayed to indicate in Ω impedance of speakers connected to the two channels. Clip element is provided immediately above each of the level meter elements for making an alert display when the output signal has been clipped or the impedance has fallen below a lower limited value. Further, in the operating state display section (temperature etc.) 37*j*, a Protection element is provided for making an alert display when abnormality has occurred in the amplifier in question, and two level meter elements of Temp are displayed to indicate temperatures of heat sinks of the two channels. Further, a Power element is provided for turning on/off the power supply. Further, a High element is provided immediately above each of the Temp level meter elements for making an alert display when an upper limit temperature has been exceeded.

For each of the Mute and Power elements, which are ON/OFF switches, on the above-described individual amplifier Detail View 37-2, a corresponding ON/OFF parameter value (0=OFF or 1=ON) is also displayed, which alternately toggles between ON and OFF states each time the element is operated. The Mute element is displayed in an ON-state indicating style (e.g., in red color) when it is turned on, and displayed in an OFF-state indicating style (e.g., in gray color) when it is turned off. Further, the Power element is displayed in an ON-state indicating style (e.g., in blue color) when it is turned on, and displayed in an OFF-state indicating style (e.g., in gray color) when it is turned off. Further, the alert displays of the Clip, Protection and High elements are made, for example, in red color, while non-alert displays of the Clip, Protection and High elements are made, for example, in green color. The levels, impedance, temperatures, etc. displayed by the aforementioned level meter elements are among state data (parameters) indicative of states of the amplifier in question. Further, the output sound volume levels (decibel values) indicated by the fader elements and mute, power supply, etc. indicated by the ON/OFF elements are among operation data (parameters) for controlling the behavior of the amplifier in question. The alert displays indicated by the various elements are displays of alert events.

Figure 10:
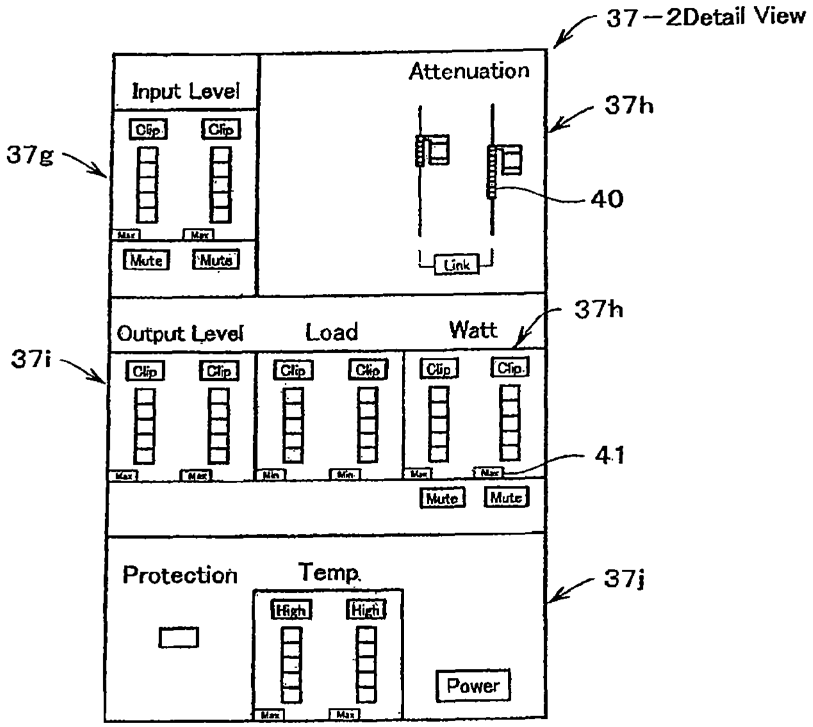
FIG. 10 is a diagram showing another specific example of the Detail View displayed on the basic screen in the amplifier system of the present invention.

FIG. 10 shows a specific example of the amplifier group Detail View 37-2 displayed when an amplifier group consisting of only a plurality of two-channel amplifiers of type A (i.e., an amplifier group to which only a plurality of two-channel amplifiers of type A belong) has been selected on the Tree View (Rack) 36-1 or the like.

On the amplifier group Detail View 37-2 shown in FIG. 10, two level meter elements of Input Level are displayed in the input signal state display section (analog) 37*g* in corresponding relation to the left and right channels, and, for each of the channels, an input level of a maximum or minimum value is detected, in accordance with the Max/Min setting made via the setting display element 41, from among input signals (analog) of the respective corresponding (i.e., left or right) channel in the amplifiers belonging to the group, so that the detected input level is displayed. In the illustrated example, “Max” is set for each of the two channels via the setting display element 41, and, via a level meter element of each of the channels, a maximum value of the input signal levels of the channel in question of the amplifiers belonging to the group is displayed. Clip element is provided immediately above the level meter element of each of the channels for making an alert display when the analog input signal has been clipped. Further, a Mute element is provided for each of the channels for setting and displaying a mute state of that channel.

The output signal state display section (analog) plus attenuator section 37*h* is provided in two vertically-divided areas. In the upper area, two fader elements, which are Attenuation level operating members, are displayed to indicate, as operating positions of knobs, maximum and minimum values of output sound volume levels of the two channels of the individual amplifiers belonging to the group. In the illustrated example, the maximum and minimum values of the output sound volume levels of the two channels of the individual amplifiers belonging to the group are indicated by band-shaped elements 40 of the fader elements. Namely, the maximum value is indicated by the uppermost-end position of the band-shaped element 40, while the minimum value is indicated by the lowermost-end position of the band-shaped element 40. Alternatively, the maximum and minimum values may be displayed indicated in numerical values. Further, by vertically moving the knob, the output sound volume levels of the corresponding channel of the individual amplifiers belonging to the group can be collectively changed while still retaining relative relationship among the output sound volume level values. In this case, once the output sound volume level of one of the channels of any one of the amplifiers belonging to the group reaches an upper limit of a settable range, the output sound volume level can no longer be made greater even if the fader element has not yet reached the maximum value position. Similarly, once the output sound volume level of one of the channels in any one of the amplifiers belonging to the group reaches a lower limit of the settable range, the output sound volume level can no longer be made smaller even if the fader element has not yet reached the minimum value position. Link element is provided beneath the fader elements such that turning-on of the Link element can change the two channels in an interlinked manner.

Because, as noted above, the range of the knob of each of the fader elements corresponds to the maximum and minimum values of the levels set via the level operating members in the individual amplifiers belonging to the group, the provision of the fader element including the band-shaped element 40 permits confirmation of the setting of the sound volume operator of each of the amplifiers belonging to the group. Further, operation of any one of the fader elements performed in any one of groups in a selected tree is reflected and displayed in groups of other trees.

In the lower area of the output signal state display section (analog) plus attenuator section 37*h*, two Watt level meter elements are displayed, and an output electric power level of a maximum or minimum value is detected, in accordance with the Max/Min setting made via the setting display element 41, from among values respective output electric power (analog) levels of the corresponding channel of the amplifiers belonging to the group, so that the detected electric power level is indicated in watt. In the illustrated example, “Max” is set for each of the two channels via the setting display elements 41, and, via a level meter element of each of the channels, a maximum output electric power level of the corresponding channel of the amplifiers belonging to the group is displayed. Mute element is provided for each of the channels for setting and displaying a mute state of that channel in each of the amplifiers belonging to the group. Clip element is provided immediately above the level meter element of each of the channels for making an alert display when the output electric power has been clipped.

In the output signal state display section (digital) 37*i*, two lever meter elements of Output Level are displayed, and an output signal (digital) level of the maximum or minimum value is detected, in accordance with the setting made via the setting display elements 41, from among values output signal (digital) levels of the respective corresponding channel of the amplifiers belonging to the group. In the illustrated example, “Max” is set for each of the two channels via the setting display elements 41, so that a maximum output signal level among signal levels of the respective corresponding channel of the amplifiers belonging to the group is displayed via the level meter element of the channel. Further, two level meter elements indicative of Load impedance are provided in corresponding relation to the channels, so that a maximum or minimum value of impedance is detected, in accordance with the setting made via the setting display elements 41, from among speaker impedance values of the respective corresponding channel of the amplifiers belonging to the group and displayed in ohm (Ω). In the illustrated example, “Min” is set for each of the two channels, and, for each of the channels, minimum impedance providing a maximum load among the amplifiers belonging to the group is detected and displayed via the level meter element corresponding to that channel. Further, a Clip element is provided immediately above each of the level meter elements in the display section 37*i* for making an alert display when the output signal has been clipped or the impedance has fallen below a lower limited value.

Further, in the operating state display section (temperature etc.) 37*j*, a Protection element is provided for making an alert display when abnormality has occurred in any of the amplifiers belonging to the group in question, and two level meter elements of Temp are provided. For each of the channels, temperature of a maximum or minimum value is detected, in accordance with the Max/Min setting made via the setting display element 41, from among temperature values of the amplifiers belonging to the group so that the detected maximum or minimum temperature value is displayed. In the illustrated example, “Max” is set for each of the two channels via the setting display element 41, and the maximum temperature for each of the channels in the amplifiers belonging to the group is displayed in the level meter element of that channel. Further, a Power element is provided for turning on/off the power supply to the amplifiers. Further, a High element is provided immediately above each of the Temp level meter elements of the two channels for making an alert display when an upper limit temperature has been exceeded.

ON/OFF parameters are also displayed via the Mute element and Power elements, each of which is an ON/OFF switch, in the amplifier group Detail View 37-2. Each of the Mute element and Power element toggles in such a manner that all ON/OFF states of the corresponding channel in the amplifiers belonging to the group collectively switch to the opposite states in response to each operation by the user. For example, if the corresponding ON/Off parameter of the channel in question is in the ON state in all of the amplifiers belonging to the group, then the Mute element is displayed as ON (e.g., displayed in red color), while, if the corresponding ON/Off parameter of the channel in question is in the OFF state in all of the amplifiers belonging to the group, then the Mute element is displayed as OFF (e.g., displayed in gray color). Further, if the corresponding ON/Off parameter of the channel in question is in the ON state in a portion (i.e., one or more but not all) of the amplifiers and in the OFF state in the remaining portion of the amplifiers, then the Mute element is displayed in an ON-OFF mixed display style (e.g., in yellow color). Note that, once the Mute element is operated when the corresponding ON/OFF parameter of the channel in question is in the ON state in a portion of the amplifiers and in the OFF state in the remaining portion of the amplifiers, the Mute element switches to the ON state to mute the channel in question in all of the amplifiers, after which the Mute element toggles in response to each operation. Further, if the corresponding ON/OFF parameter is in the ON state in all of the amplifiers belonging to the group, then the Power element is displayed as ON (e.g., displayed in blue color), while, if the corresponding ON/OFF parameter is in the OFF state in all of the amplifiers belonging to the group, then the Power element is displayed as OFF (e.g., displayed in gray color). Further, if the Power ON/OFF parameter is in the ON state in a portion of the amplifiers and in the OFF state in the remaining portion of the amplifiers, then the Power element is displayed in an ON-OFF mixed display style (e.g., in yellow color). Note that, once the Power element is operated when the corresponding ON/Off parameter is in the ON state in a portion of the amplifiers and in the OFF state in the remaining portion of the amplifiers, all of the amplifiers belonging to the group are placed in the OFF state, after which the Power element toggles in response to each operation.

Further, for each of the Clip element and High element, when no alert event exists in the corresponding channel in all of the amplifier belonging to the group, the Clip or High element is displayed in a "no alert" indicating style (e.g., displayed in green color). When an alert event has occurred in the channel in question in a portion of the amplifiers, the Clip or High element is displayed in a "partial alert" indicating style (e.g., displayed in orange color). Further, when an alert event has occurred in the channel in all of the amplifiers, the Clip or High element is displayed in a "full alert" indicating style (e.g., displayed in red color). Further, when no alert event exists in all of the amplifiers, the Protection is displayed in a "no alert" indicating style (e.g., displayed in green color). When an alert event has occurred in a portion of the amplifiers, the Protection element is displayed in a "partial alert" indicating style (e.g., displayed in orange color). Further, when an alert event has occurred in all of the amplifiers, the Protection element is displayed in a "full alert" indicating style (e.g., displayed in red color).

Figure 12:
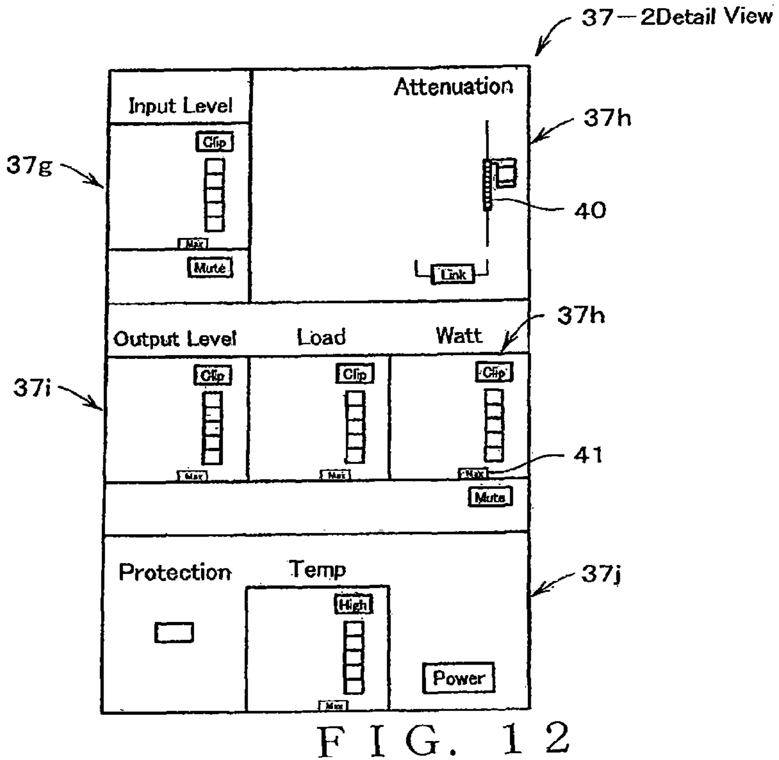
FIG. 12 is a diagram showing still another specific example of the Detail View displayed on the basic screen in the amplifier system of the present invention.

FIG. 12 shows a specific example of a channel group Detail View 37-2 displayed when a channel group consisting only of respective corresponding channel (R channel in the illustrated example) of a plurality of two-channel amplifiers of type A is selected on the Tree View (Feed) 36-2 or the like.

More specifically, the channel group Detail View 37-2 shown in FIG. 12 is displayed in response to selection of a channel group consisting only the respective R (Right) channels of the two-channel amplifiers of type A. In each of display sections 37*g*-37*j* of the channel group Detail View 37-2, elements for displaying operation data of the respective L (Left) channel that does not belong to the selected channel group are displayed as invalid (i.e., displayed in an invalid display state). Namely, in the input signal state display section (analog) 37*g*, there are displayed only a level meter element of Input Level for the R channel including a setting display element 41 and Clip element, and a Mute element for the R channel. Further, in the output signal state display section (analog) plus attenuator section 37*h*, there are displayed only a level operating member of Attenuation for the R channel including a band-shaped element 40, a level meter element of Watt for the R channel including a setting display element 41, and a Mute element for the R channel.

In the output signal state display section (digital) 37*i*, there are displayed only a level meter element of Output Level for the R channel including a setting display element 41 and Clip element, and a level meter element of Load for the R channel including a setting display element 41 and Clip element. Further, in the operating state display section (temperature etc.) 37*j*, there are displayed an amplifier Protection element, a level meter element of Temp for the R channel including a setting display element 41 and High element, and an amplifier Power element. Functions of the individual elements of the display sections 37*g*-37*j* are the same as described above and thus will not be described here. However, if the Power element is operated to collectively turn off all of the amplifiers having their respective R channels belonging to the channel group in question, the respective L channels of these amplifiers that may belong to another channel group would also be turned off. Thus, the Power element of FIG. 12 is kept in an inoperable state. Further, whereas the invalid elements are not visibly displayed in the Detail View 37-2 shown in FIG. 12, these invalid elements may be displayed in gray color.

Figure 13:
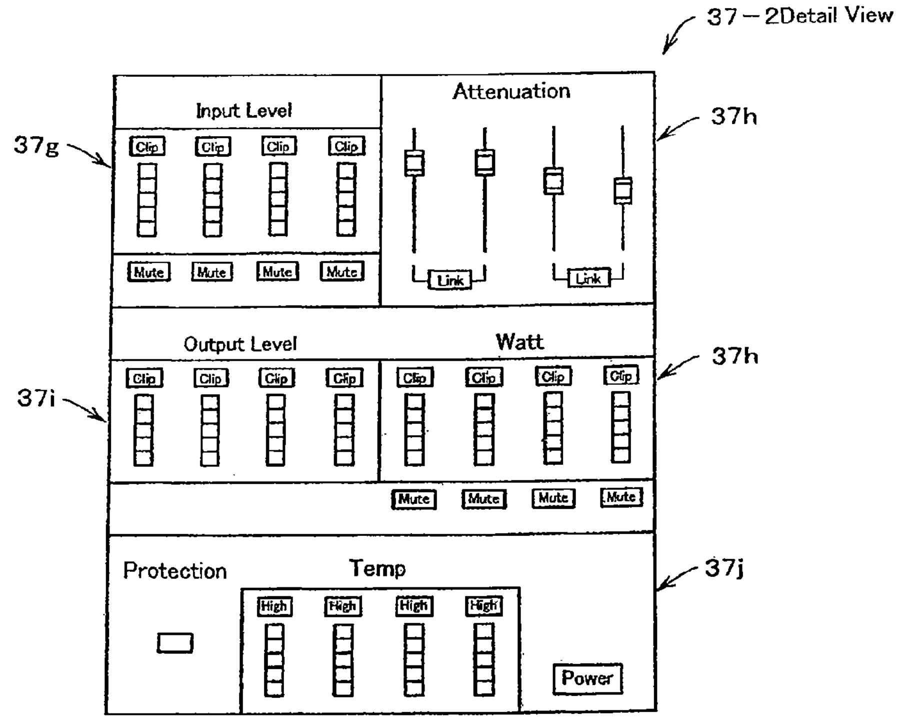
FIG. 13 is a diagram showing still another specific example of the Detail View displayed on the basic screen in the amplifier system of the present invention.

Although the foregoing description has considered only two-channel amplifiers, the instant embodiment is also applicable to four-channel amplifiers. Here, the type of four-channel amplifiers of the low-order model will be referred to as type C". FIG. 13 shows a specific example of an individual four-channel amplifier Detail View 37-2 displayed in response to selection of a four-channel amplifier of type C. The amplifier Detail View 37-2 shown in FIG. 13 is different from the amplifier Detail View 37-2 shown in FIG. 9 in that it is designed for four-channel amplifiers. Namely, in an input signal state display section (analog) 37*g* of the individual four-channel amplifier Detail View 37-2 shown in FIG. 13, there are displayed four level meter elements of Input Level provided for the four channels and including respective Click elements and Mute elements provided for the four channels. Further, in an output signal state display section (analog) plus attenuator section 37*h*, there are displayed level operating members of Attenuation provided for the four channels, including respective Clip elements and operable to interlink every two channels of the four channels, level meter elements of Watt provided for the four channels and including respective Clip elements, and Mute elements for the four channels.

Displayed in an output signal state display section (digital) 37*i* of the individual four-channel amplifier Detail View 37-2 are four lever meter elements of Output Level provided for the four channels and including respective Clip elements. In an operating state display section (temperature etc.) 37*j*, there are displayed an amplifier Protection element, four level meter elements of Temp provided for the four channels and including respective High elements, and an amplifier Power element. Functions of the individual elements of the display sections 37*g*-37*j* of the individual four-channel amplifier Detail View 37-2 are the same as described above and thus will not be described here. Further, a Detail View 37-2 of a group consisting only of amplifiers of type C and Detail View 37-2 of a group consisting of amplifiers of type C and type A are not illustrated and described in detail here because these Detail Views 37-2 are different from the individual four-channel amplifier Detail View 37-2 of the type-C amplifier shown in FIG. 13 only in the shape of the fader element of Attenuator 37*h* and in that these group Detail Views 37-2 have setting display elements attached to individual level meter elements. Such relationship is the same as the relationship between the Detail View 37-2 of the amplifier of type A and the Detail View 37-2 of the group consisting only of amplifiers of type A. Namely, as the fader elements of these groups, fader elements with band-shaped elements 40 as shown at 37*h* in FIG. 10 are displayed in place of the ordinary fader elements displayed at 37*h* in FIG. 13.

Figure 14:
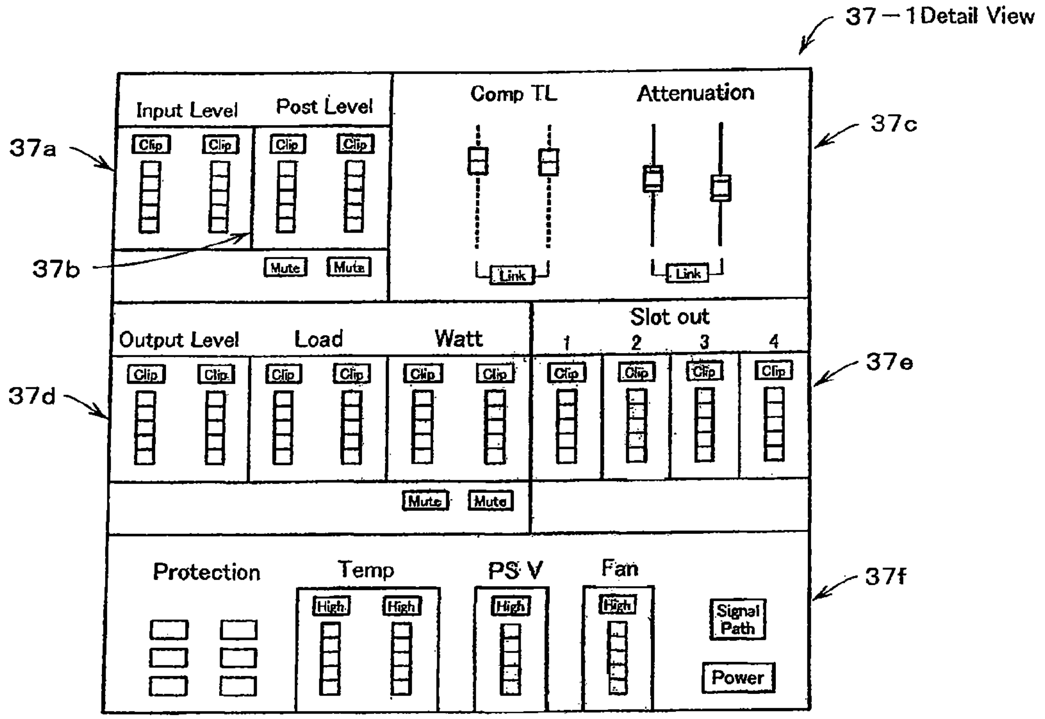
FIG. 14 is a diagram showing still another specific example of the Detail View displayed on the basic screen in the amplifier system of the present invention.

FIG. 14 shows a specific example of an individual amplifier Detail View 37-1 displayed when a two-channel amplifier of type B is selected on the Tree View (Rack) 36-1 or the like. As compared to the individual amplifier Detail View 37-2 for the low-order model shown in FIG. 9, the individual amplifier Detail View 37-1 shown in FIG. 14 has an increased number of display sections for the high-order model so that an increased number of parameters of operation data can be displayed. Namely, in an input signal state display section (analog) 37*a* of the individual amplifier Detail View 37-1 of FIG. 14, there are displayed two level meter elements of Input Level provided for the two channels and including respective Clip elements, and two Mute elements provided for the two channels. In an input signal state display section (digital) 37*b*, there are displayed two level meter elements of Post Level provided for the two channels to display levels of digital sound signals having been controlled via level operating members and including respective Clip elements. In an attenuator section 37*c*, there are displayed fader elements of Comp TL provided for the two channels to display threshold levels of compressors and including respective Link elements.

Further, in an output signal state display section (analog) 37*d* of the individual amplifier Detail View 37-1, there are displayed two lever meter elements of Output Level provided for the two channels and including respective Clip elements, two lever meter elements of Load provided for the two channels and including respective Clip elements, and two Mute elements for the two channels. Further, in an output state display section (digital output) 37*e*, there are displayed level meter elements of Slot out provided for four slots to indicate a digital output level for each of slots to which extension cards are attachable, and including respective Clip elements. In an operating state display section (temperature, fan, etc.) 37*f*, there are displayed Protection elements provided for the two channels to make alert displays of limiter, mute, shutdown, clip limiter, etc., level meter elements of Temp provided for the two channels and including respective High elements, a PS V element provided for indicating a power supply voltage and including a High element, a FAN element provided for indicating the number of rotations of a cooling fan and including a High element, a Signal Path element where is opened an editing screen of signal processing performed, in response to switch operation, by the DSP 14 in a signal path from an input to a point immediately preceding a fader, and a Power element for tuning on/off the power supply to the amplifier. Note that functions of other elements, not shown and described in relation to the individual display sections 37*a*-37*f* of the Detail View 37-1, are the same as those in the other Detail Views described above and thus description about the functions of the other elements are omitted here. Further, a Detail View 37-2 of a group consisting only of amplifiers of type B and Detail View 37-2 of a group consisting of amplifiers of type B and type A are not illustrated and described in detail here because these Detail Views 37-2 are different from the Detail View 37-2 of the type-B amplifier only in the shape of the fader elements of attenuator elements 37*h* and in that these Detail Views 37-2 have setting display elements attached to individual level meter elements.

Figure 15:
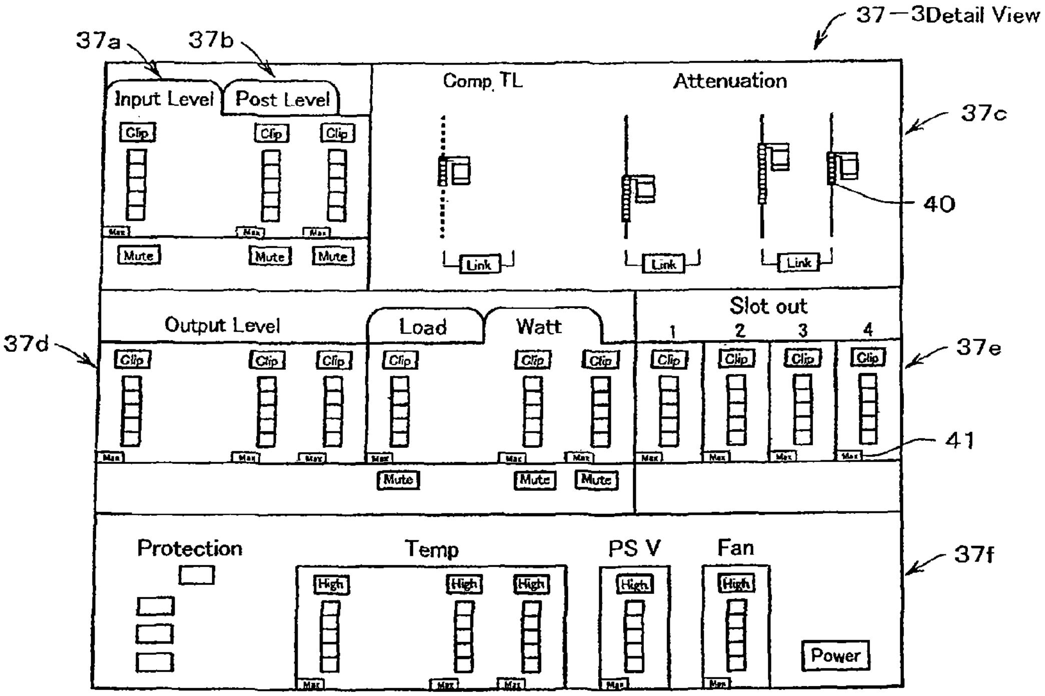
FIG. 15 is a diagram showing still another specific example of the Detail View displayed on the basic screen in the amplifier system of the present invention.

Group selected on the Tree View (Rack) 36-1 or the like may sometimes include amplifiers of type A, type B and type C. In this case, display sections capable of displaying parameters of operation data of all of the amplifiers belonging to the selected group will be displayed on the Detail View 37. FIG. 15 shows an example of a channel group Detail View 37-3 displayed in response to selection, on the Tree View (Rack) 36-1 or the like, of a group including amplifiers of type A, type B and type C. In this case, the channel group includes at least a first channel of a type-B amplifier and third and fourth channels of a type-C amplifier, but it does not include respective second channels of type-A, type-B and type-C amplifiers. Further, the channels displayed on the Detail View 37-3 are three channels, i.e. first, third and fourth channels, with the second channel omitted. Further, because the display screen of the Detail View 37 is limited in size, parameters of operation data that can not be displayed on one screen is allowed to be displayed on one or more other screens through switching operation by a tab.

Namely, on the Detail View 37-3, there are provided tabs of an input signal state display section (analog) 37*a* and input signal state display section (digital) 37*b*. Level meter elements of Input Level for the three channels including respective Clip elements and setting display elements, and Mute elements for the three channels are displayed once the tab of the input signal state display section (analog) 37*a* is selected. Further, although not shown, level meter elements of Post Level for the three channels including respective Clip elements, and Mute elements for the three channels are displayed once the tab of the input signal state display section (digital) 37*b* is selected. In an attenuator section 37*c* of FIG. 15, there are displayed a fader element of Comp TL provided for the first channel and including a band-shaped element 40 for displaying a threshold level of a compressor, and fader elements, which are level operating members of Attenuation provided for the three channels, including respective Link elements and band-shaped elements 40. Further, because the third and fourth channels are of the type-C amplifier and not subjected to signal processing by the DSP 14, fader elements of Comp TL for the third and fourth channels are not displayed.

In an output signal state display section (analog) 37*d* of the Detail View 37-3, there are displayed level meter elements of Output Level provided for the three channels and including respective Clip elements and setting display elements 41, as well as tabs “Load” and “Watt”. Once the “Load” tab is selected, level meter elements of Load provided for the three channels and including respective Clip elements and setting display elements 41 are displayed together with Mute elements for the three channels. Once the “Watt” tab is selected, on the other hand, level meter elements of Watt provided for the three channels and including respective Clip elements and setting display elements 41 are displayed together with Mute elements for the three channels, although not particularly shown. Further, displayed in an output signal state display section (digital output) 37*e* are level meter elements of Slot Level provided for the three channels and including respective Clip elements and setting display elements 41. Furthermore, displayed in an operating state display section (temperature, fan, etc.) 37*f* are: Protection elements provided for the first channel of type-A and type-B amplifiers to make alert displays of limiter, mute, shutdown, clip limiter, etc.; level meter elements of Temp provided for the three channels and including respective High elements and setting display element 41; a PS V element provided for indicating a power supply voltage and including a High element and setting display element 41; a FAN element provided for indicating the number of rotations of the cooling fan and including a High element and setting display element 41; and a Power element for tuning on/off the power supply to the amplifiers.

Note that functions of other elements, not shown and described in relation to the individual display sections 37*a*-37*f* of the Detail View 37-3, are the same as those of the corresponding elements in the other Detail Views described above and thus description about the functions of the other elements are omitted here. However, the type-A amplifier does not have all of the parameters possessed by the type-B amplifier, and thus, in each level meter element, which includes the setting display element 41 and which is displayed only in the type-B amplifiers, a maximum value or minimum value is detected, in accordance with the Max/Min setting made via the setting display element 41, from among values of the respective corresponding channel of the type-B amplifiers, and the detected maximum value or minimum value is displayed. Further, in each level meter element, which includes the setting display element 41 and which is displayed in both of the type-B and type-A amplifiers, a maximum value or minimum value is detected, in accordance with the setting made via the setting display element 41, from among values of the respective corresponding channel of all of the amplifiers, and the detected maximum value or minimum value is displayed. Further, in the case where the number of channels is three or over, in each level meter element including the setting display element 41, a maximum value or minimum value is detected, in accordance with the setting made via the setting display element 41, from among values of a channel, other than the first and second channels, of the amplifiers having such an other channel, and the detected maximum value or minimum value is displayed. If the Power element is operated to collectively turn off all of the amplifiers having any of the channels belonging to the channel group, the other channels that may belong to one or more other channel groups would also be turned off. Thus, the Power element is kept in an inoperable state. Further, no Signal Path element is displayed on the Detail View 37-3.

Figure 11:
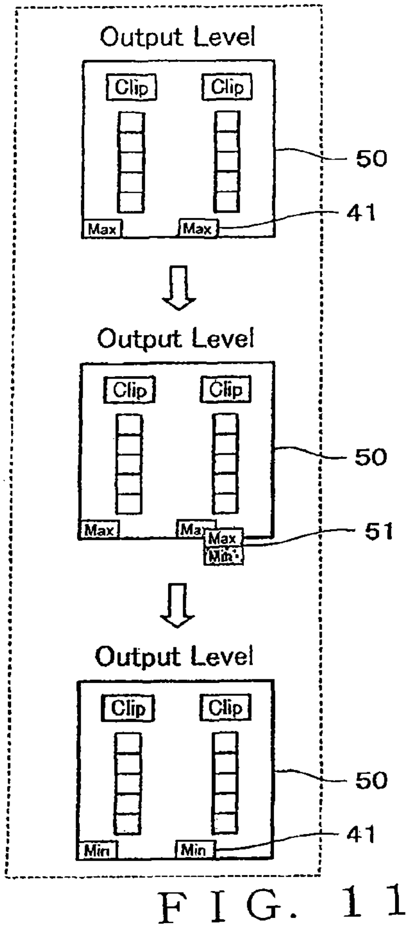
FIG. 11 is a diagram showing how the Detail View is operated on the basic screen in the amplifier system of the present invention.

In each of the level meter elements for displaying level parameters on the aforementioned amplifier group and channel group Detail Views 37, a maximum or minimum parameter value is detected, in accordance with the setting made via the setting display element 41, from among values of the channel in question belonging to the group is displayed. In FIG. 11, there is shown setting change operation for changing the selective setting of a maximum (max) or minimum (Min) value as a parameter value to be displayed in the setting display element 41. More specifically, FIG. 11 shows how the selective setting of the level meter element of Output Level 50 is changed from the maximum (max) value to the minimum (Min) value. In the level meter element of Output Level 50 shown in an uppermost section FIG. 11, the setting display element 41 is set at "Max", and thus, a maximum parameter value will be displayed in the level meter element of the channel in question. Once the setting display element 41 is clicked on, a menu 51 for selecting "Max" or "Min" is opened as shown in a middle section of FIG. 11. If "Min" is selected in the menu 51, the setting of the setting display element 41 is changed to "Min" as shown in a lowermost section FIG. 11, so that a minimum parameter value of the level meter element of Output Level 50 will be displayed in the level meter element of the channel in question.

The Max/Min setting can be made different among amplifier or channel groups. Namely, even for a same given tree, the Max/Min setting can be made different between a group of one hierarchical level and a group of another hierarchical level lower than the one hierarchical level. For different trees, the Max/Min setting can of course be performed independently for each of the trees even if one or more same groups exist redundantly in the trees.

On the Detail View 37-3 shown in FIG. 15, the first channel of the type-B amplifiers and the third and second channels of the type-C amplifiers belong to the selected channel group, as noted above. However, if the second channel of the type-B amplifiers too belongs to the selected channel group, not only level meter elements for the second channel are added to and displayed in the display sections 37*a*, 37*b* and 37*d*, but also fader elements of Comp TL and level operating member for the second channel are added to and displayed in the display section 37*c*. Further, a Protection element and level meter element of Temp for the second channel are added to and displayed in the operating state display section (temperature, fan, etc.) 37*f*.

Figure 16:
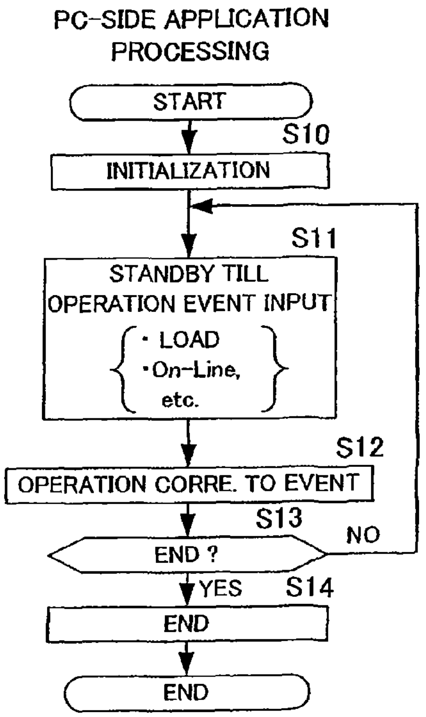
FIG. 16 is a flow chart of PC-side application processing performed in the PC in the amplifier system of the present invention.

FIG. 16 is a flow chart of PC-side application processing performed in the PC 2.

Once the amplifier manager, which is PC-side application software, is activated on the OS in the PC 2, the PC-side application processing is started up. First, at step S10, various initialization operations are performed so that a basic screen BA4 is displayed on the display device of the PC 2 and the working area and current project area are set in the RAM. After that, the PC-side application processing is placed in a standby state, at step S11, until an operation event is input. The "operation event" is an event indicating that the user has operated any one of operating members UI23 to manipulate any of various elements displayed in the basic screen BA4. Examples of the operation event include an operation event for loading a project file, an operation event for operating the On-line button 33, etc. Once an operation event is detected, the processing proceeds to step S12, where an operation corresponding to the operation event is performed. Upon completion of the operation at step S12, a determination is made, at step S13, as to whether or not the operation event is an event for ending the amplifier manager software. If the operation event is not the event for ending the amplifier manager software (NO determination at step S13), the processing reverts to step S11 so as to repeat the aforementioned operations of step S11 to step S13. If, on the other hand, the operation event is the event for ending the amplifier manager software (YES determination at step S13), the processing proceeds to step S14 to end the amplifier manager software, so that the PC-side application processing is brought to an end. At step S11, other operation events than the operation event, such as a reception event indicating that data has been received by the I/F 22 and timer event indicating that an interrupt has been generated from a not-shown timer, are also detected. Thus, at next step S12, operations corresponding to these detected events are performed.

Figure 17:
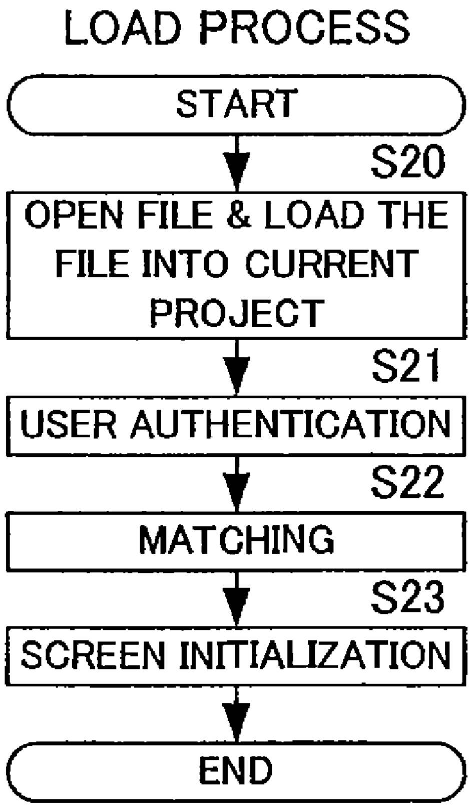
FIG. 17 is a flow chart of a load process performed in the PC in the amplifier system of the present invention.

FIG. 17 is a flow chart of a load process performed at step S12 when the detected operation event is one for loading a project file. Once the operation event for loading a project file is detected, the load process of FIG. 17 is started, where, at step S20, the project file is opened and various information of the project file is loaded into the current project area set in the RAM. Then, at step S21, user authentication is performed on the basis of user authentication information included in the project file. If a user ID and password entered by the user match the user authentication information, the user is logged into the project file as the user indicated by the user ID and is granted a corresponding user's rights The user's right granted here is any one of two rights: control right to allow the user to at least browse and control states of amplifiers registered in the project; and browse right to allow the user to only browse the states of the amplifiers registered in the project. Then, at step S22, a confirmation (matching) operation is performed for associating individual devices registered in the project file and actual devices actually connected to the LAN 4. In this confirmation (matching) operation, device identification (ID) information, model information, etc. is acquired from the actual devices and compared to the IDs and model information, etc. of the devices registered in the project file, so as to associate the actual devices with the devices registered in the project file. At next step S23, a screen initialization operation is performed so that the basic screen BA4 comprising an initialized Tree View 36 and Detail View 37 is displayed on the display device of the PC 2, after which the load process is brought to an end.

Figure 36:
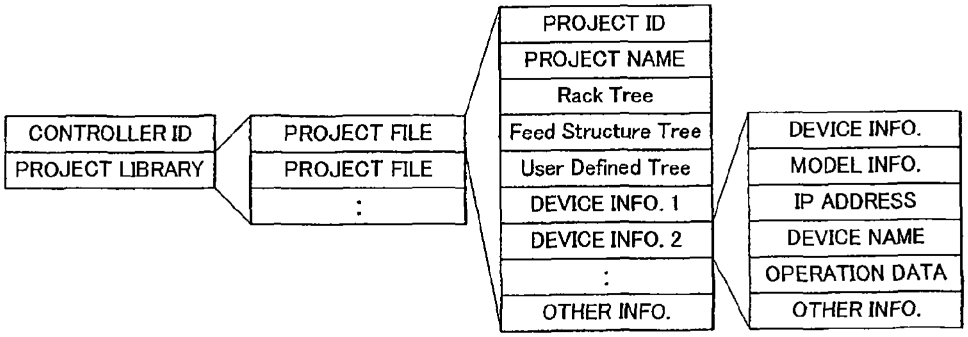
FIG. 36 is a diagram showing a data structure of project-related data stored in a storage device of the PC in the amplifier system of the present invention.

FIGS. 36 to 39 show an organization of project-related data stored in the storage device of the PC 2. FIG. 36 shows a data structure of a "project library" stored in the HDD 24, and a "controller ID" of the PC 2 is stored at the same hierarchical level as the project library. The project library is capable of storing a plurality of project files. Each of the project files includes data for controlling a plurality of amplifiers as one amplifier system 1, tree information for hierarchically grouping project IDs, project names and a plurality of devices (i.e., amplifiers) into respective groups from the perspective of the racks storing the individual devices (Rack Tree), into groups from the perspective of the destination speakers (Feed Structure Tree), etc. Each of the project files also includes tree information for grouping the project IDs, project names and devices into user-defined groups (User Defined Tree), detailed information of the individual devices registered in the project, such as device information 1, device information 2, . . . , and other information. Each of the device information includes a device ID, model information, IP (Internet protocol) address, device name, operation data and other information. The operation data are control data for operation or controlling behavior of the device in question. Each of the device information also includes information for performing user authentication on each user and granting a right to each authenticated user, information of the type of the amplifier and information of a display setting of each of the elements in each individual Detail View of the group.

Figure 37:
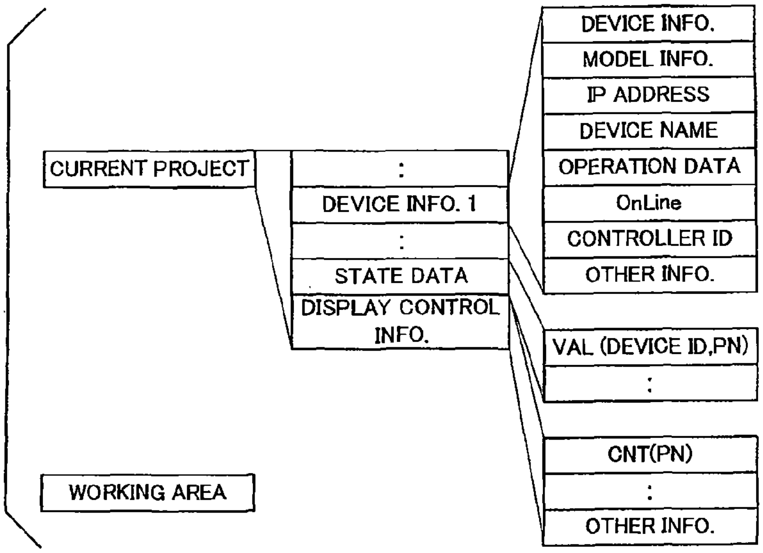
FIG. 37 is a diagram showing a data structure of a current project stored in the storage device of the PC in the amplifier system of the present invention.

FIG. 37 shows a data structure of a current project stored in the RAM of the PC 2 and including information of current operating states. The current project is basically similar in content as the project file, except that it further has "state data" and "display control information". Each of the device information includes, in addition to the information and data mentioned above in relation to the project file, "On-line information" indicating whether or not the device in question is currently in the on-line state, and "controller ID" that is equipment ID of the PC 2 remote-controlling the device. The "controller ID" area is an area in which are stored controller IDs acquired from the actual devices associated with the devices of the project. In the illustrated example, the "state data" area is an area in which are stored state data acquired from actual devices placed in on-line relationship with devices of the project, and the acquired state data are necessary for displaying the current Detail View. Each parameter stored in the "state data" area is indicated here as "VAL (device ID, PN) because it is identifiable by a device ID and parameter number PN. Further, the "display control information" area includes a block of timer registers CNT(PN) to be used for a timer interrupt process as will be later described, and other information. The other information includes display setting information for individual elements of the Detail View of an amplifier of each type (see for example FIG. 9) and the Detail View of each group (see for example FIG. 9). Further, a working area is set in the RAM.

Figure 38:
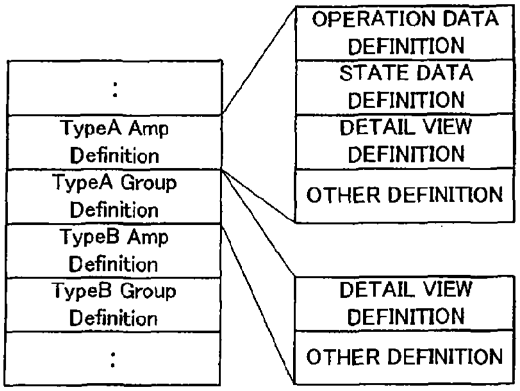
FIG. 38 is a diagram showing a data structure of a library stored in the storage device of the PC in the amplifier system of the present invention.

FIG. 38 shows a data structure of a library provided in the amplifier manager software and storing amplifier definition information ("TypeA Amp Definition", "TypeB Amp Definition", . . . ) defining data structures, display screens, etc. of individual amplifiers and group definition information ("TypeA group Definition", "TypeB Group Definition", . . . ) defining display screens etc. of individual groups. More specifically, "TypeA Amp Definition", which is amplifier definition information of the type-A amplifier, stores therein: an operation data definition defining a structure of the operation data of the amplifier and how to handle the operation data; a state data definition defining a structure of the state data of the amplifier and how to handle the state data; a Detail View definition defining elements to be displayed in the Detail View 37-2 of the amplifier, displayed position of the elements and parameters to be indicated by the elements; and various other definition information necessary for control of the type-A amplifier. Further, "TypeA group Definition", which is group definition information of a group consisting only of type-A amplifiers stores therein a Detail View definition defining positions in the screen of the Detail View 37-2 of the group and parameters corresponding to the elements, and various other definition information necessary for control of the group. Further, although not shown, there are also stored "TypeAB group Definition that is group definition information of a group of type-A and type-B amplifiers and "TypeABC group Definition that is group definition information of a group of type-A, type-B and type-C amplifiers.

Figure 39:
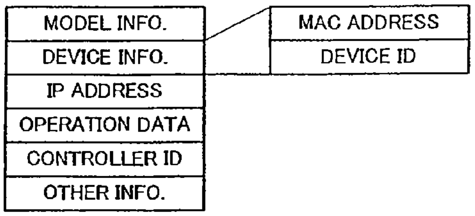
FIG. 39 is a diagram showing a data structure of information stored in a storage device of the amplifier in the amplifier system of the present invention.

FIG. 39 shows a data structure of information stored in the storage device 11 of each of the amplifiers 3 that are actual devices. In the storage device of each of the amplifiers 3 are stored: model information, device ID and IP address capable of identifying the amplifier 3; operation data for controlling current behavior of the amplifier; controller ID that is the equipment ID of the PC remote-controlling the amplifer3 (i.e., PC having the right to control the amplifier 3); and other information including account information (each user's authentication and right information) supplied from the PC. Further, the device ID comprises a MAC (Media Access Control) address of the I/F 12 of the device and set device ID. On the basis of the operation data stored in the amplifier 3, the CPU 10 controls behavior of various blocks, such as the DSP 14, AMP 15 and UI13, within the amplifier 3. Further, the CPU 10 can acquire, as the state data of the amplifier 3, signal levels detected by level detectors within the AMP 15, temperatures detected by a temperature sensor attached to the heat sinks, etc. via the D/A & A/D unit 16. Furthermore, the CPU 10 can acquire, directly from the AMP 15, alert events, such as various protection and level excess events, generated by the AMP 15.

Figure 19:
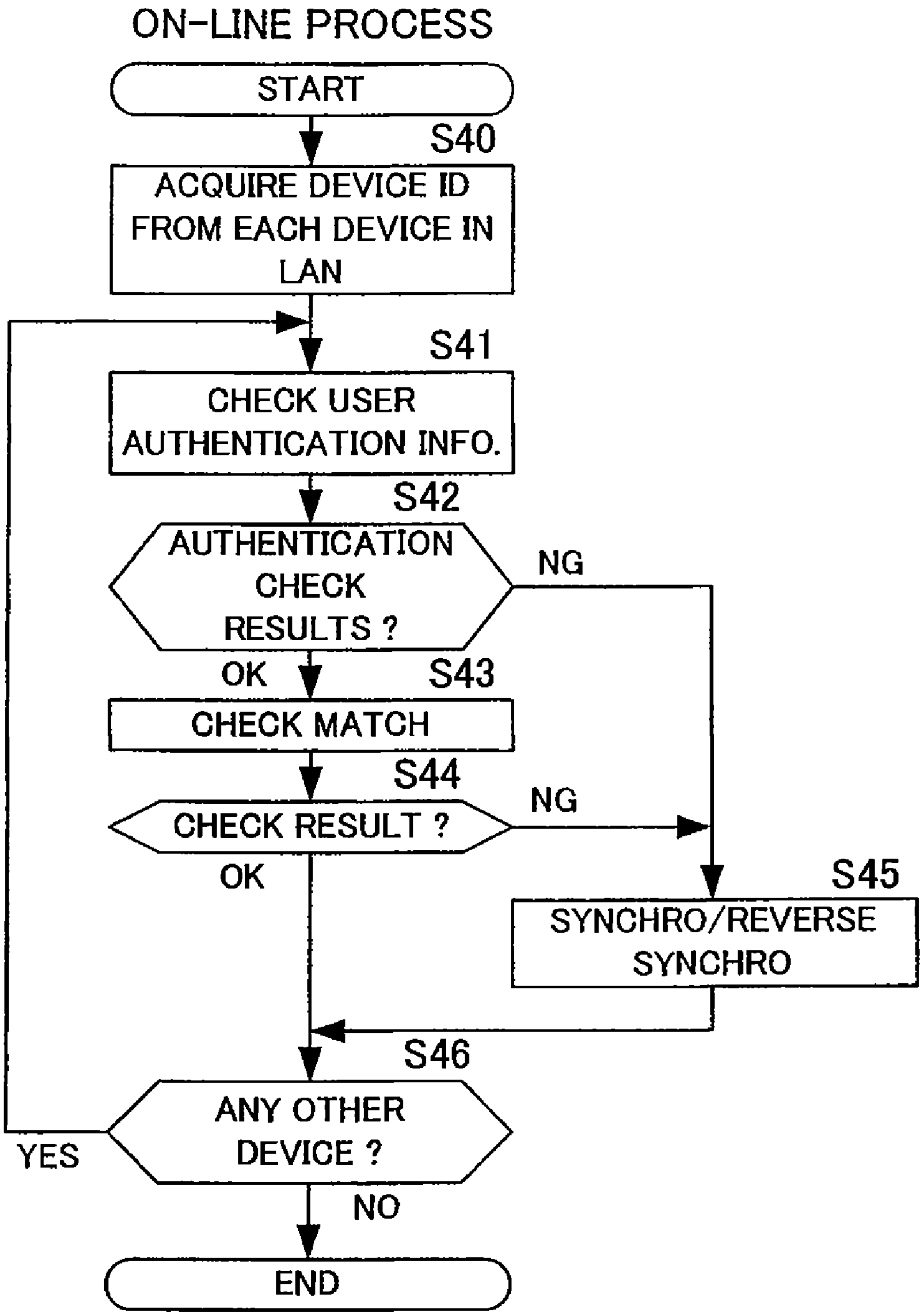
FIG. 19 is a flow chart of an on-line process performed in the PC in the amplifier system of the present invention.

FIG. 19 is a flow chart of an on-line process performed, at step S12 of the PC-side application processing when the operation event is that of the on-line button 33. Namely, once an operation event of the on-line button 33 is detected, the on-line process shown in FIG. 19 is started. At step S40, a device ID, the information and controller ID stored in one actual device which is among actual devices connected to the LAN and which is associated with any one of the devices in the project are acquired from the one actual device. At next step S41, a match between the account information of the one actual device and the user ID and password of a user currently logging into the project of the PC 2 (i.e., login user), whether or not the login user has a control right over the amplifier system and presence of the controller ID of the actual device are checked. Then, the authentication results obtained at step S41 are determined at step S42. If the user ID and password is contained in the account information (the user ID and password match the account information) as determined at step S42("OK" at step S42), then the controller ID in the actual device shown in FIG. 39 is overwritten with the controller ID of the PC 2 shown in FIG. 36. If the actual device has stored therein controller ID of the PC 2, it means that the PC 2 has the right of control over the actual device and thus can remote-control (i.e., browse and control) the actual device (on-line state). At following step S43, it is checked whether or not there is a match (complete match) between the operation data of the actual device and the operation data of the corresponding device in the project. If there is a complete match between the operation data ("OK" at step S44), the process goes to step S46 to determine whether there is any other device that remains to be processed (i.e., any other unprocessed device).

If it has been determined at step S42 that, although the user ID and password match the account information, the login user has no control right or the controller ID has not been cleared ("NG" at step S42), the process branches to step S45 to perform a reverse synchronization operation and then proceeds to step S46. In this case, the PC 2 can not remote-control the actual device, but can monitor (browse) operating states of the actual device (monitorable state). Here, the reverse synchronization operation is an operation that acquires the operation data of the actual device and overwrites the operation data of the corresponding device in the project of the PC 2 with the acquired operation data and thereby causes the operation data of the corresponding device in the project to agree with the operation data of the actual device. If the user ID and password do not match the account information as determined at step S42, it means that the login user does not have even the browse right, and thus, the process jumps directly to step S46 although not specifically shown.

Further, if the operation data do not match ("NG" at step S44), the process branches to step S45, where a synchronization-related instruction is received from the user and perform a synchronization or reverse-synchronization operation. The synchronization operation is an operation that transmits the operation data of a corresponding device in the project of the PC 2 to the actual device, overwrites the operation data of the actual device with the operation data of the corresponding device in the project of the PC 2 and thereby causes the operation data of the actual device to agree with the operation data of the device in the project. Then, at step S46, a determination is made as to whether there is any other unprocessed actual device among the actual devices associated with the devices in the project. Whenever such an unprocessed actual device is found, the operations of steps S41 and S45 are performed on the found unprocessed actual device. Then, when it has been determined at step S46 that there is no other unprocessed actual device, the on-line process is brought to an end.

Of the actual devices connected to the LAN 4, the actual device to be subjected to processes of FIGS. 21-31 described below is, as regards the processes of FIGS. 21, 22, 23, 28, 29 and 30, one associated with a device registered in the project and placed in the on-line or monitorable state, and is, as regards the processes of FIGS. 24, 25, 26 and 31, one associated with a device registered in the project and placed in monitorable state. Further, for each of the Detail View 37 of a device registered in the project and placed in the on-line state and Detail View 37 of a group including such a device, the processes of FIGS. 24, 25, 26 and 31 can not be performed because the PC 2 has no right of control over the corresponding actual device.

Further, although not shown, an off-line button for instructing an off-line state is also provided on the basic screen B4. More specifically, upon detection, at step S11 of FIG. 16, of an operation event indicating that the off-line button has been operated, all of the devices in the current project are set in the off-line state, and a change request instructing that the controller ID be cleared is transmitted to the actual devices corresponding to all of the devices having so far been in the on-line state. Each of the actual devices having received the change request clears or remove the controller ID stored in the storage device of the actual device.

Figure 20:
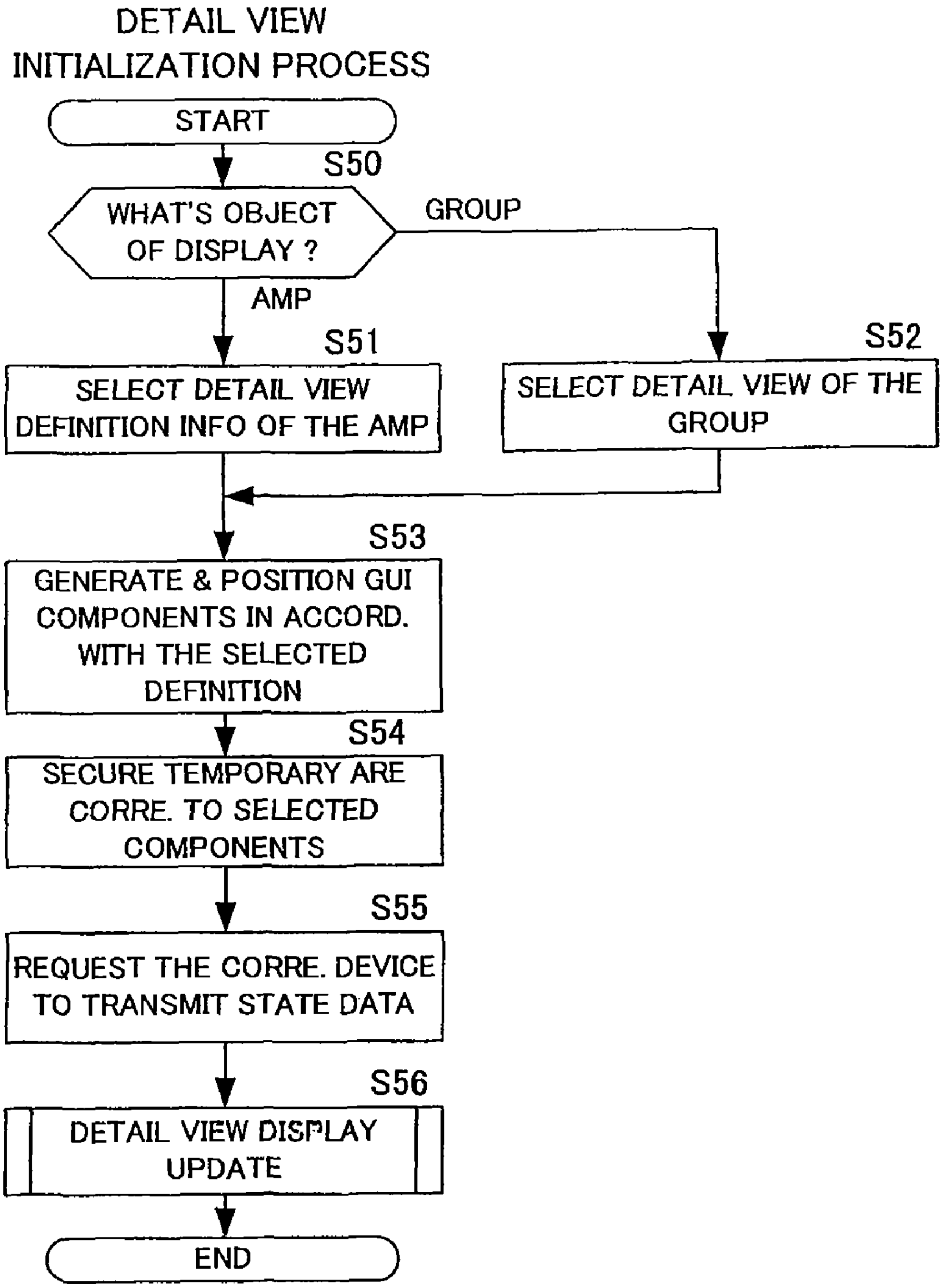
FIG. 20 is a flow chart of a Detail View initialization process performed in the PC in the amplifier system of the present invention.

FIG. 20 is a flow chart of a Detail View initialization process for initializing the Detail View 37. The Detail View initialization process is started up in the PC 2 in response to loading of a project file (step S23) or in response to clicking-on any one of the groups and amplifiers (including the channels) on the three View 36. In the case where the Detail View initialization process is started up in response to the loading of the project file, the object of display on the Detail View 37 is a group or amplifier selected at the time of saving of the project file, while, in the case where the Detail View initialization process is started up in response to clicking-on of any one of the groups and amplifiers, the object of display on the Detail View 37 is the clicked-on group or amplifier. Once the Detail View initialization process is started up, a determination is made at step S50, on the basis of the current project, as to whether the object of the display is an amplifier or a group. If the object of the display is an amplifier as determined at step S50, the Detail View initialization process proceeds to step S51. At step S51, a determination is made as to which one of the two-channel high-order model (type B), two-channel low-order model (type A), . . . the amplifier is of, and then, the Detail View definition information in the amplifier definition information stored in the library of FIG. 38 and corresponding to the model of the amplifier is selected. For example, if it has been determined that the amplifier is of the two-channel low-order model (type A), the Detail View definition information in the TypeA Amp Definition is selected. If, on the other hand, the object of the display is a group as determined at step S50, the process branches to step S52. At step S52, a determination is made as to which one of the group consisting only of type-A amplifiers, group consisting of type-A and type-B amplifiers, . . . the group is, and then, the Detail View definition information in the group definition information stored in the library of FIG. 38 and corresponding to the group is selected.

Once the Detail View definition information is selected at step S51, the process moves on to step S53, where GUI components of various elements to be displayed on the basis of the selected Detail View definition information are generated and positioned at predetermined locations of the Detail View 37. Then, at step S54, a temporary area is secured for storing parameters to be displayed via the elements. Values of state data (parameters) of elements acquired from an actual device are stored into the temporary area. At next step S55, the actual device corresponding to the device designated as the object of display or each of the devices of the group designated as the object of display is requested to periodically transmit state data to be stored into the temporary area. In response to the request, the requested state data are transmitted periodically from each of the devices to the PC 2, and then the PC 2 overwrites the state data, received from each of the devices, onto locations of the temporary area provided for the requested state data. Then, at step S56, a Detail View display update process is performed for reflecting the operation data, currently stored in the temporary area, in the Detail View 37, after which the Detail View initialization process is brought to an end.

Here, the "state data" are data varying moment by moment like a sound signal waveform level. In response to the request from the PC 2, each actual device corresponding to any of the devices placed in the on-line or monitorable state in the project transmits, as a response, the requested state data to the PC 2 periodically, e.g. every 100 msec. The PC 2 not only stores the state data, received periodically from the actual device, into the temporary area, but also reflect the values of the received state data in the display of the Detail View 37. For each device placed in the on-line state in the project, on the other hand, no storage location is provided in the temporary area because no state data is transmitted from the corresponding actual device if any. Further, generally, alert events, such as signal clipping and occurrence of an excessive load and abnormality, have a higher degree of urgency than the state data, and thus, once any alert event is detected in any of the actual devices, information indicative of the detected alert event is immediately transmitted to the PC 2. The PC 2 having received the information of the detected alert event makes an alert display corresponding to the detected alert event.

Figure 18:
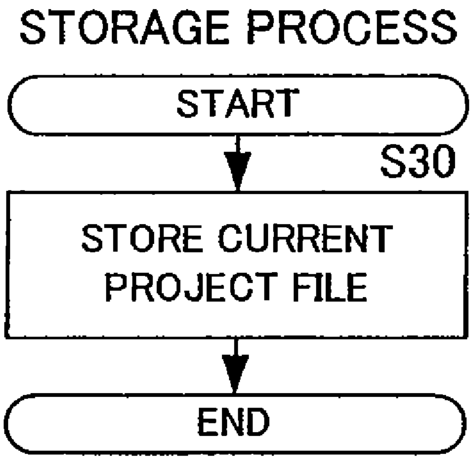
FIG. 18 is a flow chart of a storage process performed in the PC in the amplifier system of the present invention.

FIG. 18 is a flow chart of a storage process performed at step of S12 of the PC-side application processing when the detected operation event is an operation event for storing the project file. Once the operation event for storing the project file is detected, the storage process of FIG. 18 is started up, where the current project stored in the RAM is stored into a storage device, such as the HDD 24, as the project file. Thus, the project file having reflected therein the current operating states of the amplifier system 1 is stored into the storage device. After completion of the operation at step S30, the storage process is brought to an end.

Figure 21:
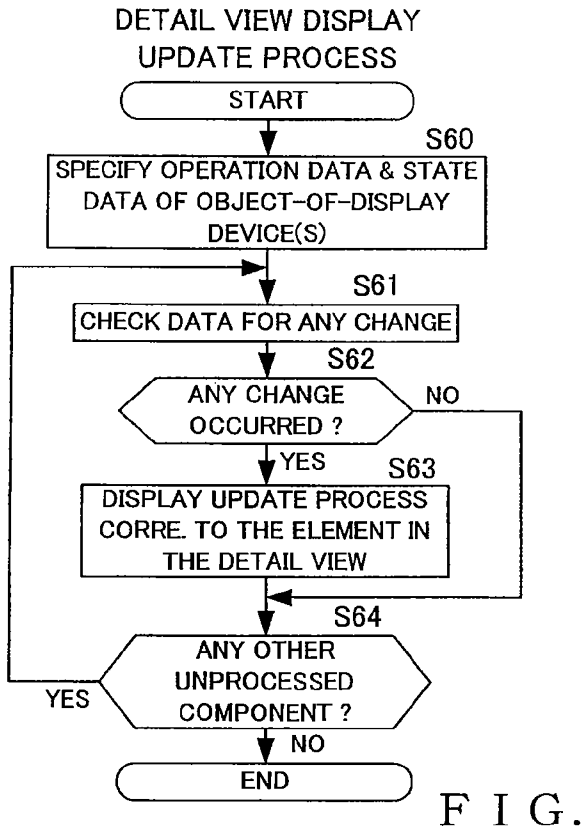
FIG. 21 is a flow chart of a Detail View display update process performed in the PC in the amplifier system of the present invention.

FIG. 21 is a flow chart of a Detail View display update process performed at step S 56 of the Detail View initialization process, or at step of S12 of the PC-side application processing at predetermined time intervals (e.g., 10 msec). Upon start-up of the Detail View display update process is started, the operation data, stored in the current project, of the device designated as the object of display on the Detail View 37 in the current project and the state data currently stored in the temporary area are specified as data to be used for display updating of the Detail View 37, at step S60. Here, the object of display is one amplifier if the Detail View is an individual amplifier Detail View, but is a plurality of amplifiers if the Detail View is a group Detail View. The operation data in the current project specified here are data sequentially updated in a later-described operation data change process, and the state data in the temporary area are data periodically updated with data from the actual device (amplifier). Then, for a given first component (element), corresponding data or state data in the specified data are checked for any change, at step S61. Then, it is determined, at step S62, whether any change has occurred in the data. With a YES determination at step S62, the Detail View display update process proceeds to step S63 to perform a display update process corresponding to the element in the Detail View in question; the display update process corresponding to the element is either a later-described "*1 display update process" or a later-described "*2 display update process". Through the *1 display update process or *2 display update process, the component in question will be displayed in accordance with the changed data. After that, the Detail View display update process moves on to step S64. If, on the other hand, no change has occurred in the data as determined at step S62, then the display update process of step S63 is skipped, and the Detail View display update process moves on to step S64. At step S64, a determination is made as to whether there is any other component (element) that remains to be processed, i.e. unprocessed component. If there is another unprocessed component as determined at step S64, the Detail View display update process reverts to step S61 to repeat the operations of steps S61 to S63, and, if any change has occurred in the data of the component, the component will be displayed in accordance with the changed data. When the operations of steps S61 to S63 have been completed for all of the components, it is determined, at step S64, that there is no more component to be processed, so that the Detail View display update process is brought to an end.

Figure 22A:
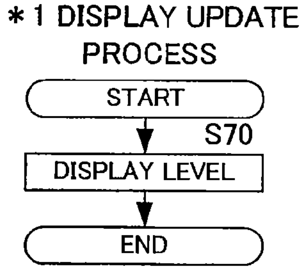
FIGS. 22A and 22B are flow charts of a *1 display update process and *2 display update process, respectively, performed in the PC in the amplifier system of the present invention.

FIG. 22A is a flow chart of the *1 display update process performed at step S63 in the case where the displayed screen is an individual amplifier Detail View 37 and the component is a level meter element. Upon start-up of the *1 display update process, a level corresponding to the changed data is displayed via the level meter element, at step S70. After that, the *1 display update process is brought to an end.

Figure 22B:
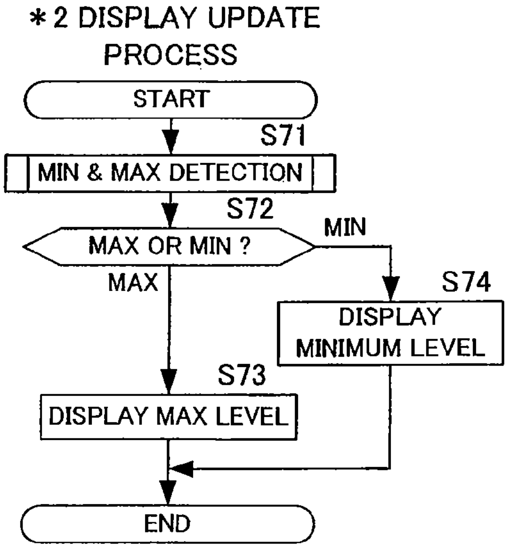

FIG. 22B is a flow chart of the *2 display update process performed at step S63 in the case where the displayed screen is a group amplifier Detail View 37 and the component is a level meter element. Upon start-up of the *2 display update process, a Min & Max detection operation is performed, at step S71, for detecting minimum and maximum values to be displayed in the level meter element from among data of individual amplifiers/channels in the group. Next, at step S72, a determination is made as to which of "Min" and "Max" is set as the display setting for the component. If the display setting for the component is set at "Max" as determined at step S72, the *2 display update process proceeds to step S73, where the level corresponding to the maximum value detected at step S71 is displayed via the level meter element. After that, the *2 display update process is brought to an end. If, on the other hand, the display setting for the component is set at "Min" as determined at step S72, the *2 display update process branches to step S74, where the level corresponding to the minimum value detected at step S71 is displayed in the level meter element. After that, the *2 display update process is brought to an end.

Figure 42:
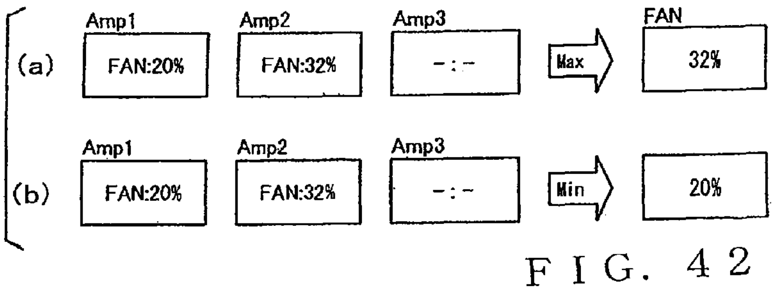
FIG. 42 is a diagram showing a specific example of a display change in the *2 display update process performed in the PC in the amplifier system of the present invention.

Now, a specific example of a display change performed in the *2 display update process will be described below with reference to (a) and (b) of FIG. 42. In the example shown in (a) and (b) of FIG. 42, the group in question consists of Amp1, Amp2 and Amp3, the FAN parameter of Amp1 is "20%", the FAN parameter of Amp2 is "32%", and Amp 3 is a type-A amplifier having no FAN parameter as indicated by "-:-". The FAN parameter is indicated by a percentage of the maximum number of rotations that is represented in the figure as "100%". If the Detail View display update process is performed in the case where the display setting is set at "Max", the display of the FAN parameter on the Detail View 37 is changed to "32%" as shown in (a) of FIG. 42. If the Detail View display update process is performed in the case where the display setting is set at "Min", on the other hand, the display of the FAN parameter in the Detail View 37 is changed to "20%" as shown in (b) of FIG. 42.

Figure 23A:
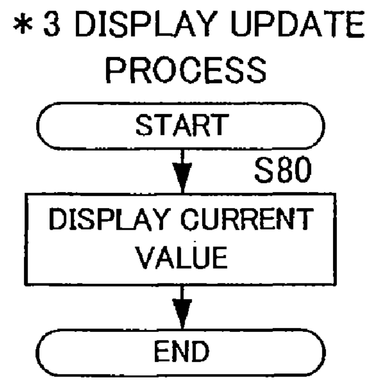
FIGS. 23A and 23B are flow charts of a *3 display update process and *4 display update process, respectively, performed in the PC in the amplifier system of the present invention.

FIG. 23A is a flow chart of a *3 display update process performed at step S63 in the case where the displayed screen is an individual amplifier Detail View 37 and the component is an ordinary fader element indicating a numerical value parameter. Upon start-up of the *3 display update process, the current value of the changed data is displayed in the fader element at step S80. After that, the *3 display update process is brought to an end.

Figure 23B:
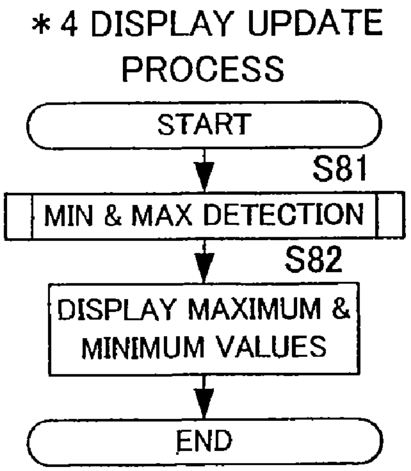

FIG. 23B is a flow chart of a *4 display update process performed at step S63 in the case where the displayed screen is a group amplifier Detail View 37 and the component is a fader element including a band-shaped element 40 indicating a numerical value parameter. Upon start-up of the *4 display update process, a Min & Max detection operation is performed, at step S81, for detecting minimum and maximum values to be displayed via the fader element from among data of individual amplifiers/channels in the group. Then, the detected maximum and minimum values are displayed in the band-shaped element 40 at step S82. After that, the *4 display update process is brought to an end.

Figure 24:
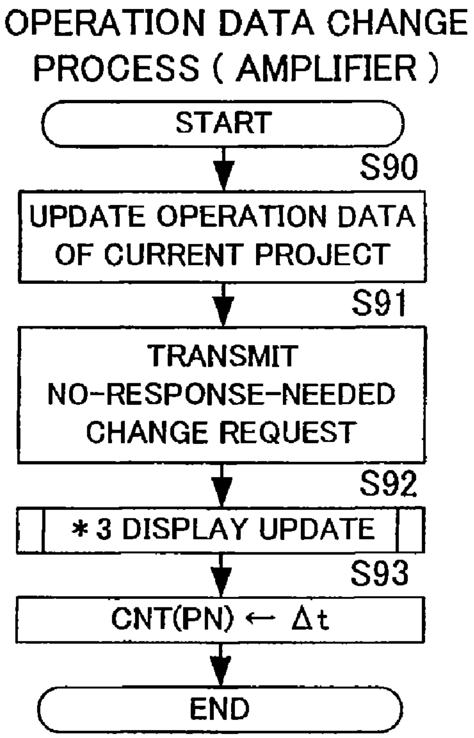
FIG. 24 is a flow chart of an operation data change process (amplifier) performed in the PC in the amplifier system of the present invention.

FIG. 24 is a flow chart of an operation data change process (amplifier) performed at step S12 of the PC-side application processing in response to user's operation of, for example, a knob of the ordinary fader element, indicating a numerical value parameter, when the displayed screen is the individual amplifier Detail View 37. Once the knob of the fader element, for example, is operated on the Detail View 37 of an amplifier over which the PC 2 has the right of control, the operation data change process (amplifier) is started up in the PC 2. First, at step S90, a parameter value (output sound volume level) included in the operation data of the current project and corresponding to the fader element of a corresponding amplifier (device) in the current project is updated in accordance with the operation of the knob. Then, at step S91, a change request, for which no response is needed, is transmitted to the amplifier (actual device) associated with the amplifier in question, so as to change the corresponding parameter value of the operation data of the associated amplifier (actual device) (remote control). Further, the aforementioned "*3 display update process" is performed, at step S92, so that the displayed position of the fader element knob is updated in such a manner that the current value corresponding to the knob operation is displayed via the element operated on the Detail View 37. At following step S93, the timer register (PN) specified by the parameter number PN of the parameter is initialized and set at a predetermined time Δt so that a time interrupt process is performed as will be later described, after which the operation data change process (amplifier) is brought to an end. If the fader element knob is still continuing to be operated at that time, operation evens are generated in succession so that a no-response-needed change request is transmitted to the associated amplifier (actual device) per operation event; in this case, the timer interrupt process is initialized per operation event so that there will occur no time-out. Then, once the user's operation ends and thus the timer interrupt process is brought to an end, a response request is sent to the associated amplifier (actual device) so that the PC 2 can confirm, on the basis of a confirmatory response from the associated amplifier, that the operation data of the amplifier in question have been changed. In the aforementioned manner, it is possible to reduce a traffic amount on the network.

Note that, when the PC 2 is in the off-line state, the change request transmission operation of step S91 and the timer register initialization process of step S93 are skipped.

Figure 25:
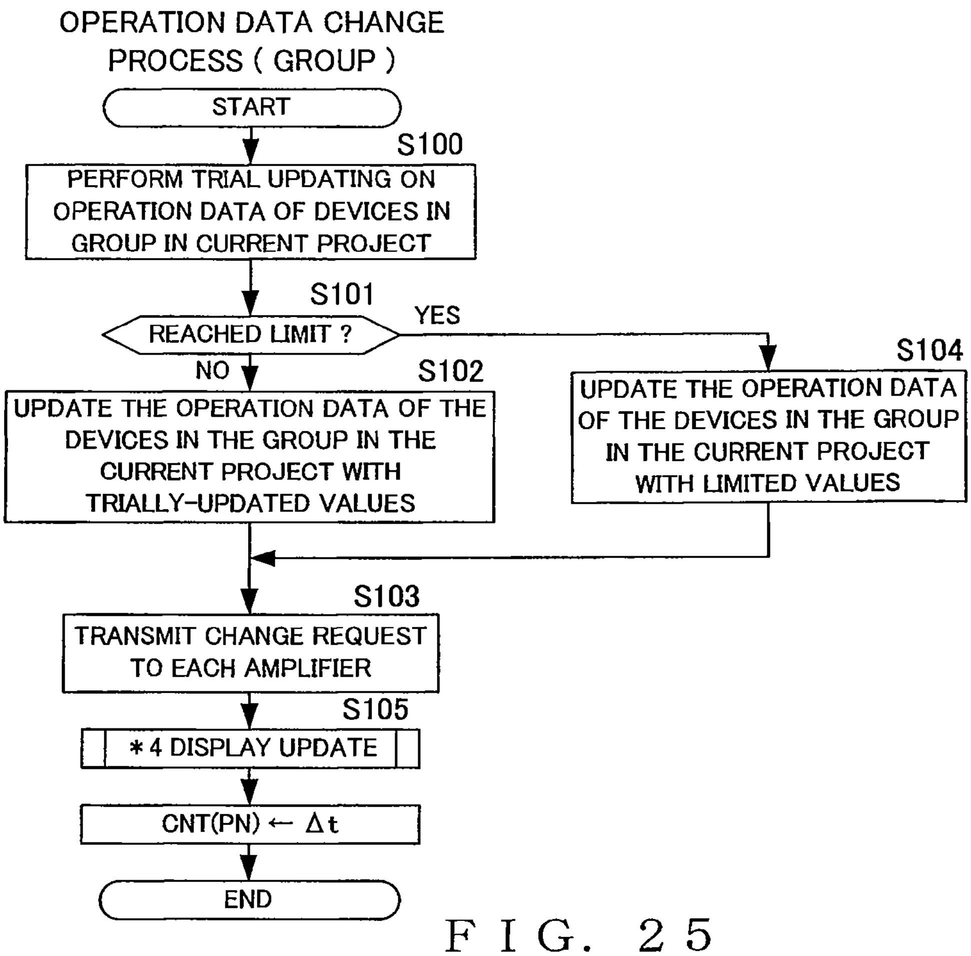
FIG. 25 is a flow chart of an operation data change process (group) performed in the PC in the amplifier system of the present invention.

FIG. 25 is a flow chart of an operation data change process (group) performed at step S12 of the PC-side application processing in response to user's operation of, for example, the knob of the fader element, indicating a parameter value, when the displayed screen is an individual amplifier Detail View 37. Once the knob of the fader element, for example, is operated on the Detail View 37 of a group over which the PC 2 has the right of control, the operation data change process (group) is started up in the PC 2. First, at step S100, trial updating is performed on a parameter value corresponding to the fader element included in the operation data of devices in the corresponding group in the current project. In this trial updating, parameter values of the devices are manipulated collectively in a software manner while still retaining their relative relationship, and it is tested whether the parameter value of any of the devices in the group reaches an upper or lower limit of a predetermined change range. Then, a determination is made, at step S101, as to whether the parameter value of any of the devices in the group has reached the upper or lower limit. If answered in the negative at step S101, the operation data change process (group) proceeds to step S102, where the parameter values of the devices are updated with the trially-updated values while still retaining their relative relationship (decibel differences in the case of the output sound volume level). If, on the other hand, the parameter value of any of the devices in the group has reached the upper or lower limit as determined at step S101, the process branches to step S104, where the parameter values of the devices of the group in the current project are updated with limited values while still retaining their relative relationship. Note that the phrase "group over which the PC 2 has the right of control" means that the PC 2 has the right of control over all of the amplifiers (actual devices) belonging to the group.

Once the operation of step S102 or the operation of step S104 is completed, the process goes to step S103, where a no-response-needed change request is transmitted to each of the amplifiers (actual devices) in the group in question, so as to change the corresponding parameter value of the operation data of each of the amplifiers (actual devices) (remote control). Then, the *4 display update process is performed, at step S105, so that the display of the band-shaped element 40 and knob position of the fader element knob is updated in such a manner that maximum and minimum values corresponding to the operation are displayed via the element operated on the Detail View 37. At following step S106, the timer register (PN) specified by the parameter number PN of the parameter is initialized and set at a predetermined time Δt so that a time interrupt process is performed as will be later described. After that, the operation data change process (group) is brought to an end. If the fader element knob is still continuing to be operated at that time, operation events are generated in succession so that a no-response-needed change request is transmitted to each of the amplifiers (actual devices) per operation event; in this case, the timer interrupt process is initialized per operation event so that there will occur no time-out. Then, once the user's operation ends and thus the timer interrupt process is brought to an end, a response request is sent to each of the amplifiers (actual devices) in the group so that the PC 2 can confirm, on the basis of a confirmatory response from each of the amplifiers, that the operation data have been changed in each of the devices. In the aforementioned manner, it is possible to reduce the traffic amount on the network.

Note that, when the PC 2 is in the off-line state, the change request transmission operation of step S103 and the timer register (CNT(PN)) initialization process of step S106 are skipped.

Figure 40:
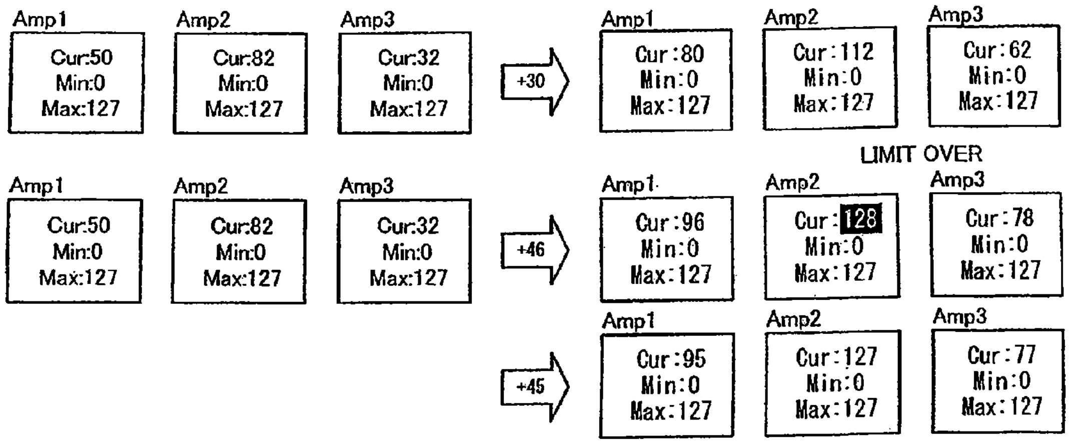
FIG. 40 is a diagram showing a specific example of parameter value updating in the operation data change process (group) performed in the PC in the amplifier system of the present invention.

Now, a specific example of updating in the operation data change process (group) will be described with reference to FIG. 40. In the example shown in FIG. 40, the group in question consists of Amp1, Amp2 and Amp3. For Amp1, the current value of the attenuator parameter is "50", and lower and upper limits in a change range of the attenuator parameter are set at "0" and "127", respectively. For Amp2, the current value of the attenuator parameter is "82", and lower and upper limits in the change range of the attenuator parameter are "0" and "127", respectively. Further, for Amp3, the current value of the attenuator parameter is "32", and lower and upper limits in the change range of the attenuator parameter are "0" and "127", respectively. Here, let it be assumed that the fader element knob has been operated to increase the value of the attenuator parameter by "+30". Thus, as a result of the trial updating at step S100 of FIG. 25, the parameter value of Amp1 changes to "80", the parameter value of Amp2 changes to "112", and the parameter value of Amp3 changes to "62". In this case, the parameter value of each of Amp1, Amp2 and Amp3 is updated with the tribally-updated value because it falls within the respective change range defined by the lower limit and the upper limit. Next, let it be assumed that the fader element knob has been operated to increase the value of the attenuator parameter by "+46". Thus, as a result of the trial updating at step S100 of FIG. 25, the parameter value of Amp1 changes to "96", the parameter value of Amp2 changes to "128", and the parameter value of Amp3 changes to "78". In this case, because the parameter value of Amp2 has exceeded the corresponding upper limit, the increase value "+46" is limited to "+45", at step S104, such that the parameter value of Amp2 decreases down to the upper limit value "127". In this manner, the parameter values of Amp1, Amp2 and Amp3 are updated with their respective limited values of "95", "127" and "77".

Figure 26:
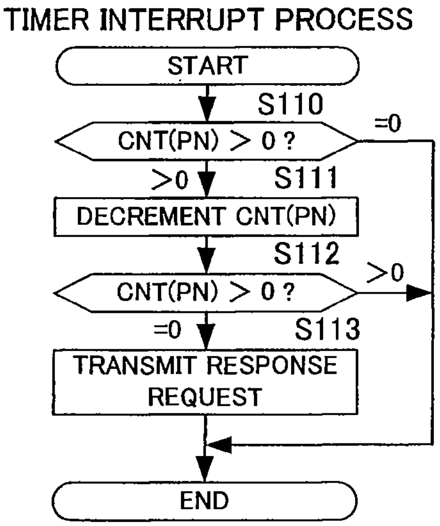
FIG. 26 is a flow chart of a timer interrupt process performed in the PC in the amplifier system of the present invention.

FIG. 26 is a flow chart of the timer interrupt process performed periodically, at step S12 of the PC-side application processing, in response to an interrupt from the timer when the timer register CNT(PN) has been initialized at step S193 of the operation data change process (amplifier) or at step S106 of the operation data change process (group). The timer interrupt process is started up in response to a timer interrupt generated, for example, at 1 msec intervals. First, at step S110, a determination is made as to whether any timer register CNT(PN) whose value is greater than "0" is among the plurality of timer registers CNT(PN). If answered in the affirmative at step S110, the timer interrupt process goes to step S111, where the timer register CNT(PN) whose value is greater than "0" is decremented by one. After that, it is further determined, at step S112, whether the value of the timer register CNT(PN) is greater than "0". With a YES determination at step S112, the timer interrupt process is brought to an end because a predetermined time-out period has not yet expired. If, on the other hand, the timer register CNT(PN) has reached the "0" value as determined at step S112, it means that the predetermined time-out period has expired, and thus, at next step S113, the PC 2 requests the corresponding actual device(s) (amplifier currently designated as an object of display, or amplifiers in a group currently designated as an object of display) to transmit a parameter specified by the parameter number PN. After that, the timer interrupt process is brought to an end. Each of the actual devices having received the request transmits the parameter, included in the operation data of the actual device and specified by the parameter number PN, to the PC 2, so that the PC 2 overwrites the received parameter onto the parameter included in the operation data of the corresponding device(s) in the current project file and specified by the parameter number. If the value of the timer register CNT(PN) is "0" as determined at step S110, it means that the predetermined time-out period has already expired, and thus, the timer interrupt process is brought to an end. By the timer interrupt process being performed repetitively at the predetermined interrupt frequency, an ultimate value of the operation data, changed in the corresponding actual device through the remote control (change request at step S91 or S103) responsive to the fader operation, can be reflected in the operation device of the corresponding device in the current project after passage of the predetermined time Δt following the termination of the fader operation.

Figure 27:
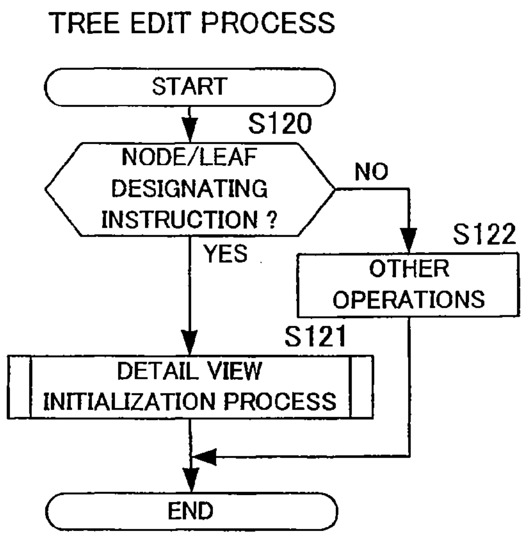
FIG. 27 is a flow chart of a tree edit process performed in the PC in the amplifier system of the present invention.

FIG. 27 is a flow chart of a tree edit process performed at step S12 of the PC-side application processing in response to user's operation for editing the Tree View 36. Namely, once the user clicks on any one of the amplifiers or groups on the Tree View 36, the tree edit process is started up. At first step S120, a determination is made as to whether the user's clicking operation is a node/leaf designating instruction. If the user's clicking operation is a node/leaf designating instruction as determined at step S120, the Detail View initialization process, having been described above in relation to FIG. 20, is performed at step S121, where the Detail View definition information corresponding to the clicked-on amplifier and group is selected from the library of FIG. 38 and the detail View 37 corresponding to the selected Detail View definition information is displayed. After that, the tree edit process is brought to an end. If, on the other hand, the user's clicking operation is not a node/leaf designating instruction as determined at step S120, the process branches to step S122 where other operations for editing the tree are performed, after which the tree edit process is brought to an end.

Figure 28:
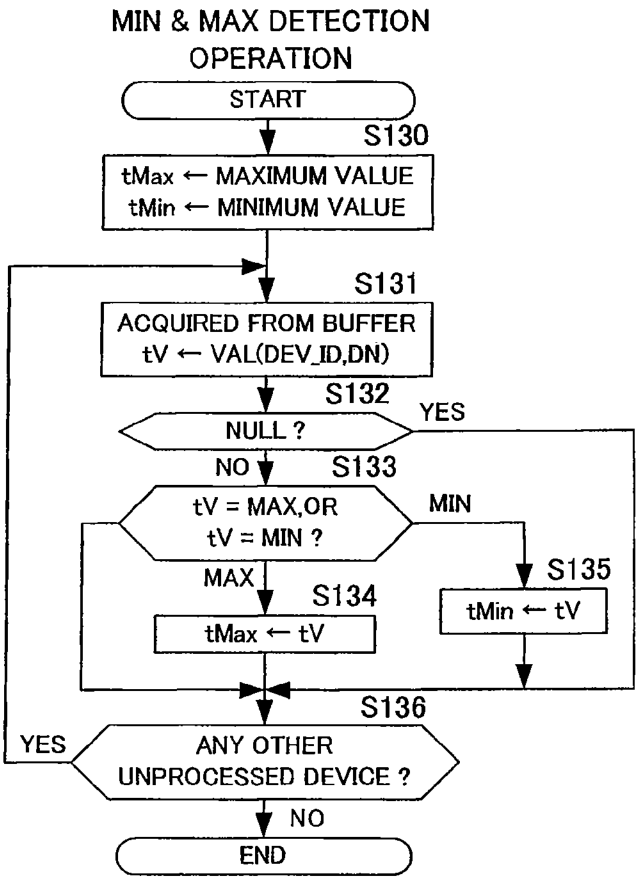
FIG. 28 is a flow chart of a Min & Max detection operation performed in the PC in the amplifier system of the present invention.

FIG. 28 is a flow chart of the Min & Max detection operation performed at step S71 of the *2 display update process or at step S81 of the *4 display update process. Upon start-up of the Min & Max detection operation, the maximum value is set into a register tMax while the minimum value is set into a register tMin, at step S130. In a case where initial Max and Min values are set in the register tMax and register tMin, respectively, the upper limit and lower limit of the change range of the parameter in question are set at the initial Min value and initial Max value, respectively. Then, corresponding data VAL(DEV#ID, DN) of a first give device in the group is acquired from a buffer provided in the RAM and set into a register tV, at step S131. "DEV#ID" is a device ID while "DN" is a parameter number (identical to the number PN), and "DEV#ID" and "DN" together specify any one of a plurality of values of operation data in the current project and a plurality of state data in the temporary area. Then, a determination is made, at step S132, as to whether or not the data acquired at step S131 is a Null value, i.e. whether the device does not have the parameter in question. If the acquired data is not a Null value as determined at step S132, the Min & Max detection operation proceeds to step S133, where a comparison is made between the value currently set in the register tV and the values currently set in the registers tMax and tMin, to thereby determine whether the value currently set in the register tV is the maximum value or minimum value. If the value currently set in the register tV is greater than (i.e., has exceeded) the value currently set in the register tMax and determined to be a maximum value at step S133, the Min & Max detection operation moves on to step S134 where the value currently set in the register tV is stored into the register tMax, after which the Min & Max detection operation proceeds to step S136. The temporary area includes no region for a device placed in the off-line state as noted above, and thus, if the parameter number DN indicates a parameter in state data of some device placed in the off-line state, the data VAL(DEV#ID) takes a Null value; namely, a level of the device placed in the off-line state is not displayed in any level meter element.

If the value currently set in the register tMin is greater than the value currently set in the register tV and thus the value currently set in the register tV is determined to be a minimum value as determined at step S133, the Min & Max detection operation branches to step S135 where the value currently set in the register tV is stored into the register tMin, after which the Min & Max detection operation proceeds to step S136. It is determined, at step S136, whether or not there is any other device that remains to be processed, i.e. unprocessed device, in the group. If there is any unprocessed device as determined at step S136, the Min & Max detection operation reverts to step S131 to repeat the operations of steps S131 to S135. If the acquired data is a Null value as determined at step S132, it means that the device in question has no significant data, and thus, the Min & Max detection operation jumps to step S136. Once the operations of steps S131 to S135 are performed on all of the devices in the group, the maximum value and minimum value of the data in question in all of the devices in the group are stored into the register tMax and register tMin, respectively. Then, it is determined, at step S136, that there is no more unprocessed device, and thus, the PC 2 returns to the *2 display update process or *4 display update process.

Figure 29A:
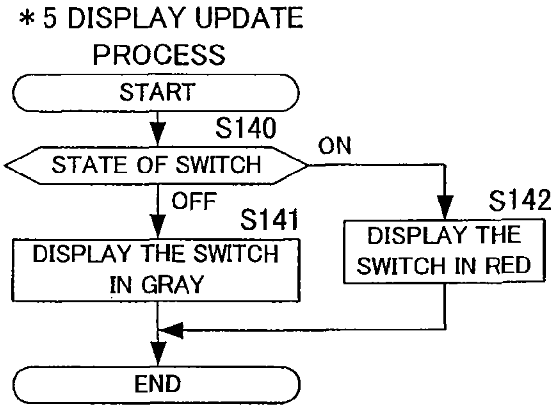
FIGS. 29A and 29B are flow charts of a *5 display update process and *6 display update process, respectively, performed in the PC in the amplifier system of the present invention.

FIG. 29A is a flow chart of a *5 display update process performed when the displayed screen is an individual amplifier Detail View 37 and the components to be subjected to display updating are the Mute element and Power element provided as switch elements indicating ON/OFF parameters. Upon start-up of the *5 display update process, it is determined, at step S140, whether the switch element in question is in the ON state or in the OFF state. If the switch element is in the OFF state as determined at step S140, the process goes to step S141 where the switch element is displayed in gray color, after which the process is brought to an end. If, on the other hand, the switch element is in the ON state as determined at step S140, the process goes to step S142 where the switch element is displayed in red color (in blue color where the switch element is the Power element), after which the process is brought to an end, after which the process is brought to an end.

Figure 29B:
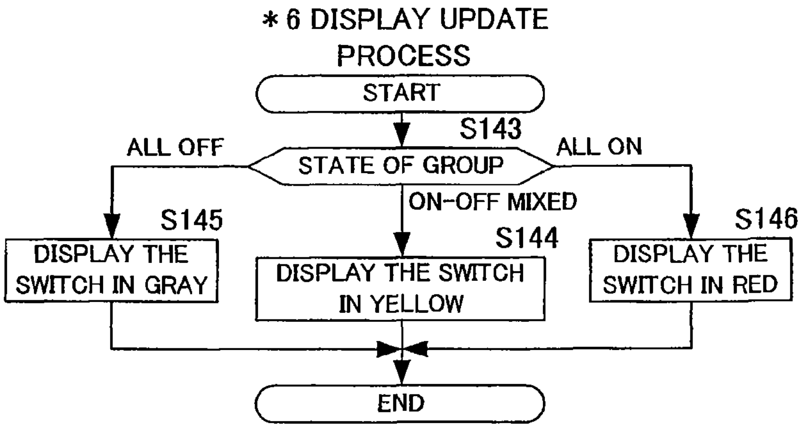

FIG. 29B is a flow chart of a *6 display update process performed when the displayed screen is a group Detail View 37 and the components to be subjected to display updating are the Mute element and Power element provided as switch elements indicating ON/OFF parameters. Upon start-up of the *6 display update process, a determination is made, at step S143, as to whether the switch element in question of all of the amplifiers in the group is in the ON state, in the OFF state, or in an ON-OFF-mixed state (i.e., the switch element in question in a portion (one or more but not all) of amplifiers is in the ON state while the switch element in the other portion of the amplifiers is in the OFF state. If the switch element in question of all of the amplifiers in the group is in the OFF state as determined at step S143, the process goes to step S145 where the switch element is displayed in gray color, after which the process is brought to an end. If the switch element in question of all of the amplifiers in the group is in the ON state as determined at step S143, the process goes to step S146 where the switch element is displayed in red color (in blue color in the case of the Power element), after which the process is brought to an end. Further, if the switch element in question of all of the amplifiers in the group is in the ON-OFF mixed state as determined at step S143, the process goes to step S144 where the switch element is displayed in yellow color, after which the process is brought to an end.

Figure 30:
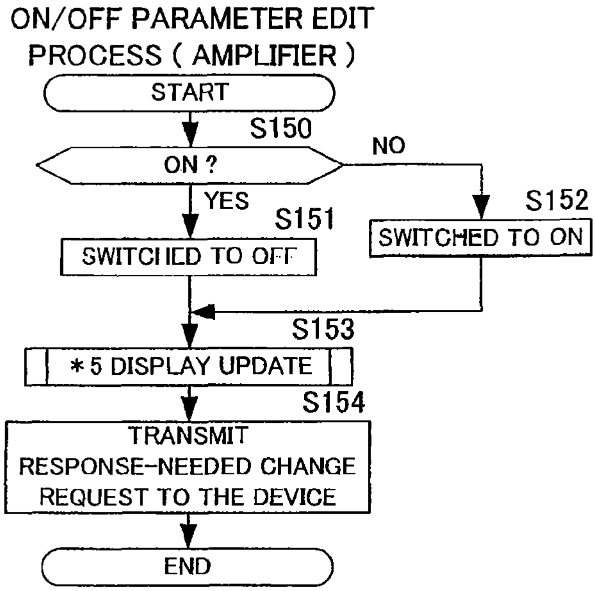
FIG. 30 is a flow chart of an ON/OFF parameter edit process performed in the PC in the amplifier system of the present invention.

FIG. 30 is a flow chart of an ON/OFF parameter edit process (amplifier) performed at step S12 of the PC-side application processing in response to user's operation of any of switch elements, such as the Mute element and Power element, each indicating an ON/OFF parameter when the displayed screen is an individual amplifier Detail View 37. Namely, once any one of the switch elements of an amplifier, over which the PC 2 has the right of control, is operated on the individual amplifier Detail View 37 the ON/OFF parameter edit process (amplifier) is started up. First, at step S150, a determination is made as to whether the switch element in question is currently in the ON state or in the OFF state. If the switch element is currently in the ON state as determined at step S150, the ON/OFF parameter edit process proceeds to step S151, where the switch element is switched to the OFF state. Then, at step S153, the aforementioned *5 display update process is performed to update the displayed color of the switch element with gray color. If, on the other hand, the switch element is currently in the OFF state as determined at step S150, the ON/OFF parameter edit process branches to step S152, where the switch element is switched to the ON state. Then, at step S153, the aforementioned *5 display update process is performed to update the displayed color of the switch element to red color (blue color in the case of the Power element). Upon completion of the operation of step S153, the ON/OFF parameter edit process proceeds to step S154 to transmit a change request, for which a response is needed, to the corresponding actual device (amplifier). The corresponding actual device having received the change request changes the ON/OFF parameter value of the switch element and returns to the PC 2 a response to the effect that the ON/OFF parameter value has been changed. Then, after confirming the response, the PC 2 brings the ON/OFF parameter edit process (amplifier) to an end.

Figure 31:
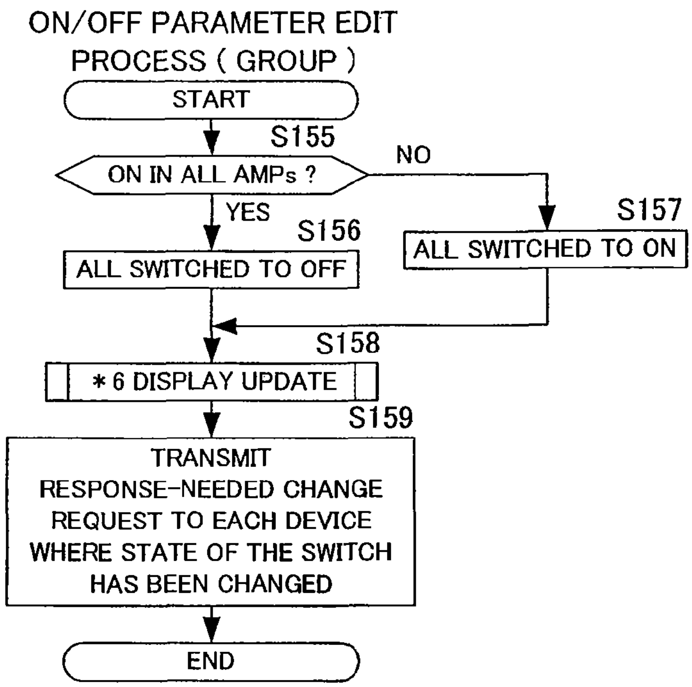
FIG. 31 is a flow chart of an ON/OFF parameter edit process (group) performed in the PC in the amplifier system of the present invention.

FIG. 31 is a flow chart of an ON/OFF parameter edit process (group) performed at step S12 of the PC-side application processing in response to user's operation any of switch elements, such as the Mute element and Power element, indicating an ON/OFF parameter when the displayed screen is the group amplifier Detail View 37. Namely, once any one of the switch elements of any one of devices in a group, over which the PC 2 has the right of control, is operated on the group amplifier Detail View 37, the ON/OFF parameter edit process (amplifier) is started up. First, at step S155, a determination is made as to whether the switch element in question is currently in the ON state in all of the amplifiers in the group. If the switch element is currently in the ON state in all of the amplifiers as determined at step S155, the ON/OFF parameter edit process proceeds to step S156, where the switch element is switched to the OFF state in all of the amplifiers. Then, at step S158, the aforementioned *6 display update process is performed to update the displayed color of the switch element to gray color. If, on the other hand, the switch element is currently in the OFF state in all or a portion of the amplifiers as determined at step S155, the ON/OFF parameter edit process branches to step S157, where the switch element is switched to the ON state in all of the devices. Then, at step S158, the aforementioned *6 display update process is performed to update the displayed color of the switch element to red color in all of the devices.

In the case where the switch element in question is the Power element, and if the switch element in question is currently in the ON state in all or a portion of the amplifiers in the group as determined at step S155, the switch element in question is switched to the OFF state in all of the amplifiers. Then, at step S158, the aforementioned *6 display update process is performed to update the displayed color of the switch element to gray color in all of the devices. Further, if the switch element in question is currently in the OFF state in all of the amplifiers in the group as determined at step S155, the process branches to step S157, where the switch element is switched to the ON state in all of the devices. Then, the aforementioned *6 display update process is performed, at step S158, to update the displayed color of the switch element to blue color in all of the devices.

Upon completion of the operation of step S158, the process proceeds to step S159 to transmit a response-needed change request to all of the actual devices corresponding to the devices where the state of the switch element has been changed. The amplifiers having received the change request changes the ON/OFF parameter value of the switch element and returns to the PC 2 a response to the effect that the ON/OFF parameter value has been changed. Then, after confirming the response, the PC 2 brings the ON/OFF parameter edit process (group) to an end.

Note that, in the case where the group is a channel group and the switch element in question is the Power element, the ON/OFF parameter edit process (group) is brought to an end upon affirmative determination because channels of another channel group will be influenced.

Further, the reason why no timer interrupt is performed in the ON/OFF parameter edit process (amplifier) and ON/OFF parameter edit process (group) is that the ON/OFF parameter is not operated or manipulated successively as the numerical value parameter is manipulated and thus even transmitting a response-needed change request per manipulation will not invite increase of the traffic amount.

Now, a specific example of the ON/OFF parameter edit process (group) will be described with reference to (a)-(c) of FIG. 41. In the example shown in (a) of FIG. 41, the group in question consists of Amp1, Amp2 and Amp3. The ON/OFF parameter of Amp1 is "ON", the ON/OFF parameter of Amp2 is "OFF", and the ON/OFF parameter of Amp 3 is "OFF". Once the switch element of the ON/OFF parameter in question is clicked on, the ON/OFF parameters of Amp 1, Amp 2 and Amp 3 are all switched to "ON" because the ON/OFF parameters in two "ON" and "OFF" states exist mixedly in the group. Namely, because the ON/OFF parameters are set so as to produce no sound, the Mute element is set at "ON". Conversely, in the case of the Power element, the ON/OFF parameters of Amp 1, Amp 2 and Amp 3 are all set at "OFF".

Figure 41:
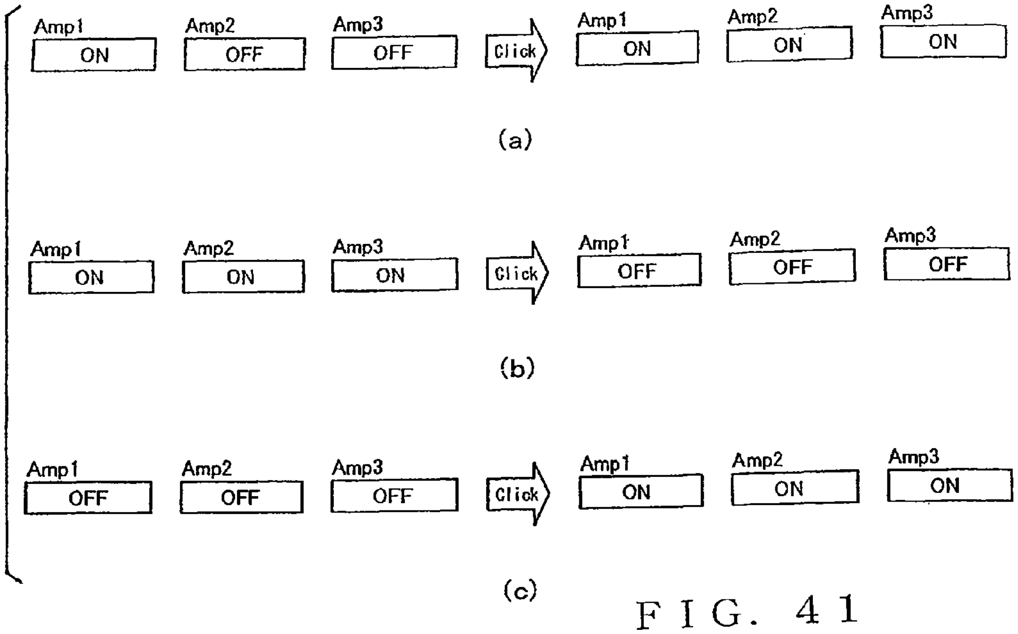
FIG. 41 is a diagram showing a specific example of editing in an ON/OFF parameter edit process (group) performed in the PC in the amplifier system of the present invention.

In (b) of FIG. 41, the ON/OFF parameters of Amp 1, Amp 2 and Amp 3 are all "ON". Once the switch element of the ON/OFF parameter in question is clicked on, the ON/OFF parameters of Amp 1, Amp 2 and Amp 3 are all switched to "OFF". In (c) of FIG. 41, the ON/OFF parameters of Amp 1, Amp 2 and Amp 3 are all "OFF". Once the switch element of the ON/OFF parameter in question is clicked on, the ON/OFF parameters of Amp 1, Amp 2 and Amp 3 are all switched to "ON".

Namely, when the ON/OFF parameters in the group are all in the same state, they are switched to the opposite state in a toggle manner each time the switch element is clicked on, while, in the case where the ON/OFF parameters in the two different states mixedly exist, the ON/OFF parameters are set so as to produce no sound.

Figure 32:
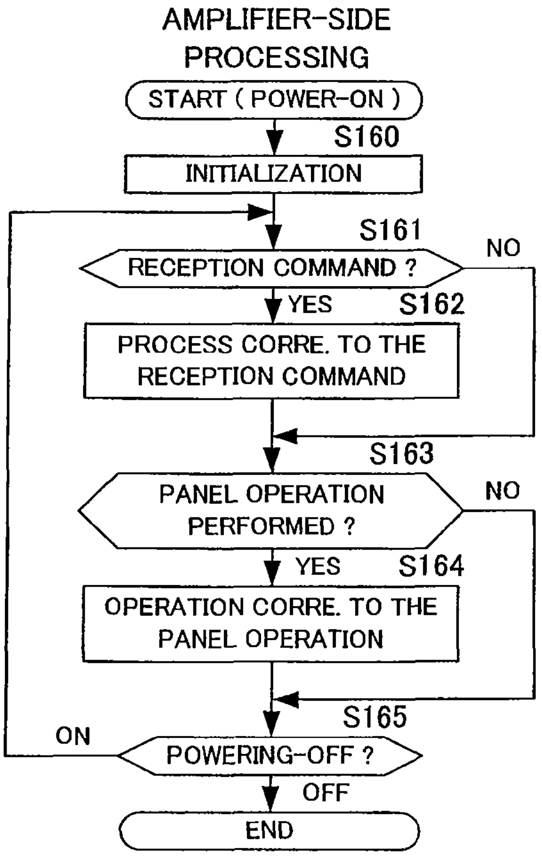
FIG. 32 is a flow chart of amplifier-side processing performed in the amplifier in the amplifier system of the present invention.

FIG. 32 is a flow chart of amplifier-side processing performed in the amplifier 3.

Upon powering-on of the amplifier 3, the amplifier-side processing is started up, where initialization of various sections of the amplifier 3 is performed first at step S160. In the initialization, information that the amplifier 3 has been connected to the network comprising the LAN 4 may be broadcast to the network to acquire an IP address etc. Then, a determination is made, at step S161, as to whether there has been given a reception command from the PC 2 remote-controlling the amplifier 3. If answered in the affirmative at step S161, a command reception process corresponding to the reception command is performed at step S162. If no reception command has been given from the PC 2 as determined at step S161, the operation of step S162 is skipped. Then, it is determined, at step S163, whether panel operation for operating any one of operating members of the operation panel has been performed. If such panel operation has been performed as determined at step S163, the processing goes to step S164, where an operation corresponding to the panel operation is performed except for powering-off operation. If no panel operation has been performed as determined at step S163, the operation of step S164 is skipped. Then, a determination is performed, at step S165, whether the panel operation is powering-off operation. If the panel operation is not powering-off operation as determined at step S165, the operations of steps S161 to S165 are repeated until the power supply is turned off. Once it is determined that the power supply has been turned off, the instant amplifier-side processing is brought to an end.

Figure 33:
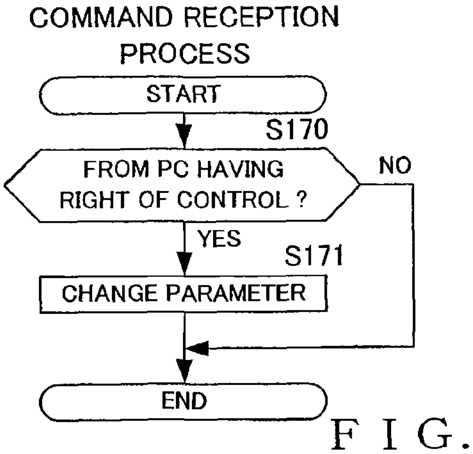
FIG. 33 is a flow chart of a command reception process performed in the amplifier in the amplifier system of the present invention.

FIG. 33 is a flow chart of the command reception process performed at step S162 of the amplifier-side processing when the command received by the amplifier is a change request. Upon start-up of the command reception process, it is determined, at step S170, whether the received command is from the PC 2 having the right of control over the amplifier 3. If the received command is from the PC 2 having the right of control over the amplifier 3 as determined at step S170, the processing goes to step S171, where a parameter included in operation data stored in the amplifier 3 and designated by the received command is changed in accordance with content designated by the received command, after which the command reception process is brought to an end.

Figure 34:
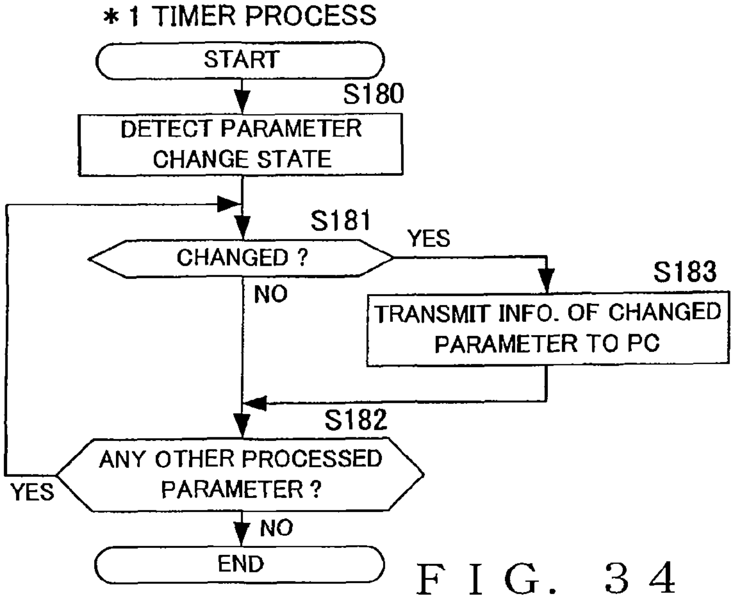
FIG. 34 is a flow chart of a *1 timer process performed in the amplifier in the amplifier system of the present invention.

FIG. 34 is a flow chart of a *1 timer process performed every 10 msec in the amplifier 3. Once the *1 timer process is started at predetermined timing, a parameter change state is detected at step S180. Parameters of which the parameter change state is detected include not only various parameters in the operation data stored in the amplifier 3, but also parameters of alert events, such as various protections, level excesses and level deficiencies. Parameter values in the operation data may sometimes be changed at step S164 in response to panel operation as well as being changed at step S171 as noted above. Then, at step S181, it is determined whether a first given one of the parameters has been changed. If the first given parameter has been changed as determined at step S181, the process goes to step S183, where information of the changed parameter is transmitted to one particular PC 2 which is among the PCs 2 connected to the LAN 4 and with which the corresponding device in the current project is in the on-line state or monitorable state. Each of the events to be transmitted includes information of an event ID, event time, amplifier ID, event type and event parameter. If the parameter has not been changed as determined at step S181, the operation of step S183 is skipped, and it is further determined, at step S182, whether there is any other parameter that remains to be processed (i.e., any other unprocessed parameter). If there is another unprocessed parameter, the *1 timer process reverts to step S181 to repeat the operations of steps S181 to S183 on the unprocessed parameter. When the operations of steps S181 to S183 have been performed on all of the parameters, it is determined, at step S182, that there is no more unprocessed parameter, so that *1 timer process is brought to an end.

Figure 35:
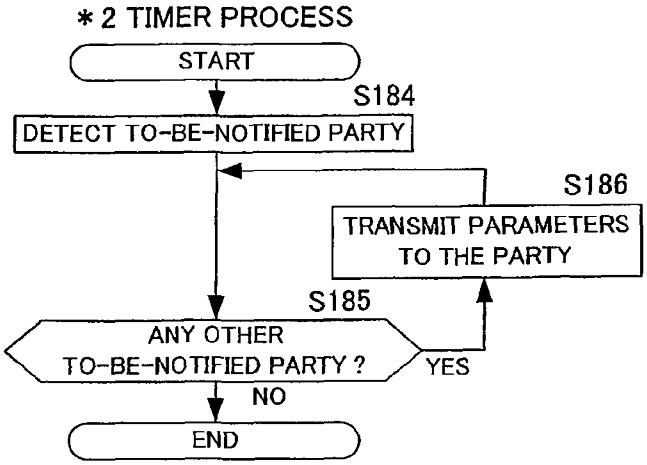
FIG. 35 is a flow chart of a *2 timer process performed in the amplifier in the amplifier system of the present invention.

FIG. 35 is a flow chart of a *2 timer process performed every 100 msec in the amplifier 3. This *2 timer process is designed to transmit every 100 msec various parameters of state data, such as level values of sound signal waveforms displayed in level meters and heat sink temperatures, changing moment by moment.

Once the *2 timer process is started at predetermined timing, a to-be-notified party is detected at step S184. This to-be-notified party is one particular PC 2 which is among the PCs 2 connected to the LAN 4 and with which the corresponding device in the current project is in the on-line state or monitorable state. Then, a determination is made, at step S185, as to whether there is any other to-be-notified party that remains to be processed (i.e., any other unprocessed to-be-notified party). If there is any other unprocessed to-be-notified party as determined at step S185, the *2 timer process goes to step S186 in order to transmit to the to-be-notified party the various parameters, such as such as level values of sound signal waveforms, changing moment by moment. The operations of steps S185 and S186 are repeated until it is determined that there is no more unprocessed to-be-notified party. In this manner, the various parameters are sequentially transmitted to all of the to-be-notified parties so that parameter values changing moment by moment are displayed in corresponding level meters. When the various parameters have been transmitted to all of the to-be-notified parties, it is determined that there no more to-be-notified party, so that the *2 timer process is brought to an end.

Whereas the present invention has been described above as the amplifier system in which the plurality of amplifiers connected to the network are controlled by the amplifier control apparatus, the present invention may alternatively be constructed as an amplifier system in which other pieces of audio equipment other than amplifiers, like effectors, speaker processors, A/D converters, D/A converters, etc. are controlled.

Further, whereas the present invention has been described above as setting a maximum (Max) or minimum value (Min) as the display setting on the group Detail View 37, an average value may be set as the display setting.

Furthermore, the present invention has been described above as constructed in such a manner that, when any one of the level operating members has been operated on the group Detail View 37, the corresponding level operating members of the individual amplifiers are changed while still retaining their relative relationship (decibel differences). However, when any one of the level operating members is operated on the individual amplifier Detail View 37, the value of the operating member can be set freely from the predetermined range from the maximum value to the minimum value. In such a case, if the amplifier of which the level operating member has been operated belongs to some group and if the display setting is "Min", the parameter value of the level operating member having been operated becomes a minimum value in the group, and the parameter value of the operated level operating member having been operated will be displayed when the corresponding group Detail View 37 is opened. Alternatively, if the display setting is "Max", the parameter value of the level operating member having been operated becomes a maximum value in the group, and the parameter value of the operated level operating member having been operated will be displayed when the corresponding group Detail View 37 is opened.

Referring back to the Tree View(Rack) 36-1 of FIG. 5, once the "Rack-1A" group is clicked on, the group Detail View of a group consisting of "Amp1" and "Amp2" is displayed. Then, once "Amp2" is clicked on, the individual Detail View 37 of "Amp2" is displayed. In this case, there is no need to transmit the various moment-by-moment-changing parameters, such as level values, to the PC 2 every 100 msec. Thus, the PC 2 not only informs "Amp1" that the parameter transmission is unnecessary, but also informs "Amp2" that the parameter transmission is necessary. Alternatively, the PC 2 only informs "Amp 1" that the parameter transmission is unnecessary.

Then, once the "Rack-1B/1" group is clicked on, the group Detail View 37 of a group consisting of "Amp3" and "Amp4" is displayed. In this case, there is no need to transmit the various moment-by-moment-changing parameters, such as level values, from "Amp1" and "Amp2" to the PC 2 every 100 msec, but, instead, there is a need to transmit the various moment-by-moment-changing parameters, such as level values, from "Amp3" and "Amp4" to the PC 2 every 100 msec. Thus, the PC 2 not only informs "Amp1" and "Amp2" that the parameter transmission is unnecessary, but also informs "Amp3" and "Amp4" that the parameter transmission is necessary. Alternatively, the PC 2 informs all of the amplifiers that the parameter transmission is unnecessary, and then informs "Amp3" and "Amp4" that the parameter transmission is necessary.

Figure 43:
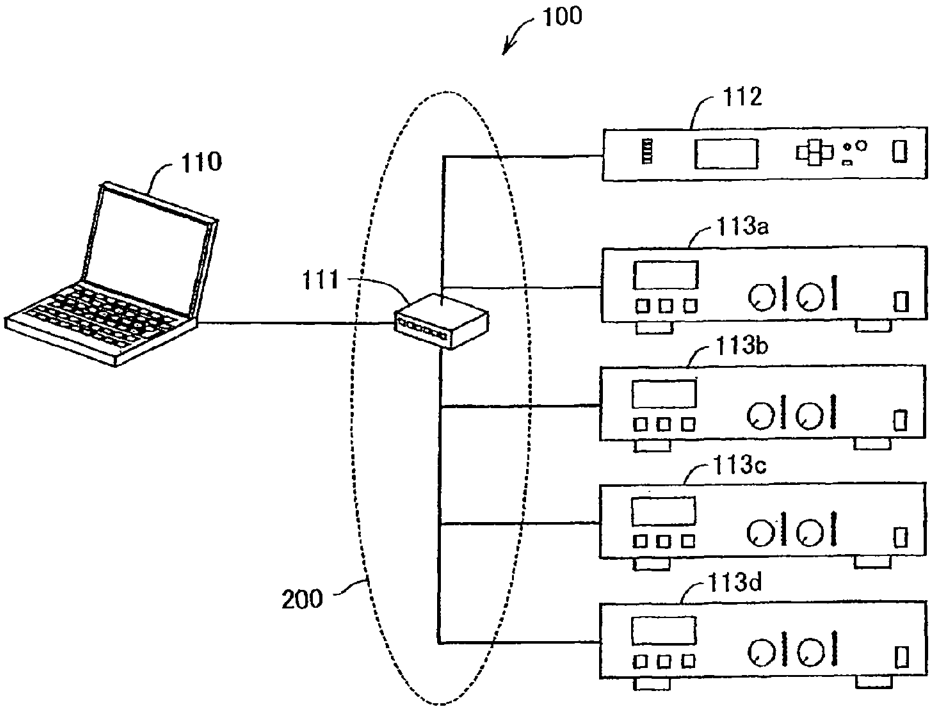
FIG. 43 is a block diagram showing a general setup of an amplifier system according to another embodiment of the present invention.

Next, a description will be given about another embodiment of the present invention with reference to FIG. 43-FIG. 49. FIG. 43 is a block diagram showing a general setup of an amplifier system according to another embodiment of the present invention. The amplifier system 100 shown in FIG. 43 includes a network 200 to which are connected a personal computer (PC) 110, an ACU (Amplifier Control Unit) 112 and a plurality of amplifiers 113*a*, 113*b*, 113*c* and 113*d*. The network 200 is built by the commonly-used Ethernet and includes a hub 111, such as a switching hub. For example, up to 252 amplifiers can be connected to the network 200. The PC 110 has an amplifier control program installed therein, and through activation of the amplifier control program, the PC 110 can control all of the amplifiers, residing in the amplifier system 100, via the network 200. In this case, the amplifiers 113*a*-113*d* are connected to the network 200 via their respective interfaces capable of being connected to the network 200, and other amplifiers, provided with no interface capable of being connected to the network 200, are connected to the ACU 112 so that they can be connected to the network 200 by way of the ACU 112. Namely, the ACU 112 is constructed to serve as an intermediary to connect the amplifiers, provided with no interface capable of being connected to the network 200, to the network 200. Thus, in the amplifier system 100, the amplifiers provided with no interface capable of being connected to the network 200 as well as the amplifiers provided with their respective interfaces capable of being connected to the network 200 can be controlled by the PC 110 via the network 200.

The network 200 is constructed by the Ethernet standard that is one of the computer network standards commonly used today. The Ethernet is defined by lower two layers of the OSI reference model, i.e. physical layer and data link layer. The network 200 may alternatively be constructed by a LAN (Local Area Network) based on a combination of the Ethernet and TCP/IP protocol. Sound or audio signals are supplied to the amplifiers 113*a*-113*d*, connected to the network 200, via not-shown audio cables, and control information is communicated to the amplifiers 113*a*-113*d* via the network 200. Let it be assumed that the sound signals supplied to the amplifiers 113*a*-113*d* are mixed signals (i.e., mixing-processed signals) obtained by a mixer mixing sound signals supplied from a plurality of microphones installed in a concert hall, theater or the like. Further, one or more speakers for audibly reproducing or sounding sound signals output from the amplifiers 113_a_-113_d_ are connected to the amplifiers 113_a_-113_d_, and these speakers are installed distributively in the concert hall, theater or the like.

The PC 110, amplifiers 113_a_-113_d_ and ACU 112 are connected to the hub 111 via Ethernet cables so that the network 200 is physically constructed. Each of the amplifiers other than the amplifiers 113_a_-113_d_, which has no Ethernet terminal for connection to the network 200, is provided with a serial port for connection to a serial port of the ACU 112 so that, from the PC 110, it looks as if it were connected to the network 200. In this way, both the amplifiers 113_a_-113_d_ directly connected to the network 200 and the amplifiers connected to the network 200 via the ACU 112 can be controlled by the PC 110.

Via the network 200, a unique IP address is assigned to each of the PC 110, ACU 112 and amplifiers 113_a_-113_d_ connected to the network 200. In the network 200, control information is communicated between the PC 110 and the ACU 112 and amplifiers 113_a_-113_d_. Examples of the control information include device names and device IDs of the ACU 112 and amplifiers 113_a_-113_d_ necessary for Ethernet communication, group information of groups to which the devices belong, and state information indicative of operating states of the devices. The PC 110 has the amplifier control program installed therein, and through activation of the amplifier control program in the PC 110, the PC 110 makes a request, via the network 200, for acquiring respective device information from the ACU 112 and amplifiers 113_a_-113_d_ connected to the network 200. On the basis of the device information sent from the devices via the network 200 in accordance with the request, the PC 110 creates a project file. In this case, the device information of the ACU 112 includes device information of each amplifier, connected to the ACU 112, acquired through serial communication with the amplifier. The project file comprises device information and group names. In the illustrated example, there are a plurality of groups of amplifiers defined on the basis of different viewpoints or perspectives, e.g. a rack group (rack) based on the perspective of positional arrangement of the amplifiers, feed structure group (Feed St.) based on the perspective of roles of the amplifiers, and user defined group (U.D.1) based on user-defined perspectives of groups. Group names of these groups can be set via the PC 110.

By thus grouping the amplifiers into a plurality of groups of amplifiers defined on the basis of several different perspectives, the instant embodiment allows a user to reach a desired amplifier by selecting any of the groups and performing searches of different perspectives, even where dozens or hundreds of amplifiers are connected to the network 200 as is often the case with concert halls, theaters and the like.

Once the project file is created by the PC 110 through activation of the amplifier control program, all of the amplifiers residing in the network 200 are displayed in a tree format on the basis of the acquired device information of the amplifiers. At that time, the group information of all of the amplifiers is retrieved from the project file by the PC 110, so that all of the amplifiers are displayed in a tree format on a display section of the PC 110. Further, operating states of a predetermined amplifier can be displayed and monitored on the display section.

Figure 44:
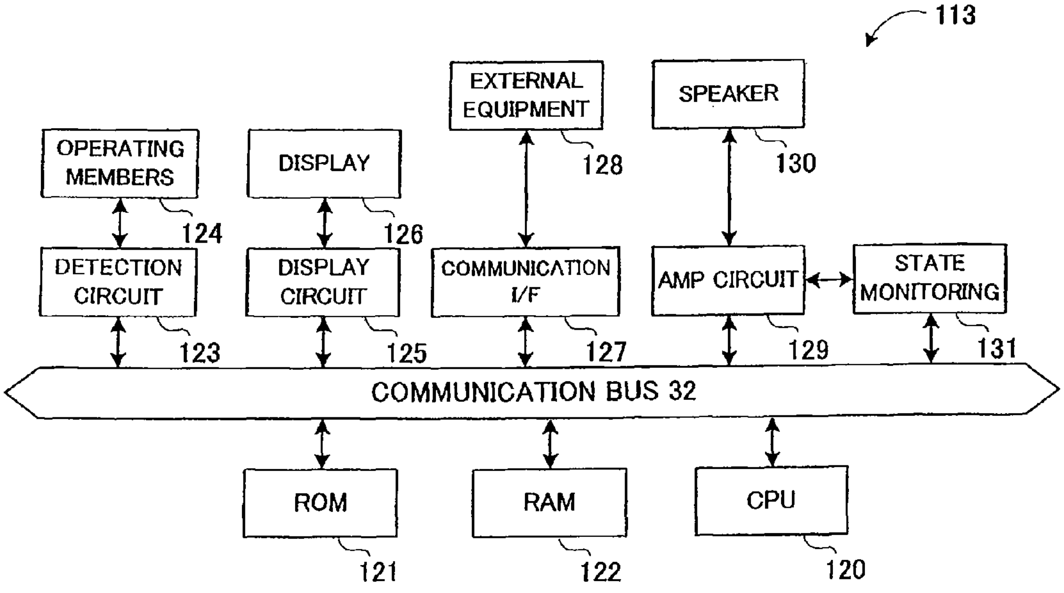
FIG. 44 is a block diagram showing an example construction of an amplifier in the other embodiment of the amplifier system.

Here, the amplifiers 113_a_-113_d_ are identical in construction, and thus, FIG. 44 shows in a block diagram the construction of a representative one 113 of the amplifiers 113-1-113-5.

In the amplifier 113 shown in FIG. 44, a CPU 120 not only controls all operations of the amplifier 113, but also executes operation software, such as an amplifier control program. ROM 121 has stored therein the operation software, such as the amplifier control program, for execution by the CPU 120, and a RAM 122 includes a working area for use by the CPU 120 and a storage area that stores device information, state data, etc. of the amplifier 113. Preferably, the ROM 121 is a rewritable ROM, such as a flash memory, so as to permit rewriting of the operation software and thereby facilitate version upgrade of the operation software. Detection circuit 123 scans operating members 124, such as an attenuator, provided in the amplifier 112 to thereby detect events of the operating members 124 and then produce event outputs corresponding to the operating members 124 where the events have occurred. Display circuit 125 causes input and output levels, amplifier setting screen, etc. on a display device 126, such as a liquid crystal display (LCD).

I/F 127 is an Ethernet interface that is connected to the network 200 via a network communication cable (Ethernet cable). Via the I/F 127, the amplifier 113 is logically connected to external equipment 128, such as the PC 110. Amplification circuit 129 amplifies a sound or audio signal input to the amplifier 113 via the not-shown audio cable, and the thus-amplified sound signal is audibly reproduced or sounded via a speaker 130. State monitoring circuit 131 monitors the amplification circuit 129 to create state information indicative of operating states of the amplification circuit 129. When the PC 110 has requested the state information of the amplifier 113 for monitoring the amplifier 113, the state information created by the state monitoring circuit 131 is transmitted to the PC 110. Examples of the state information include information of an ON/OFF state of a power switch, input and output levels, temperatures of heat sinks, limiter ON/OFF operation responsive to excessive input, ON/OFF operation of an output protection circuit, etc. of the amplifier 113. The state monitoring circuit 131 can check operating states of the speaker 30 by monitoring an impedance value of the speaker 130.

Figure 45:
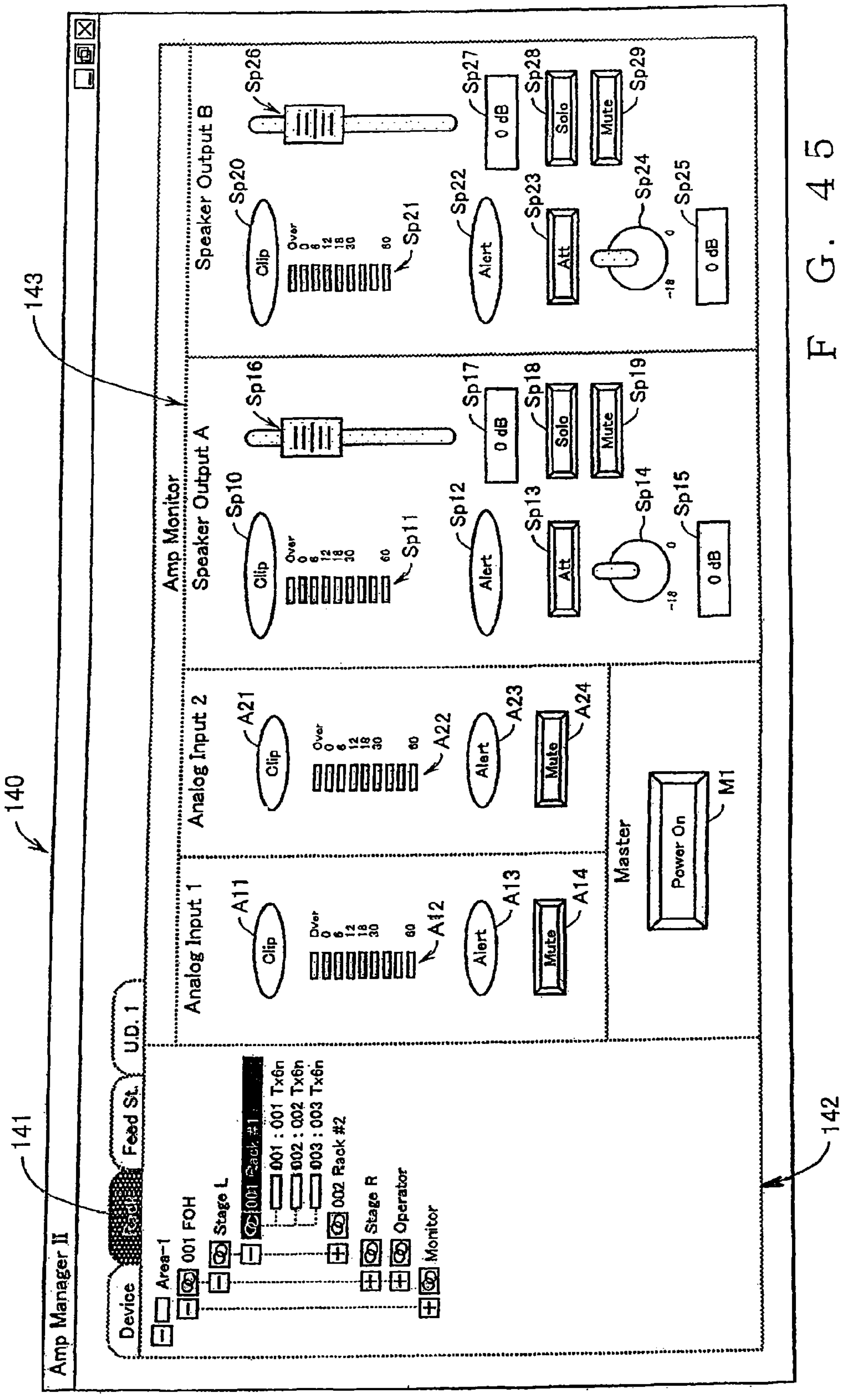
FIG. 45 is a diagram showing an example of a control screen displayed on the display device of the PC in the other embodiment of the amplifier system.

FIG. 45 shows an example of a control screen displayed on the display device of the PC 110, which includes a tree display section 142 and a state information display section (Amp Monitor) 143. A plurality of tabs 141 are displayed in the tree display section 142. In the illustrated example of FIG. 45, the "Rack" tab 41 is selected and displayed, as a desired group type, in white-letters in a shaded background, so that a rack group is displayed in the tree display section 142. Namely, in the tree display section 142, amplifiers belonging to an area of area name "Area-1" are displayed in a tree format, and group names "001 FOH" and "Monitor" of two first hierarchical level groups developed from the rack group are displayed. Further, group names "Stage L", "Stage R" and "Operator" of three second hierarchical level groups developed from the first hierarchical level group "001 FOH" are displayed in the tree display section 142. Here, "FOH" is an acronym for "Front of House" meaning an operator room located in front of a stage or the like, and "Stage L" and "Stage R" mean locations to the left and right of the stage, from which it can be seen the rack group comprises groups defined on the basis of installed positions of the amplifiers.

Further, in the tree display section 142, there are displayed group names "001 Rack #1" and "002 Rack #2" of two third hierarchical level groups developed from the second hierarchical group "Stage L", and three amplifiers "001:001 Tx6n", "002:002 Tx6n" and "003:003 Tx6n" developed from the third hierarchical level group "001 Rack #1". In this case, "001 Rack #1" and "002 Rack #2" are rack names, from which it can be seen that three amplifiers “001:001 Tx6n”, “002:002 Tx6n” and “003:003 Tx6n” are placed on the rack “001 Rack #1”. Note that “001”, “002” and “003” in “001:001 Tx6n”, “002:002 Tx6n” and “003:003 Tx6n” are the respective device IDs of the three amplifiers, once a mark “+” within “□” on the tree display of FIG. 43 is clicked on, an immediately lower hierarchical level is developed and displayed in a tree format.

In the state information display section 143, there is displayed state information indicative of operating states of an amplifier selected in the tree display section 142 or an amplifier belonging to a hierarchical group selected in the tree display section 142. The third hierarchical level group “001 Rack #1” is selected and displayed in white-letters in a black background in the tree display section 142 of FIG. 45, and representative state information of the amplifiers belonging to the third hierarchical level group “001 Rack #1” or state information of an amplifier selected from the third hierarchical level group is displayed in the state information display section 143. The state information displayed in the state information display section 143 includes information of an ON/OFF state of the power switch, input and output levels, temperatures of heat sinks, clip ON/OFF operation responsive to excessive input, ON/OFF operation of the output protection circuit, etc. of the amplifier 113. In the specific example of FIG. 45, the state information is of an amplifier having two input channels and two output channels. Namely, in two areas, i.e. Analog Input 1 and Analog Input 2, indicative of operating states of two input channels, there are provided Clip buttons A11 and A21 each indicative of a clip ON/OFF state, level meters each indicative of an input level, Alert buttons A13 and A23 each indicative of an ON/OFF state indicating whether or not there is any alert in the input side, and Mute buttons A14 and A24 each indicative of a Mute ON/OFF state. Each of the buttons indicative of the ON/OFF state indicates the ON state by being illuminated, and the ON/OFF state can be inverted by the user clicking on the button. Further, in a Master area, there is provided a Power On button M1 indicative of an ON/OFF state of the power switch.

Further, in Speaker Output A and Speaker Output B areas indicative of operating states of two output channels, there are provided Clip buttons Sp10 and Sp20 each indicative of a Clip ON/OFF state, level meters Sp11 and Sp21 each indicative of an output level, Alert buttons Sp12 and Sp13 each indicative of an ON/OFF state indicating whether or not there is any alert in the output side, Att buttons Sp13 and Sp23 each indicative of an Attenuator ON/OFF state, volumes SP14 and Sp24 each for setting a maximum output level, display portions Sp15 and Sp25 for displaying settings of the volumes SP14 and Sp24, faders Sp16 and Sp26 each for adjusting a sound level, display portions Sp17 and Sp27 for displaying settings of the faders SP16 and Sp26, Solo buttons Sp18 and Sp28 each indicative of a Solo ON/OFF state, and Mute buttons Sp19 and Sp29 each indicative of a Mute ON/OFF state.

Here, when a hierarchical group has been selected in the tree display section 142 as shown in FIG. 45, representative state information of amplifiers belonging to the selected hierarchical group or state information of an amplifier selected from the hierarchical group is displayed. In the case of state information of a parameter value like some level, a maximum, average or minimum value of values of the parameter of the amplifiers belonging to the selected hierarchical group is displayed as a representative value of the parameter (representative state information). In this case, the user can select any one of the maximum, average and minimum values to cause the selected value to be displayed, and select any one of the amplifiers belonging to the selected hierarchical group to cause the state information of the selected amplifier to be displayed. Further, in the case of ON/OFF state information, the ON state is given priority over the OFF state, and, if any one of the amplifiers belonging to the selected hierarchical group is in the ON state, the parameter is displayed as “ON”.

Note that, if an individual amplifier is selected instead of a hierarchical group in the tree display section 142, the state information of the selected amplifier is displayed in the state information display section 143.

Figure 46:
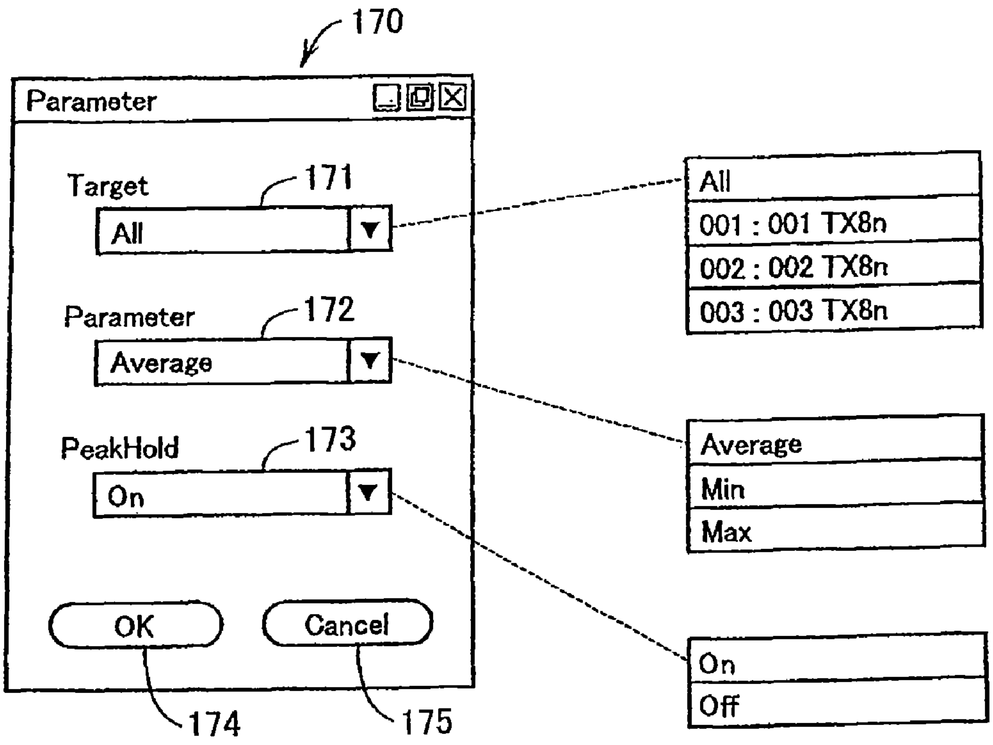
FIG. 46 is a diagram showing a parameter selection screen displayed on the display device of the PC in response to selection of a hierarchical group in the other embodiment of the amplifier system.

FIG. 46 is a parameter selection screen 170 displayed on the display device of the PC 110 in response to selection of the third hierarchical group “001 Rack #1” in the tree display section 142. On the parameter selection screen 170 shown in FIG. 46, there are displayed a Target area 171 for the user to select a target of a parameter to be displayed in the state information display section 143, a Parameter area 72 for the user to select which one of maximum, average and minimum values of the parameter is to be displayed, and a PeakHold field 173 for the user to select ON or OFF of a peakhold of the parameter. Namely, once the user clicks on “▼” at the right end of the Target area 171 when the third hierarchical group “001 Rack #1” is selected in the tree display section 142, there appears a pop-up for the user to select any one of “ALL”, “001:001 Tx6n”, “002:002 Tx6n” and “003:003 Tx6n” as shown. Once the user selects “ALL”, the three amplifiers belonging to the hierarchical group “001 Rack #1” are selected, and the user can select, in the Parameter area 172, which one of the maximum, average and minimum values of the parameter is to be displayed.

Once the user clicks on “▼” at the right end of the parameter area 172, there appears a pop-up for the user to select one of the maximum, average and minimum values as shown. If the user selects an individual amplifier, not “ALL”, in the Target area 171, then the Parameter area 172 is displayed in gray color to disable the user from performing selecting operation. Then, once the user clicks on “▼” in the PeakHold field 173, there appears a pop-up for the user to select “ON” or “OFF”. To display the parameter to be displayed with the thus-selected contents, the user clicks on an “OK” button 174. If the selected contents are to be cleared, on the other hand, the user clicks on a “Cancel” button 175.

Further, if the user right-clicks the pointing device on a display location, such as any one of the buttons of various parameters, in the state information display section 143, there appears a pop-up screen on which the user can select any one of the maximum, average and minimum values per parameter. Further, the user can designate, per parameter, any one of amplifiers belonging to a hierarchical group selected on the displayed pop-up screen so that a value of the parameter and ON/OFF state of the parameter is displayed per parameter.

The control screen 140 shown in FIG. 45 is displayed by the user performing predetermined operation on the PC 110 for displaying the control screen 140. In response to the user’s operation, the PC 110 performs a display process for displaying the control screen 140. In the display process, the respective device information of the ACU 112 and amplifiers 113*a*-113*d*, connected to the network 200, is read out from the project file. Then, the “device ID”, “device name”, “area ID”, “area name” and “group information” are retrieved from the read-out device information of each of the amplifiers 113*a*-113*d*. The device information of the ACU 112 is the device information of each of the amplifiers connected to the ACU 112, from which are retrieved the “device ID”, “device name”, “area ID”, “area name” and “group information”. The “group information” includes information indicative of a group to which the amplifier belongs, and information indicative of which of the hierarchical groups in the tree the amplifier belongs to.

Then, with reference to the area IDs of the retrieved information, the amplifiers are grouped into area-based amplifier groups each comprising amplifiers that have the area same ID and hence belong to the same area. Then, for each of the area-based amplifier groups, the amplifiers are grouped into first hierarchical level groups with reference to the respective group information of the amplifiers. After that, for each of the first hierarchical level groups, the amplifiers are grouped into lower hierarchical level groups. Such grouping into hierarchical level groups are repeated until rack groups, which are final hierarchical level groups, are reached. Then, a tree is created by arranging the amplifiers of the individual hierarchical level groups in order of the device names.

The PC 110 periodically acquires the state information of a selected amplifier or amplifiers belonging to a selected group, on the basis of which the PC 110 calculates a designated one of the maximum, average and minimum values of each of the parameters. Then, the PC 110 performs a plotting process for displaying the created tree in the tree display section 142 and displaying the state information of the calculated parameter in the state information display section 143, so that the control screen 140 shown in FIG. 45 is displayed on the display device of the PC 110. With the parameter values or states of the operating states of the amplifiers displayed in the state information display section 143 in the aforementioned manner, it is possible to perform monitoring of any selected amplifier or one or more amplifiers belonging to any selected group.

Figure 47:
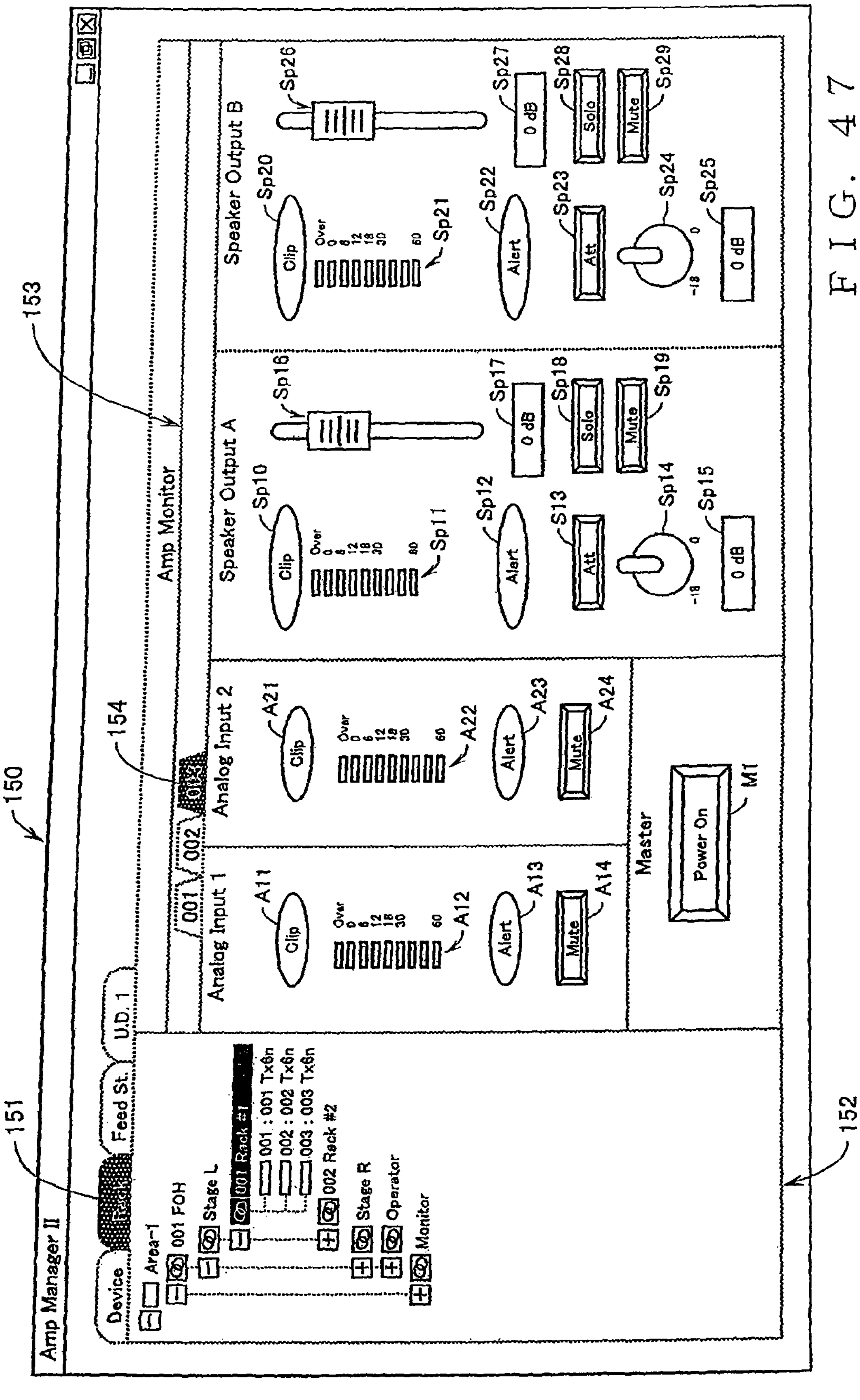
FIG. 47 is a view showing another example of the control screen displayed on the display device of the PC in the amplifier system of the present invention.

FIG. 47 shows another example of the control screen 150 displayed on the display device of the PC 110, which includes a tree display section 152 and a state information display section (Amp Monitor) 153. A plurality of tabs 151 are displayed in the tree display section 152 for selecting a group type to be displayed. In the illustrated example of FIG. 47, the "Rack" tab 151 is selected and displayed, as a desired group type, in white-letters in a shaded background, so that a rack group is displayed in the tree display section 152. In the illustrated example of FIG. 47, the rack group is displayed in the tree display section 152 in the same style as in the tree display section 142 shown in FIG. 45 and thus will not be described here to avoid unnecessary duplication.

State information indicative of operating states of an amplifier selected in the tree display section 152 or amplifiers belonging to a hierarchical group selected in the tree display section 152 is displayed in the state information display section 153. Once a hierarchical group is selected in the tree display section 152, selecting tabs 154 for selecting any one of amplifiers belonging to the selected hierarchical group are displayed in the state information display section 153. If the third hierarchical group "001 Rack #1" is selected and displayed in white-letters in a shaded background as shown in FIG. 47, the selecting tabs 154 are displayed for selecting any one of the amplifiers of device IDs "001", "002" and "003" belonging to the third hierarchical group "001 Rack #1". Then, once "003" is selected and displayed in white-letters in a shaded background, the state information of the selected amplifier "003:003 Tx6n" is displayed in the state information display section 153. Here, the state information is displayed in the state information display section 153 in the same style as in FIG. 45 and thus will not be described here to avoid unnecessary duplication.

Figure 48:
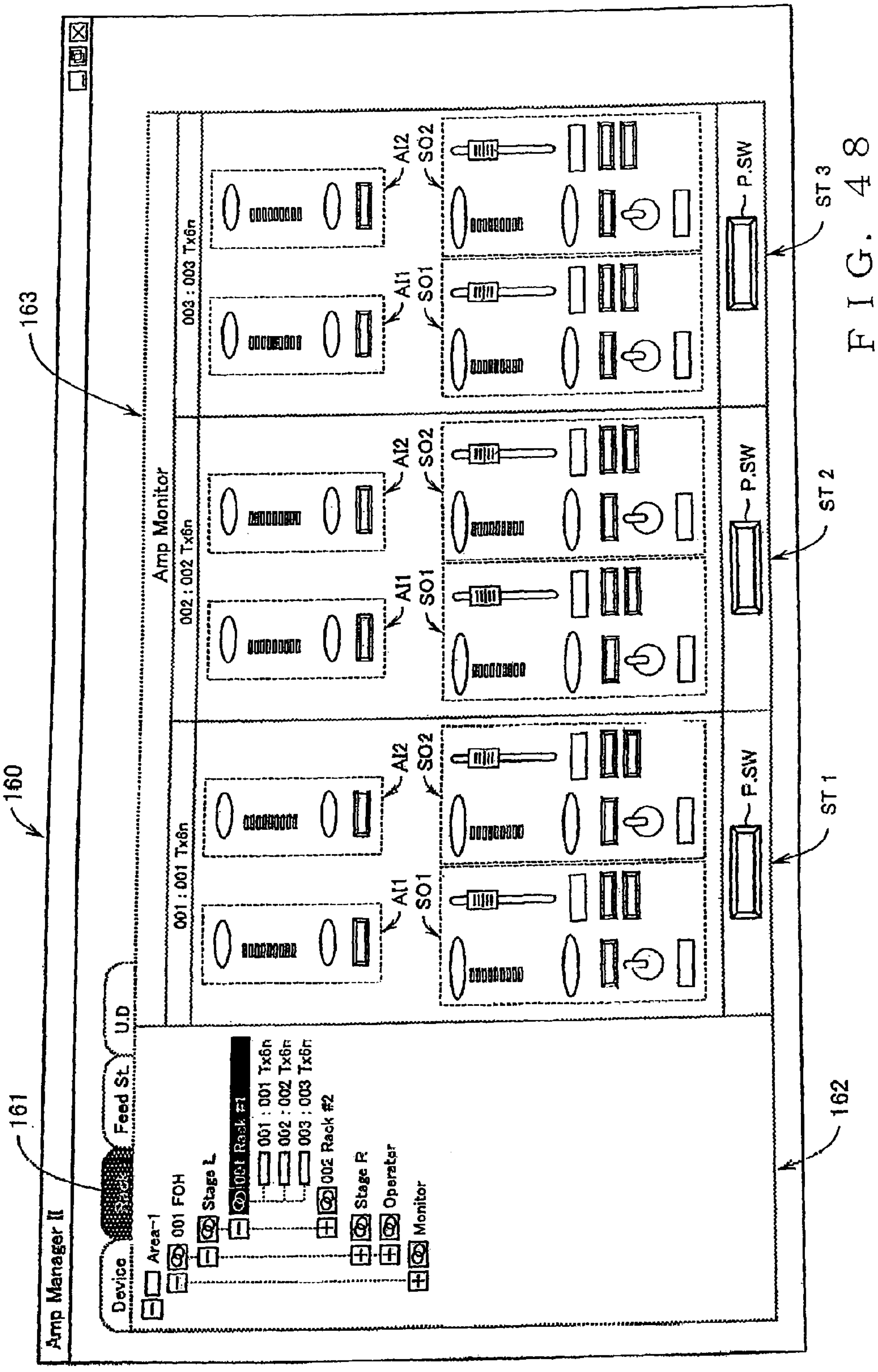
FIG. 48 is a view showing still another example of the control screen displayed on the display device of the PC in the amplifier system of the present invention.

FIG. 48 shows still another example of the control screen displayed on the display device of the PC 110, which includes a tree display section 162 and a state information display section (Amp Monitor) 163. A plurality of tabs 161 are displayed in the tree display section 162 for selecting a group type to be displayed. In the illustrated example of FIG. 48, the "Rack" tab 161 is selected and displayed in white-letters in a shaded background, so that a rack group is displayed in the tree display section 162. In the illustrated example of FIG. 48, the rack group is displayed in the tree display section 162 in the same style as in the tree display section 142 shown in FIG. 45 and thus will not be described here to avoid unnecessary duplication.

State information indicative of operating states of all amplifiers belonging to a hierarchical group selected in the tree display section 162 is displayed in the state information display section 163. In this case, strip display sections, provided in corresponding relation to the amplifiers belonging to the selected hierarchical group, are displayed in the state information display section 163.

If the third hierarchical group "001 Rack #1" is selected and displayed in white-letters in a shaded background as shown in FIG. 48, the state information of the amplifier "001: 001: Tx6n" belonging to the third hierarchical group "001 Rack #1" is displayed in the first strip (display section) ST1, the state information of the amplifier "002:002: Tx6n" belonging to the third hierarchical group "001 Rack #1" is displayed in the second strip (display section) ST2, and the state information of the amplifier "003:003: Tx6n" belonging to the third hierarchical group "001 Rack #1" is displayed in the third strip (display section) ST3. The state information is displayed in the first to third strips ST1 to ST3 by means of icons that are similar to, but smaller in size than, the icons of the corresponding parameters shown in FIG. 45. Each of the first to third strips ST1 to ST3 has two areas A11 and A12 indicative of operating states of two input channels, two areas SO1 and SO2 indicative of operating states of two output channels, and a button P.SW indicative of an ON/OFF state of a power switch. Each of the areas A11 and A12 has a Clip button, a level meter, an alert button and a Mute button. Further, each of the two areas SO1 and SO2 has a Clip button, a level meter, an alert button, a Solo button, an Attenuator button, a volume control, a display portion of the volume control, a fader, a display portion of the fader, a Solo button, and a Mute button.

Note that parameters to be displayed in each of the strip display sections may be limited to primary and necessary parameters so as to increase the number of items displayed by the strip display sections in the state information display section 163.

Figure 49:
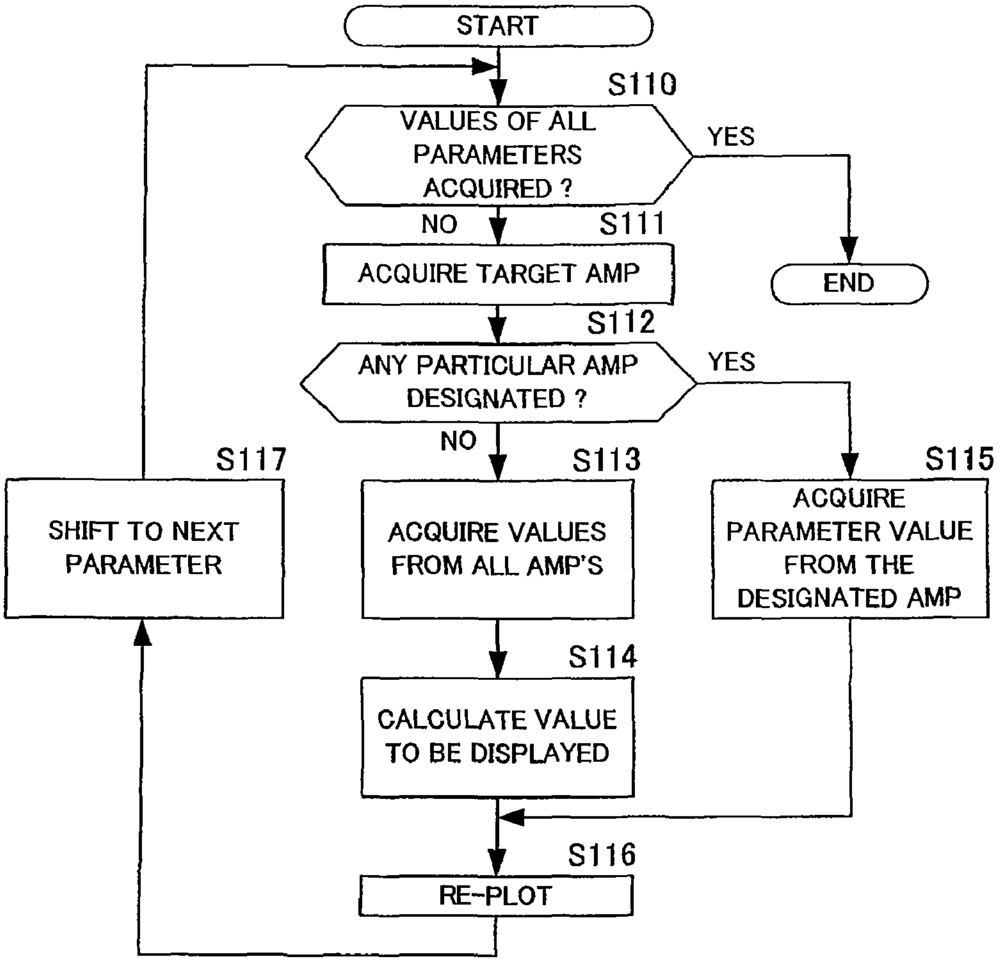
FIG. 49 is a flow chart of a parameter value display process performed at predetermined time intervals in the amplifier system of the present invention.

FIG. 49 is a flow chart of a parameter value display process performed at predetermined time intervals, e.g. every 20 msec or 30 mec. Once the parameter value display process is started up, a determination is made, at step S110, as to whether values of all parameters included in the state information of amplifiers have been acquired. Immediately after the start-up of the parameter value display process, it is determined that all of the parameter values have not yet been acquired (NO determination at step S110), and thus, the process proceeds to step S111. At step S111, target amplifier is acquired. The target amplifier is an amplifier selected in the tree display section or an amplifier belonging to a hierarchical group selected in the tree display section. Then, at step S112, a determination is made as to whether any particular amplifier has been designated. If any amplifier has been selected in the tree display section and any particular amplifier has been designated, the process branches to step S115, where a first parameter value of the designated amplifier is acquired. Further, if a hierarchical group is currently selected in the tree display section, it is determined that no particular amplified has been designated, so that the process goes to step S113.

Respective values of a first parameter are acquired, at step S113, from all of the amplifiers belonging to the selected hierarchical group, and a predetermined value to be displayed (i.e., average, minimum and maximum value) is calculated from the acquired parameter values at step S114. Upon completion of the operations of steps S114 or S115, the parameter value calculated at step S114 or the value acquired at step S115 is re-plotted at step S116. Then, at next step S117, the process shifts to a next (or second) parameter and reverts to step S110 to repeat the operations of steps S110 and S115 on the next parameter. Thus, a value of the next parameter is acquired or calculated and re-plotted at step S116, after which the process shifts to a still next parameter. By repetitively performing the operations of step S110 to step S117, values of the parameters included in the state information of each of the amplifiers are sequentially acquired and re-plotted. Once values of all of the parameters are acquired in the aforementioned manner, the instant parameter value display process is brought to an end. Note that the state information to be re-plotted and displayed includes information the ON/OFF state of the power switch, input and output levels, temperatures of heat sinks, limiter ON/OFF operation due to excessive input, ON/OFF operation of the output protection circuit, etc. of the amplifier 113 and may also include operating states of the speakers connected to the amplifier.

By the execution of the parameter value display process, latest parameter values or conditions of operating state of each selected amplifier or one or more amplifiers belonging to each selected hierarchical group are displayed in the state information display section 143, so that latest operating states of the amplifiers can be monitored.

Whereas the present invention has been described above as supplying only control information to the network, sound signals and control information may be supplied to the network. Further, whereas the network has been described as being an Ethernet network, it may be a LAN network.

Further, because the groups, such as the rack group, feed structure group and user-defined group, are amplifier groups defined on the basis of different perspectives, some of the amplifiers may redundantly belong to two or more groups. Further, in lower hierarchical groups developed from the groups, each of the amplifiers belongs to any one of the lower hierarchical groups rather than a plurality of the lower hierarchical groups.

This application is based on, and claims priority to, JP PA 2007-302803 filed on 22 Nov. 2007, JP PA 2008-061670 filed on 11 Mar. 2008, JP PA 2008-061671 filed on 11 Mar. 2008 and JP PA 2008-061672 filed on 11 Mar. 2008. The disclosure of the priority applications, in its entirety, including the drawings, claims, and the specification thereof, is incorporated herein by reference.

What is claimed is:

1. An amplifier system including a plurality of amplifiers and an amplifier control apparatus interconnected via a network, each of said amplifiers comprising:

an input section to which is inputted a sound signal;

a processing section that amplifies the sound signal inputted to said input section;

an output section that outputs the sound signal amplified by said processing section;

a storage that stores a set of parameters, for controlling the amplification by said processing section; and a changing section that changes a value of a parameter stored in said storage and transmits a report notifying the change of the parameter to the amplifier control apparatus, said amplifier control apparatus comprising:

a display device;

an input device that receives user's operation;

a storage that stores a plurality of sets of parameters corresponding to the plurality of amplifiers, each of the parameter sets having data structure and values to the parameter set stored in the corresponding one of said amplifiers;

an update section that receives the report from one of said amplifiers and updates the parameter set corresponding to the one amplifier in said storage on the basis of the report;

a grouping section that groups said amplifiers into groups in response to a grouping operation received by said input device;

a first display controller that, in response to an amplifier selecting operation received by said input device, selects one of said amplifiers, and displays an amplifier detail screen having an element thereon for the selected amplifier on said display device, wherein said first display controller takes out a parameter corresponding to the element from the parameter sets corresponding to the selected amplifier stored in said storage and displays the value of the parameter via the element on said display device; and a second display controller that, in response to a group selecting operation received by said input device, selects one of said groups and displays a group detail screen having an element thereon for the selected group on said display device, wherein said second display controller takes out parameters, corresponding to the element, from individual ones of the parameter sets corresponding to the amplifiers in the selected group stored in said storage, detects a maximum value and a minimum value from among the taken-out parameters and displays the detected maximum and minimum values via the element on said display device.

2. The amplifier system as claimed in claim 1 wherein said amplifier control apparatus further comprises:

a first parameter change section that, when said input section has received operation of any desired element on the amplifier detail screen for the selected amplifier being displayed on said display device, changes the value of the parameter, corresponding to the desired element, of the selected amplifier and transmits a corresponding change request to the selected amplifier; and a second parameter change section that, when said input section has received operation of any desired element on the group detail screen for the selected group being displayed on said display device, collectively changes the values of the parameter, corresponding to the desired element, of the individual amplifiers belonging to the selected group while still retaining relative relationship between the values of the parameter and transmits a corresponding change request to each of the amplifiers belonging to the selected group, and wherein said change section of each of said amplifiers includes a change request processing section that receives the change request transmitted to the amplifier and changes, in accordance with the change request, a value of a corresponding one of the parameters stored in said storage of each of said amplifiers.

3. The amplifier system as claimed in claim 2 wherein, when collectively changing the values of the parameter of the individual amplifiers belonging to the selected group while still retaining the relative relationship between the values, said second parameter change section changes each of the values of the parameter of the individual amplifiers so as not to fall outside a predetermined change range defined between predetermined lower and upper limits of the parameter.

4. The amplifier system as claimed in claim 2 wherein each of said amplifiers is capable of granting said amplifier control apparatus a right of control over the amplifier, said first parameter change section of said amplifier control apparatus is constructed to be made operable with respect to the amplifier being displayed on the amplifier detail screen when said amplifier control apparatus has acquired the right of control over the amplifier being displayed on the amplifier detail screen but made inoperable with respect to the amplifier when said amplifier control apparatus has not acquired the right of control over the amplifier, and said second parameter change section of said amplifier control apparatus is constructed to be made operable with respect to all of the amplifiers belonging to the group being displayed on the group detail screen when said amplifier control apparatus has acquired the right of control over all of the amplifiers belonging to the group but made inoperable with respect to all of the amplifiers belonging to the group when said amplifier control apparatus has not acquired the right of control over at least one of the amplifiers belonging to the group.

5. The amplifier system as claimed in claim 1 wherein said plurality of amplifiers comprise a plurality of different types of amplifiers, wherein, when any one of the plurality of amplifiers has been selected in response to the amplifier selecting operation, said first display controller displays on said display device an amplifier detail screen corresponding to the type of the selected amplifier, reads out, for each of the elements in the amplifier detail screen, a value of a corresponding parameter of the selected amplifier from said storage of said amplifier control apparatus and displays the read-out value of the parameter via said element, and wherein, when any one of the groups has been selected in response to the group selecting operation, said second display controller displays on said display device a group detail screen having all elements contained in amplifier detail screens corresponding to the types of the amplifiers belonging to the selected group, reads out, for each of the elements in the group detail screen, a value of a corresponding parameter of each of relevant ones of the amplifiers, belonging to said group and having the corresponding parameter, from said storage of said amplifier control apparatus, detects maximum and minimum values from among the read-out values of the parameter of the relevant amplifiers and displays the detected maximum and minimum values via said element.

6. An amplifier system including a plurality of amplifiers and an amplifier control apparatus interconnected via a network, each of said amplifiers comprising:

an input section to which is inputted a sound signal;

a processing section that amplifies the sound signal inputted to said input section;

an output section that outputs the sound signal having been subjected to the amplification by said processing section;

a storage that stores a set of ON/OFF parameters, for controlling the amplification by said processing section; and a changing section that changes an ON/OFF state of a parameter stored in said storage and transmits a report notifying the change of the parameter to the amplifier control apparatus, said amplifier control apparatus comprising:

a display device;

an input device that receives user's operation;

a storage that stores a plurality of sets of ON/OFF parameters corresponding to the plurality of amplifiers, each of the parameter sets having data structure and ON/OFF states identical to the parameter set stored in the corresponding one of said amplifiers;

an update section that receives the report from one of said amplifiers and updates the parameter set corresponding to the one amplifier in said storage on the basis of the report;

a grouping section that groups said amplifiers into groups in response to a grouping operation received by said input device;

a first display controller that, in response to an amplifier selecting operation received by said input device, selects one of said amplifiers, and displays an amplifier detail screen having an element thereon for the selected amplifier on said display device, wherein said first display controller takes out a parameter corresponding to the element from the parameter sets corresponding to the selected amplifier stored in said storage, and displays the element, in an ON style if the ON/OFF state of the parameter is ON, or in an OFF style if the ON/OFF state of the parameter is OFF, on said display device; and a second display controller that, in response to a group selecting operation received by said input device, selects one of said groups and displays a group detail screen having an element thereon for the selected group on said display device, wherein said second display controller takes out parameters, corresponding to the element, from individual ones of the parameter sets corresponding to the amplifiers in the selected group stored in said storage and displays the element in the ON style if the ON/OFF states of the taken-out parameters are all ON, in the OFF style if the ON/OFF states are all OFF, or in an ON-OFF mixed style if the ON/OFF states are partly ON and partly OFF, on said display device.

7. The amplifier system as claimed in claim 6 wherein said amplifier control apparatus further comprises:

a first parameter change section that, when said input section has received operation of any desired element on the amplifier detail screen for the selected amplifier being displayed on said display device, sets the ON/OFF parameter, corresponding to the desired element, of the selected amplifier to a value indicative of an invert of a current state of the ON/OFF parameter and transmits a corresponding change request to the selected amplifier; and a second parameter change section that, when said input section has received operation of any desired element in the group detail screen of the selected group being displayed on said display device, sets all of the amplifiers, belonging to the group, in the OFF state if said element is currently displayed as ON or in the ON-OFF mixed style in relevant ones of the amplifiers having the parameter corresponding to said element but sets all of the amplifiers, belonging to the group, in the ON state if said element is currently displayed as OFF in the relevant amplifiers, and then transmits a corresponding change request to the individual amplifiers belonging to the group, and wherein said changing section of each of said amplifiers includes a change request processing section that receives the change request transmitted to the amplifier and, if the ON/OFF parameter corresponding to the change request is currently stored in said storage of each of said amplifiers, sets the corresponding ON/OFF parameter in said storage of each of said amplifiers to a state that is identical to the state of the ON/OFF parameter set by said first parameter change section or said second parameter change section.

8. The amplifier system as claimed in claim 6 wherein each of said amplifiers is capable of granting said amplifier control apparatus a right of control over the amplifier, said first parameter change section of said amplifier control apparatus is constructed to be made operable with respect to the amplifier being displayed on the amplifier detail screen when said amplifier control apparatus has acquired the right of control over the amplifier being displayed on the amplifier detail screen but made inoperable with respect to the amplifier being displayed on the amplifier detail screen when said amplifier control apparatus has not acquired the right of control over the amplifier, and said second parameter change section of said amplifier control apparatus is constructed to be made operable with respect to all of the amplifiers belonging to the group being displayed on the group detail screen when said amplifier control apparatus has acquired the right of control over all of the amplifiers belonging to the group, but made inoperable with respect to all of the amplifiers belonging to the group when said amplifier control apparatus has not acquired the right of control over at least one of the amplifiers belonging to the group.

9. The amplifier system as claimed in claim 6 wherein said plurality of amplifiers comprise a plurality of different types of amplifiers, wherein, when any one of the plurality of amplifiers has been selected in response to the amplifier selecting operation, said first display controller displays on said display device an amplifier detail screen having elements corresponding to the type of the selected amplifier, reads out, for each of the elements, a state of an ON/OFF parameter corresponding to the element from said storage of said amplifier control apparatus and displays said element as ON if the read-out state of the ON/OFF parameter is ON but displays said element as OFF if the read-out state of the ON/OFF parameter is OFF, and wherein, when any one of the groups has been selected in response to group selecting operation, said second display controller displays on said display device a group detail screen having all elements contained in amplifier detail screens corresponding to the types of the amplifiers belonging to the selected group, reads out, for each of the elements in the group detail screen, states of a corresponding ON/OFF parameter of relevant ones of the amplifiers, belonging to said group and having the corresponding ON/OFF parameter, from said storage of said amplifier control apparatus, and displays said element as ON if the read-out state of the parameter is ON in all of the amplifiers belonging to said group but displays said element in an ON-OFF mixed display style if the read-out state of the parameter is ON in a portion of the amplifiers belonging to said group while the read-out state is OFF in a remaining portion of the amplifiers belonging to said group.

* * * * *